US 9,049,361 B2

(12) United States Patent
Hirasawa et al.

(10) Patent No.: US 9,049,361 B2
(45) Date of Patent: Jun. 2, 2015

(54) ILLUMINATION DEVICE CAPABLE OF HAVING OPTICAL ACCESSORY ATTACHED FORWARD OF LIGHT EMISSION SECTION THEREOF, IMAGE PICKUP SYSTEM, FILM HOLDER, LIGHT EMISSION CONTROL DEVICE, AND LIGHT EMISSION CONTROL METHOD

(71) Applicant: CANON KABUSHIKI KAISHA, Tokyo (JP)

(72) Inventors: Ginta Hirasawa, Kawasaki (JP); Toshiki Miyakawa, Yokohama (JP)

(73) Assignee: CANON KABUSHIKI KAISHA (JP)

( * ) Notice: Subject to any disclaimer, the term of this patent is extended or adjusted under 35 U.S.C. 154(b) by 219 days.

(21) Appl. No.: 13/734,002

(22) Filed: Jan. 4, 2013

(65) Prior Publication Data

US 2013/0176482 A1   Jul. 11, 2013

(30) Foreign Application Priority Data

Jan. 6, 2012  (JP) .................................. 2012-001331
Feb. 13, 2012 (JP) .................................. 2012-028828
Feb. 29, 2012 (JP) .................................. 2012-043460
Feb. 29, 2012 (JP) .................................. 2012-043461

(51) Int. Cl.
*G03B 15/05* (2006.01)
*H04N 5/222* (2006.01)
(Continued)

(52) U.S. Cl.
CPC ............ *H04N 5/2256* (2013.01); *H04N 9/735* (2013.01); *G02B 7/006* (2013.01); *G03B 15/05* (2013.01); *H04N 5/2254* (2013.01); *H04N 5/2354* (2013.01); *G03B 7/16* (2013.01); *G03B 2206/00* (2013.01); *G03B 2215/055* (2013.01)

(58) Field of Classification Search
CPC ........ G03B 15/05; H04N 5/2354; H04N 9/735
USPC ................. 396/157, 159, 172, 198, 225, 267; 348/224.1, 370, 371
See application file for complete search history.

(56) References Cited

U.S. PATENT DOCUMENTS

| 3,868,701 | A  | * | 2/1975  | Kawasaki ................... 396/157 |
| 4,331,400 | A  | * | 5/1982  | Brownstein et al. ......... 396/159 |
| 6,707,997 | B2 | * | 3/2004  | Hirai et al. .................. 396/157 |
| 2009/0285573 | A1 | * | 11/2009 | Aoyagi ........................ 396/157 |
| 2010/0124041 | A1 |   | 5/2010  | Druchinin |

(Continued)

FOREIGN PATENT DOCUMENTS

| JP | 09-061903 A   | 3/1997 |
| JP | 2009-020298 A | 1/2009 |
| JP | 2011-137959 A | 7/2011 |

OTHER PUBLICATIONS

Extended European Search Report for EP 13150226.2, dated Aug. 8, 2013.

*Primary Examiner* — W B Perkey
(74) *Attorney, Agent, or Firm* — Rossi, Kimms & McDowell LLP

(57) ABSTRACT

Light emission control makes it possible to determine an appropriate main light emission amount even when an optical accessory that changes color characteristics of transmitted light is attached forward of a light emission section of an illumination device. A strobe capable of having a color filter attached thereto, which changes color characteristics of transmitted light. The strobe includes a strobe microcomputer that acquires information on characteristics of the color filter attached forward of the light emission section, and transmits the acquired information on the characteristics to an image pickup apparatus on which the strobe is mounted.

33 Claims, 26 Drawing Sheets

(51) Int. Cl.
*H04N 9/73* (2006.01)
*H04N 5/225* (2006.01)
*G02B 7/00* (2006.01)
*H04N 5/235* (2006.01)
*G03B 7/16* (2014.01)

(56) References Cited

U.S. PATENT DOCUMENTS

2011/0150451 A1\* 6/2011 Kubota .................. 396/159
2013/0176482 A1\* 7/2013 Hirasawa et al. ............ 348/370

\* cited by examiner

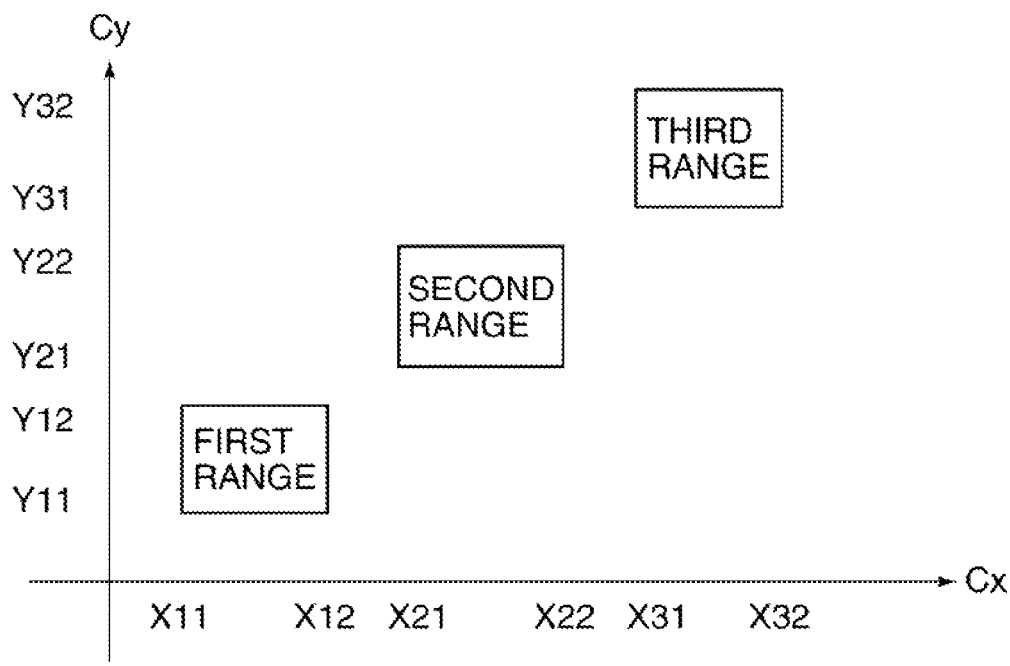

FIG.15

| CHROMATICITY INFORMATION (Cx, Cy) | FILTER CORRECTION AMOUNT (FC) |
|---|---|
| $X11 \leq Cx \leq X12$<br>$Y11 \leq Cy \leq Y12$ | -0.9t |
| $X21 \leq Cx \leq X22$<br>$Y21 \leq Cy \leq Y22$ | -0.7t |
| $X31 \leq Cx \leq X32$<br>$Y31 \leq Cy \leq Y32$ | -0.5t |
| Cx, Cy OTHER THAN ABOVE | 0 |

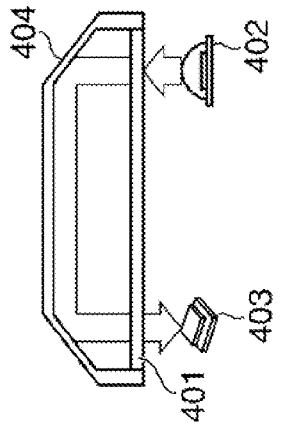
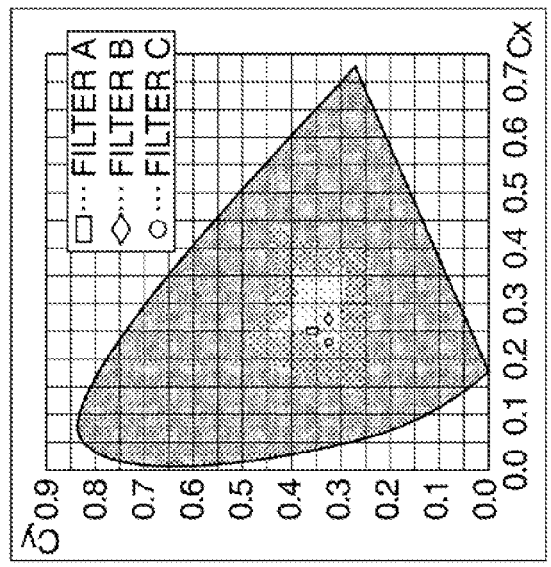
FIG.21A
DETECTION RESULT OBTAINED WHEN LIGHT IS TRANSMITTED THROUGH COLOR FILTER ONCE
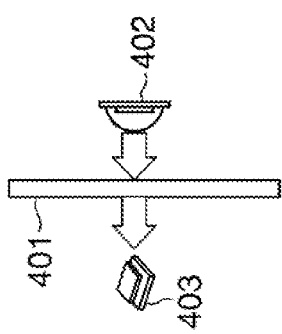
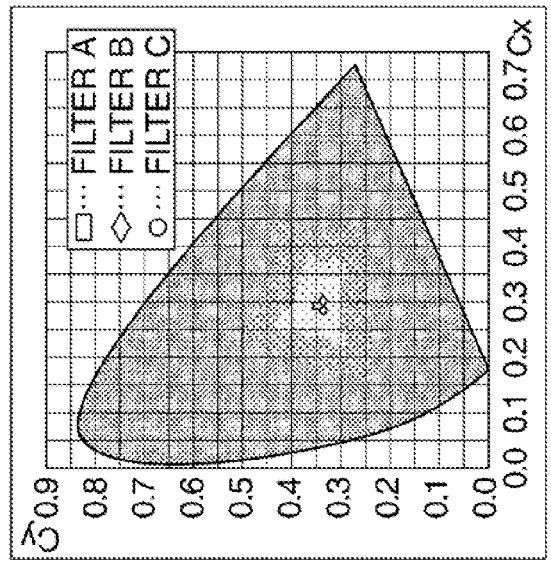
FIG.21B
DETECTION RESULT OBTAINED WHEN LIGHT IS TRANSMITTED THROUGH COLOR FILTER TWICE

*FIG.23*

| CHROMATICITY INFORMATION (Cx, Cy) | COLOR TEMPERATURE T (K) |
|---|---|
| $X11 \leq Cx \leq X12$<br>$Y11 \leq Cy \leq Y12$ | 5000 |
| $X21 \leq Cx \leq X22$<br>$Y21 \leq Cy \leq Y22$ | 3500 |
| $X31 \leq Cx \leq X32$<br>$Y31 \leq Cy \leq Y32$ | 2000 |
| Cx, Cy OTHER THAN ABOVE | IMPOSSIBLE TO DETERMINE |

ILLUMINATION DEVICE CAPABLE OF HAVING OPTICAL ACCESSORY ATTACHED FORWARD OF LIGHT EMISSION SECTION THEREOF, IMAGE PICKUP SYSTEM, FILM HOLDER, LIGHT EMISSION CONTROL DEVICE, AND LIGHT EMISSION CONTROL METHOD

BACKGROUND OF THE INVENTION

1. Field of the Invention

The present invention relates to an illumination device, an image pickup system, a film holder, a light emission control device, and a light emission control method, and more particularly to control executed when an optical accessory that changes color characteristics of light transmitted therethrough is attached forward of a light emission section of the illumination device.

2. Description of the Related Art

In general, in an illumination device used for a camera, such as a strobe device (hereinafter simply referred to as the strobe), a discharge tube, such as a xenon tube, is used as a light source of the illumination device. A color temperature of light (strobe flash light) emitted from the strobe using a xenon tube is set to a value in the vicinity of the temperature of sunlight (6000K). For this reason, if shooting is performed using the strobe under an environment having a color temperature different from the color temperature set as above, a photographed image sometimes has unnatural colors.

To eliminate this problem, there has been proposed a technique in Japanese Patent Laid-Open Publication No. 2009-20298, in which a filter holder to which an optical accessory, such as a color filter, is attached is mounted forward of a light emission section of the strobe to thereby change the color temperature of light emitted from the strobe. In the technique disclosed in Japanese Patent Laid-Open Publication No. 2009-20298, identification information for identifying a color filter type is added to the color filter side, and a reading section provided on the strobe side reads the identification information of the color filter to thereby identify the type of the color filter attached to the filter holder. Then, the strobe determines the color temperature of the emitted light according to the identified color filter type, and displays the color temperature information on a display section, or transmits the same to the camera on which the strobe is mounted.

On the other hand, there has been proposed a technique in which a light emission amount measured when the strobe is caused to emit light is stored in a memory as reference data, and when controlling the amount of light emitted from the strobe during shooting, light emission amount control is performed according to the reference data read out from the memory (see Japanese Patent Laid-Open Publication No. H09-61903). In the light emission amount control mentioned as above, the strobe flash light is received by a photometry sensor, and when an integrated value obtained by integrating the outputs from the photometry sensor reaches a predetermined value, light emission is stopped.

By the way, when the optical accessory that changes color characteristics of light transmitted therethrough is attached forward of the light emission section, not only the color temperature of the emitted light is converted but also a phenomenon that the emitted light is attenuated occurs. In an image pickup apparatus on which the strobe is mounted, preliminary light emission is performed before the main light emission from the strobe to thereby acquire information on an object (object information) for use in calculation of the main light emission amount.

Therefore, when the optical accessory is attached to the strobe, if attenuation information indicative of attenuation in the amount of emitted light due to attachment of the optical accessory is not acquired by the image pickup apparatus, the main light emission amount is calculated according to the erroneous object information, which sometimes results in acquisition of an inappropriate amount of main light emission.

Next, the problem in shooting with the above-described insufficient light emission amount will be described in detail. When a color filter is attached to the strobe, the amount of actually emitted light is reduced due to the following factor, which may prevent shooting from being performed with a desired light amount.

Now, the factor which reduces the light emission amount when the color filter is attached will be generally described with reference to FIGS. 26A, 26B, and 27.

FIGS. 26A and 26B are views useful in explaining the light emission section of the strobe, in which FIG. 26A shows a state in which the color filter is not attached forward of the light emission section of the strobe, and FIG. 26B shows a state in which the color filter is attached forward of the light emission section of the strobe.

The light emission section includes an xenon tube 11 as a light source, and a photometry sensor 30 which receives light from the xenon tube 11, and monitors an amount of light emitted from the xenon tube 11. A Fresnel panel 64 is disposed forward of the xenon tube 11 (in the direction of emitting light from the light emission section) and this Fresnel panel 64 causes the strobe flash light emitted from the xenon tube 11 to be irradiated in a uniformly spread manner. Further, in FIG. 26B, a color filter 401 is attached forward of the Fresnel panel 64.

Now, when strobe flash light 600 is emitted from the xenon tube 11, part of the strobe flash light 600 is reflected by the Fresnel panel 64, and goes to the photometry sensor 30 as Fresnel reflected light 700. Further, as shown in FIG. 26B, part of the strobe flash light 600 is reflected by the color filter 401, and goes to the photometry sensor 30 as color filter reflected light 800.

Therefore, by attaching the color filter 401 forward of the light emission section, the amount of light which enters the photometry sensor 30 when the xenon tube 11 is caused to emit light increases by an amount of the filter reflected light 800.

FIG. 27 is a diagram showing changes in the integrated value obtained by integrating the outputs from the photometry sensor 30 appearing in FIGS. 26A and 26B.

In FIG. 27, a broken line indicates a light emission waveform of the strobe flash light, and a light emission amount integrated value (DEF) indicates the integrated value in the case where the color filter 401 is not attached forward of the light emission section. Further, a light emission amount integrated value (FIL) indicates the integrated value in the case where the color filter 401 is attached forward of the light emission section. Note that FIG. 27 shows a state in which the light emission section is caused to emit light at the maximum output level.

As shown in FIG. 27, when the color filter 401 is attached, the amount of light received by the photometry sensor 30 increases by the amount of the filter reflected light, and as a result, the light emission amount integrated value (FIL) is larger than the light emission amount integrated value (DEF). As a consequence, the light emission amount integrated value (FIL) reaches the predetermined value earlier than the light emission amount integrated value (DEF), and in the state in which the color filter 401 has been attached, the light emission is controlled to stop before reaching a desired light emission amount. As a result, when the color filter 401 is attached, shooting is executed in a state in which a desired light emission amount cannot be obtained, which sometimes prevents a good image from being obtained.

SUMMARY OF THE INVENTION

The present invention makes it possible to determine an appropriate main light emission amount even when an optical accessory that changes color characteristics of transmitted light is attached forward of a light emission section of an illumination device.

In a first aspect of the present invention, there is provided an illumination device that is capable of having an optical accessory attached forward of a light emission section thereof, for changing color characteristics of light transmitted through the optical accessory, and is removably mounted on an image pickup apparatus, comprising an acquisition unit configured to acquire information on characteristics of the optical accessory attached forward of the light emission section, and a transmission unit configured to transmit the information on characteristics acquired by the acquisition unit to the image pickup apparatus on which the illumination device is mounted.

In a second aspect of the present invention, there is provided an image pickup system including an illumination device that is capable of having an optical accessory attached forward of a light emission section thereof, for changing color characteristics of light transmitted through the optical accessory, and an image pickup apparatus, comprising an acquisition unit configured to acquire information on characteristics of the optical accessory attached forward of the light emission section, and a calculation unit configured to calculate an amount of main light emission from the illumination device, based on the information on characteristics acquired by the acquisition unit and a photometric value acquired by causing the illumination device to perform preliminary light emission.

In a third aspect of the present invention, there is provided a light emission control device comprising an acquisition unit configured to acquire information on characteristics of an optical accessory attached forward of a light emission section of an illumination device that is capable of having the optical accessory attached forward of the light emission section thereof, for changing color characteristics of light transmitted through the optical accessory, and a setting unit configured to set a control value concerning light emission amount control of the illumination device in a state in which the optical accessory is attached forward of the light emission section, based on the information on the characteristics acquired by the acquisition unit.

In a fourth aspect of the present invention, there is provided a light emission control method comprising acquiring information on characteristics of an optical accessory attached forward of a light emission section of an illumination device that is capable of having the optical accessory attached forward of the light emission section thereof, for changing color characteristics of light transmitted through the optical accessory, and setting a control value concerning light emission amount control of the illumination device in a state in which the optical accessory is attached forward of the light emission section, based on the information on the characteristics acquired by the acquiring.

In a fifth aspect of the present invention, there is provided an illumination device that is capable of having an optical accessory attached forward of a light emission section thereof, for changing color characteristics of light transmitted through the optical accessory, comprising a light source, a light receiving unit, and a determination unit configured to determine information on color characteristics of the optical accessory, based on a result of reception of light emitted from the light source and transmitted through the optical accessory by the light receiving unit.

In a sixth aspect of the present invention, there is provided an image pickup system comprising an illumination device that is capable of having an optical accessory attached forward of a light emission section thereof, for changing color characteristics of light transmitted through the optical accessory, a light source, a light receiving unit, a light guide section configured to guide light emitted from the light source to the light receiving unit such that the light emitted from the light source is transmitted through the optical accessory attached to the illumination device and is then received by the light receiving unit, a determination unit configured to determine information on color characteristics of the optical accessory, based on a result of reception of the light emitted from the light source, by the light receiving unit, an image pickup unit configured to pick up an image of an object irradiated by light emitted from the illumination device, and a white balance unit configured to correct white balance of an output from the image pickup unit based on an output from the determination unit.

In a seventh aspect of the present invention, there is provided an illumination device that is capable of having an optical accessory attached forward of a light emission section thereof, for changing color characteristics of light transmitted through the optical accessory, comprising a proximity sensor disposed at a lower area of the light emission section, and configured to detect an approach of the optical accessory, the proximity sensor being used for determining whether or not the optical accessory is attached forward of the light emission section, a light source disposed at a lower area of the light emission section, and a light receiving sensor disposed at a lower area of the light emission section, and configured to receive the light emitted from the light source and transmitted through the optical accessory, in a state where the optical accessory is attached forward of the light emission section, a result of reception of the light being used for determination on information of color characteristics of the optical accessory, wherein the proximity sensor is disposed in a side-by-side relation with the light source and the light receiving sensor in a longitudinal direction of the light emission section.

In an eighth aspect of the present invention, there is provided a filter holder for holding a color filter for changing color characteristics of light transmitted therethrough, the color filter being capable of being attached forward of a light emission section of an illumination device including a magnetic sensor disposed at a lower area of the light emission section, a light source disposed at a lower area of the light emission section, and a light receiving sensor disposed at a lower area of the light emission section, in which the magnetic sensor is disposed in a side-by-side relation with the light source and the light receiving sensor in a longitudinal direction of the light emission section, the filter holder comprising a magnetism generating member disposed in a lower area for generating magnetism, and a light guide section disposed in a lower area and configured to guide light emitted from the light source to the light receiving unit sensor, in a state where the filer holder is mounted forward of the light emission section, wherein the magnetism generating member is disposed in a side-by-side relation with the light guide section, in a longitudinal direction of the filter holder.

According to the first aspect of the present invention, it is possible to determine an appropriate main light emission amount even when the optical accessory that changes color characteristics of transmitted light is attached forward of the light emission section of the illumination device.

Further features of the present invention will become apparent from the following description of exemplary embodiments with reference to the attached drawings.

BRIEF DESCRIPTION OF THE DRAWINGS

FIG. 5 is a diagram showing an example of chromaticity information determined when an orange-colored color filter is used which is most commonly used as the color filter appearing in FIG. 2.

FIG. 6 is a diagram showing an example of a reduced light emission amount table stored in a strobe microcomputer appearing in FIG. 1.

FIG. 15 is a diagram showing an example of a filter correction amount table stored in the microcomputer appearing in FIG. 11.

FIG. 21A is a diagram showing an example of a result of detection of light by the color sensor, when the light is emitted from a light source and transmitted through the color filter once.

FIG. 21B is a diagram showing an example of a result of detection of light by the color sensor, when the light is emitted from the light source and transmitted through the color filter twice.

FIG. 23 is a diagram showing a table which associates a detection result by the color sensor, shown in FIG. 5, with a color temperature of the color filter.

FIGS. 26A and 26B are views useful in explaining a light emission section of a strobe, in which FIG. 26A shows a state in which a color filter is not attached to the light emission section, and FIG. 26B shows a state in which a color filter is attached to the light emission section.

DESCRIPTION OF THE EMBODIMENTS

The present invention will now be described in detail below with reference to the accompanying drawings showing embodiments thereof.

Figure 1:
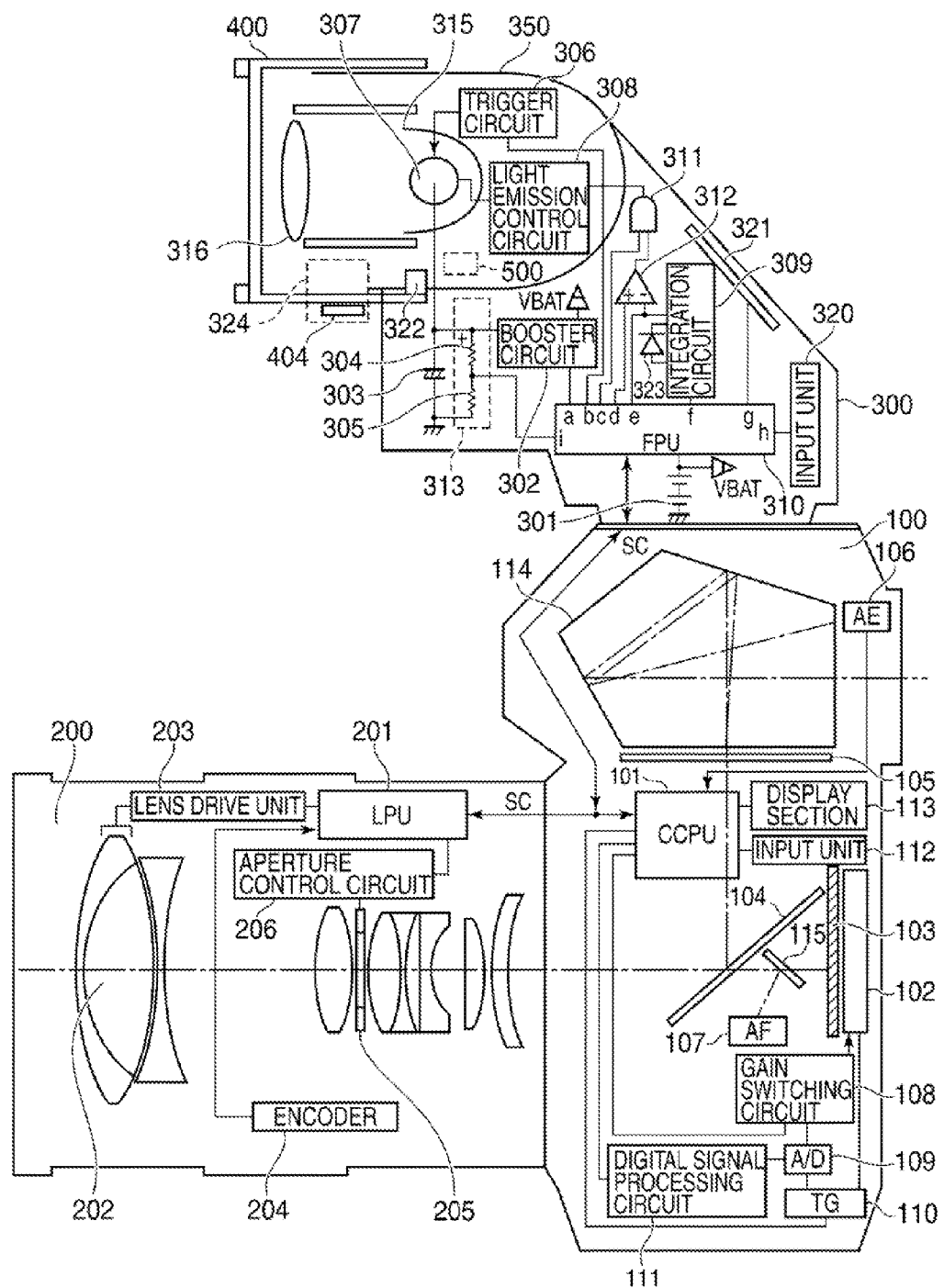
FIG. 1 is a schematic cross-sectional view of an image pickup apparatus on which an illumination device according to a first embodiment of the present invention is mounted.

FIG. 1 is a schematic cross-sectional view of an example of an image pickup apparatus as an image pickup system, on which an illumination device according to a first embodiment of the present invention is mounted.

The illustrated image pickup apparatus (hereinafter simply referred to as the camera) includes a camera body (image pickup apparatus body) 100, a lens unit (image pickup lens unit) 200, and an illumination device (hereinafter simply referred to as the strobe) 300 which is removably mounted on the camera body 100.

The camera body 100 is provided with a microcomputer (camera microcomputer: CCPU) 101 that controls each of the components of the camera. The camera microcomputer 101 is implemented by a microcomputer-incorporated one-chip IC circuit on which a CPU, a ROM, a RAM, an input/output control circuit (I/O control circuit), a multiplexer, a timer circuit, an EEPROM, an analog-to-digital converter, and a digital-to-analog converter, for example, are mounted.

The camera body 100 is further provided with an image pickup device 102, such as a CCD or a CMOS sensor, which includes an infrared cut filter, a low-pass filter, and so forth. An optical image (object image) from the lens unit 200 is formed on the image pickup device 102.

A shutter 103 intercepts light from the image pickup device 102 during non-shooting time, and is opened during shooting time to guide an optical image to the image pickup device 102. A main mirror (half mirror) 104 reflects light incident through the lens unit 200 during non-shooting time to cause an image to be formed on a focusing glass 105. The optical image formed on the focusing glass 105 can be confirmed via an optical finder (not shown). The image on the focusing glass 105 is guided to the optical finder etc. via a pentaprism 114, and is used to check an in-focus state of the object.

A photometry circuit (AE) 106 includes a photometry sensor, which divides a photographing range into a plurality of areas, and performs photometry in each divided area. An object image formed on the focusing glass 105 via the pentaprism 114 is input to the photometry sensor. A focus detection circuit (AF) 107 has a focusing sensor, not shown. The focusing sensor uses a plurality of points as focusing points, and a distance from a selected one of the focusing points to an object is measured by the focusing sensor.

A gain switching circuit 108 is a circuit for switching a gain (amplification ratio) used in amplifying an output signal (analog signal) from the image pickup device 102. The gain switching circuit 108 performs gain switching, based on shooting conditions, level setting according to a charging voltage condition, and an instruction from a photographer, under the control of the camera microcomputer 101.

An analog-to-digital converter 109 converts an amplified analog signal as an output from the image pickup device 102 to a digital signal. A timing generator (TG) 110 synchronizes a signal output from the image pickup device 102 with conversion of a signal by the analog-to-digital converter 109, under the control of the camera microcomputer 101.

A digital signal processing circuit 111 receives a digital signal from the analog-to-digital converter 109, and performs image processing on the received digital signal according to parameters to form image data. Note that in FIG. 1, a memory for recording image data, and so forth, are omitted.

The camera body 100, the lens unit 200, and the strobe 300 are connected by an interface signal line SC. For example, the camera body 100, the lens unit 200, and the strobe 300 exchange data and commands with each other via the interface signal line SC using the camera microcomputer 101 as a host. This causes an emission start signal to be sent from the camera microcomputer 101 to the strobe 300. Further, a communication clock signal is caused to be sent to a strobe microcomputer 310 via the interface signal line SC, whereby communication is performed between the camera microcomputer 101 and the strobe microcomputer 310.

Further, data is transmitted from a lens microcomputer 201 to the camera microcomputer 101 via the interface signal line SC, whereby communication is performed between the camera microcomputer 101 and the lens microcomputer 201.

An input unit 112 is provided with a release switch for starting the shooting operation, etc. On a display section 113, a set mode, other shooting information, etc. are displayed. The display section 113 includes a liquid-crystal device and a light emission element, for example. The pentaprism 114 guides an object image formed on the focusing glass 105 to the photometry sensor, and further to the optical finder, as mentioned hereinabove. A sub mirror 115 guides an optical image which is incident through the lens unit 200 and is transmitted through the main mirror 104 to the focusing sensor of the focus detection circuit 107.

The lens unit 200 is provided with the microcomputer (lens microcomputer: LPU (lens processing unit)) 201 that controls the components of the lens unit 200. The lens microcomputer 201 is implemented by a microcomputer-incorporated one-chip IC circuit on which a CPU, a ROM, a RAM, an input/output control circuit (I/O control circuit), a multiplexer, a timer circuit, an EEPROM, an analog-to-digital converter, and a digital-to-analog converter, for example, are mounted. The lens microcomputer 201 performs various kinds of determination, described hereinafter.

The lens unit 200 is provided with a lens group 202 formed by a plurality of lenses. A lens drive unit 203 drives the lens group 202 to perform focusing under the control of the lens microcomputer 201. An encoder 204 detects a position of the lens group 202, and outputs lens position information or lens driving information to the camera microcomputer 101. Then, the lens microcomputer 201 sends the lens position information to the camera microcomputer 101. The camera microcomputer 101 can recognize a distance to the object (object distance) based on the lens position information.

An aperture control circuit 206 controls a diaphragm 205 under the control of the lens microcomputer 201. Note that the focal length of the lens group 202 may be fixed or may be variable as in the case of a zoom lens.

The strobe 300 is provided with a battery 301, which is used as a power source (VBAT) for the strobe. The battery 301 is connected to a booster circuit 302 and the strobe microcomputer (FPU) 310. The booster circuit 302 is a circuit for boosting the voltage of the battery 301 up to several hundred volts, and accumulates energy for light emission (charges electricity) in a main capacitor 303. The booster circuit 302 is connected to an "a" terminal of the strobe microcomputer 310, and the strobe microcomputer 310 controls charging of the main capacitor 303.

The main capacitor 303 is a high-voltage capacitor for strobe light emission, and for example, the main capacitor 303 is charged up to 330 volts, and discharges when emitting light. A voltage detection circuit 313 includes resistors 304 and 305, and the voltage charged in the main capacitor 303 is divided by the resistors 304 and 305. The divided voltage is input to an "i" terminal (analog-to-digital converter input terminal).

A trigger circuit 306 is connected to a "b" terminal of the strobe microcomputer 310, and a trigger signal pulse is applied from the strobe microcomputer 310 to the trigger circuit 306 when executing light emission. A discharge tube 307 receives pulse voltage of several kilovolts applied from the trigger circuit 306, and emits light. In cooperation with the trigger circuit 306, a light emission control circuit 308 controls the start of light emission from the discharge tube 307, and further, controls the stop of light emission. That is, the light emission control circuit 308 controls the start of light emission from the discharge tube 307 according to a trigger voltage from the trigger circuit 306, and controls the stop of light emission according to an output from an AND gate 311, referred to hereinafter.

An integration circuit 309 is used for integrating a received light current which is generated by receiving light emitted from the discharge tube 307 by a photodiode (light receiving section) 323. The integration circuit 309 has an input connected to an "f" terminal of the strobe microcomputer 310, and an integration start signal is given from the strobe microcomputer 310 to the integration circuit 309 via the "f" terminal. An output from the integration circuit 309 is input to an inverting input terminal of a comparator 312 and an "e" terminal (analog-to-digital converter input terminal) of the strobe microcomputer 310.

The strobe microcomputer 310 controls the components of the strobe 300. The strobe microcomputer 310 is implemented by a microcomputer-incorporated one-chip IC circuit on which a CPU, a ROM, a RAM, an input/output control circuit (I/O control circuit), a multiplexer, a timer circuit, an EEPROM, analog-to-digital converters, and digital-to-analog converters, for example, are mounted.

The voltage detection circuit 313 is connected to opposite ends of the main capacitor 303 to detect a main capacitor voltage. A voltage detection signal from the voltage detection circuit 313 is sent from the strobe microcomputer 310 to the camera microcomputer 101 via the interface signal line SC.

The comparator 312 has a non-inverting input connected to a "d" terminal (digital-to-analog converter output terminal) of the strobe microcomputer 310, and has an output connected to one of input terminals of the AND gate 311. The AND gate 311 has the other input terminal connected to a "c" terminal (light emission control terminal) of the strobe microcomputer 310, and an output from the AND gate 311 is input to the light emission control circuit 308. As described above, an integration level of the received light current integrated by the integration circuit 309 and a reference level set by the strobe microcomputer 310 are compared, and when the integration level of the received light current integrated by the integration circuit 309 reaches the reference level, light emission is caused to stop.

The strobe 300 is provided with a reflector 315 and an optical system 316 that includes e.g. a panel and determines an irradiation angle of the strobe 300. The reflector 315 reflects light emitted from the discharge tube 307 in a direction of light emission from a light emission section 350. The optical system 316 is an irradiation section that reduces unevenness of light emitted from the discharge tube 307, and expands the range of irradiation of light emitted from the discharge tube 307. An input section (input interface) 320 has an output connected to an "h" terminal of the strobe microcomputer 310, and includes various operation sections for inputting e.g. settings of the strobe 300. For example, switches are arranged on a side surface of a housing of the strobe 300, for enabling a user to manually input information concerning the strobe (strobe information). A display section 321 is connected to a "g" terminal of the strobe microcomputer 310. The status of the strobe 300 is displayed on the display section 321.

A filter holder detection section 322 is used for determining whether or not a filter holder 400 which is removably mounted on the light emission section 350 is mounted, and the strobe microcomputer 310 determines whether or not the filter holder 400 has been mounted based on the detection result from the filter holder detection section 322.

The photodiode 323 is used as a sensor that receives an amount of light emitted from the discharge tube (light emitter) 307, and is configured to receive the light from the discharge tube 307 directly or e.g. via a glass fiber. The current (received light current) output from the photodiode 323 is integrated by the integration circuit 309.

Note that the light emission section 350 is formed by the discharge tube 307, the reflector 315, the optical system 316, the filter holder detection section 322, a filter determination section 324, and so forth.

Figure 2:
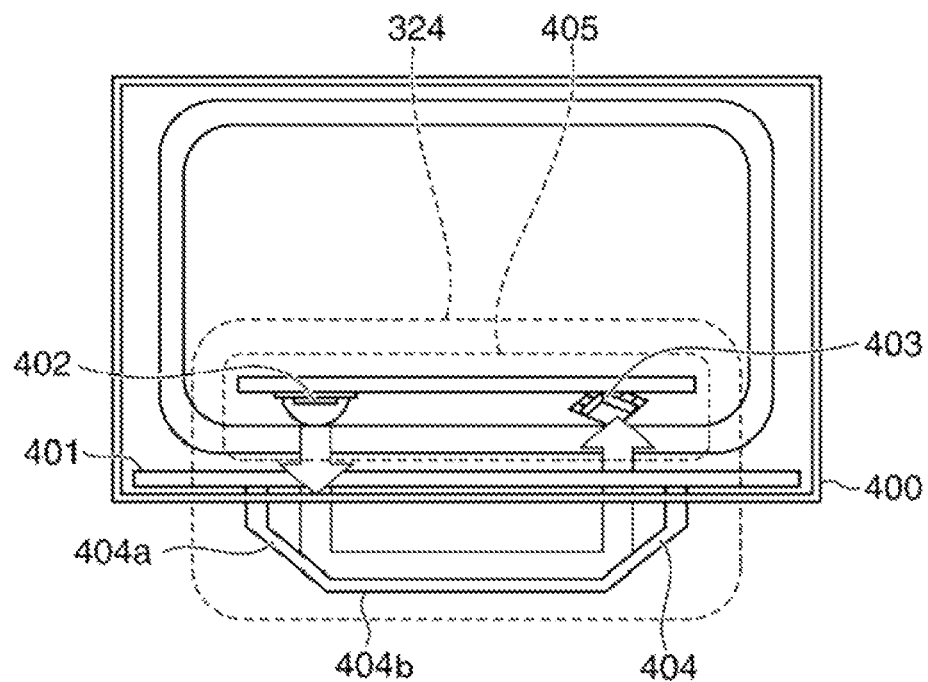
FIG. 2 is a view of a filter holder including a color filter and a filter detecting section, as viewed from the front of a light emission section appearing in FIG. 1.

FIG. 2 is a view of the light emission section 350 on which the filter holder 400 is mounted, as viewed from the front, which shows a cross-sectional construction of the filter holder 400 including a color filter 401, and a detection system of the filter determination section 324. The color filter 401 is used for changing color characteristics of transmitted light, and by mounting the filter holder 400 holding the color filter 401 on the light emission section 350, it is possible to change color characteristics of light emitted from the light emission section 350. Note that the filter holder 400 can have one of filters of respective various kinds of colors attached thereto, as the color filter 401, and by changing a filter to be attached to the filter holder 400, it is possible to variously change color characteristics of light emitted from the light emission section 350.

In FIG. 2, the filter determination section 324 includes a detection light source 402, a color sensor 403, and a reflection section 404. The detection light source 402 is e.g. a white LED, and emits light for color filter determination. The color sensor 403 includes, for example, a plurality of photodiodes, not shown, and a plurality of color filters 401 which are attached to the photodiodes, respectively, and are different in spectral characteristics from each other. The reflection section 404 is a prism for reflecting detection light emitted from the detection light source 402 by first and second reflection surfaces 404a and 404b thereof to cause the reflected light to enter the color sensor 403, and functions as a light guide section which guides the light emitted from the detection light source 402 to the color sensor 403.

When the filter holder 400 is mounted on the light emission section 350, the filter holder detection section 322 as a switch, appearing in FIG. 1, is switched on. When the filter holder detection section 322 is switched on, a color filter identification sequence, described hereinafter, is started, and light emitted from the detection light source 402 transmits through the color filter 401. The light transmitted through the color filter 401 has its color characteristics changed according to the spectral characteristics of the color filter 401. Then, the light transmitted through the color filter 401 is reflected twice by the first and second reflection surfaces 404a and 404b of the reflection section (prism) 404, transmits through the color filter 401 again, and is then irradiated on the color sensor 403 (i.e. photodiode).

The strobe microcomputer 310 identifies the color filter type, based on the light entering the color sensor 403, according to the spectral characteristics of the color filter, i.e. based on a detection signal output from the color sensor 403 according to the transmitted light. As described above, the color characteristics of the color filter 401 held by the filter holder 400 is determined using the detection light source 402 and the color sensor 403, and hence it is possible to determine information on the color characteristics of the color filter irrespective of the direction of attachment of the color filter 401 (e.g. which surface thereof is directed toward the light emission section 350).

Figure 3:
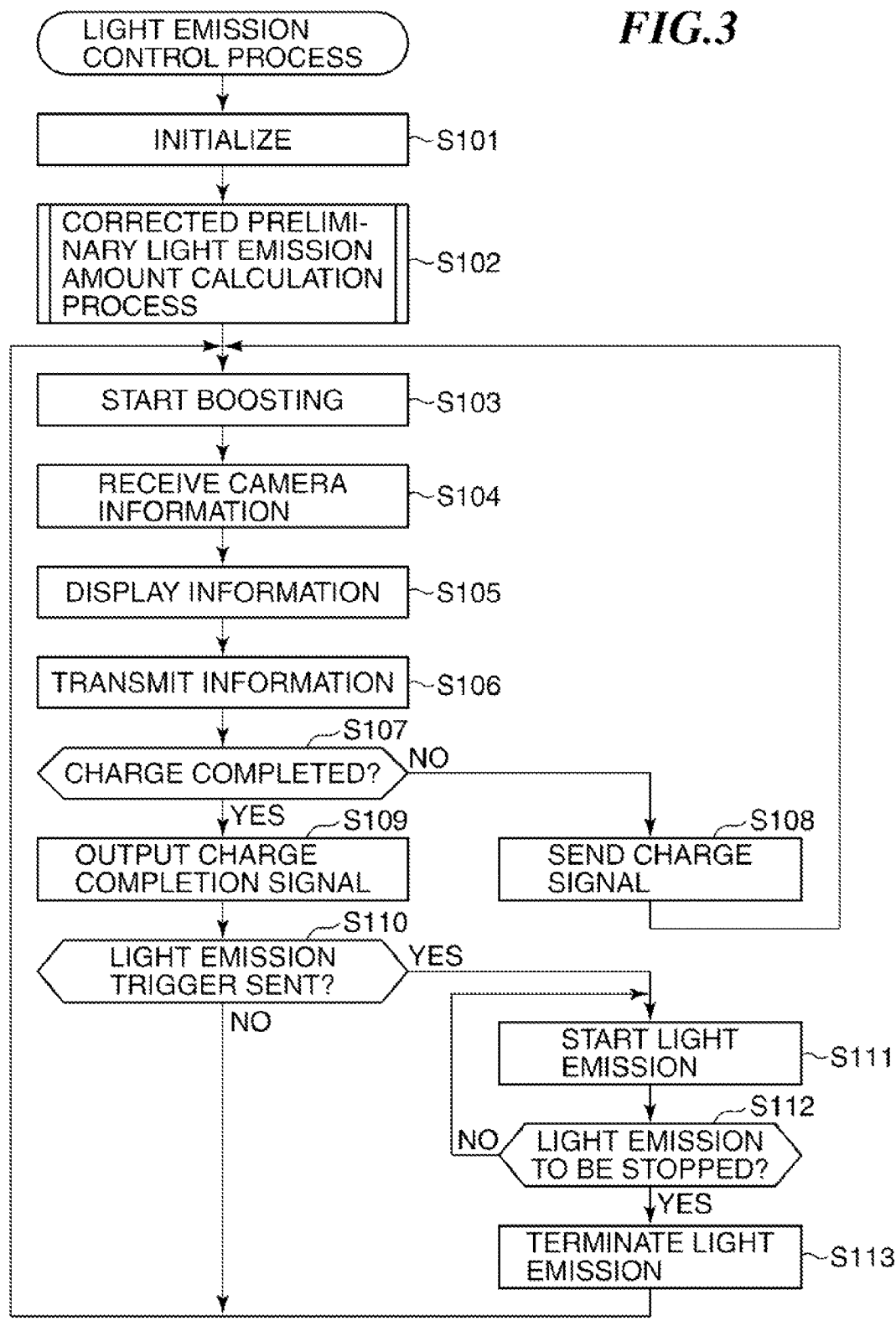
FIG. 3 is a flowchart of a process for controlling light emission from the illumination device appearing in FIG. 1.

FIG. 3 is a flowchart of a process for controlling light emission from the strobe 300 appearing in FIG. 1. The control associated with the light emission operation shown in FIG. 3 is executed by the strobe microcomputer 310.

Now, when a power switch (not shown) is turned on to make the camera microcomputer 101 of the camera body 100 operable, the strobe microcomputer 310 initializes a memory and a port (not shown) (step S101). Further, the strobe microcomputer 310 reads a status of each switch on the input section 320 and input information set in advance, and performs setting of a strobe shooting mode, a light emission amount, and so forth. Further, when the strobe information is sent from the camera microcomputer 101 via the interface communication line SC, the strobe microcomputer 310 receives the strobe information. Then, the strobe microcomputer 310 stores the strobe information in a built-in RAM (not shown).

Then, the strobe microcomputer 310 performs detection of the color filter. When the color filter has been detected, the strobe microcomputer 310 calculates a reduced light amount G of the strobe flash light according to the type of the color filter. Then, the strobe microcomputer 310 calculates a corrected preliminary light emission amount H obtained by reflecting the reduced light amount G on a preliminary light emission amount O (step S102).

As described above, detection of whether or not the filter holder has been mounted is performed by the filter holder detection section 322, and if the filter holder detection section 322 is on, the strobe microcomputer 310 executes the step S102.

Figure 4:
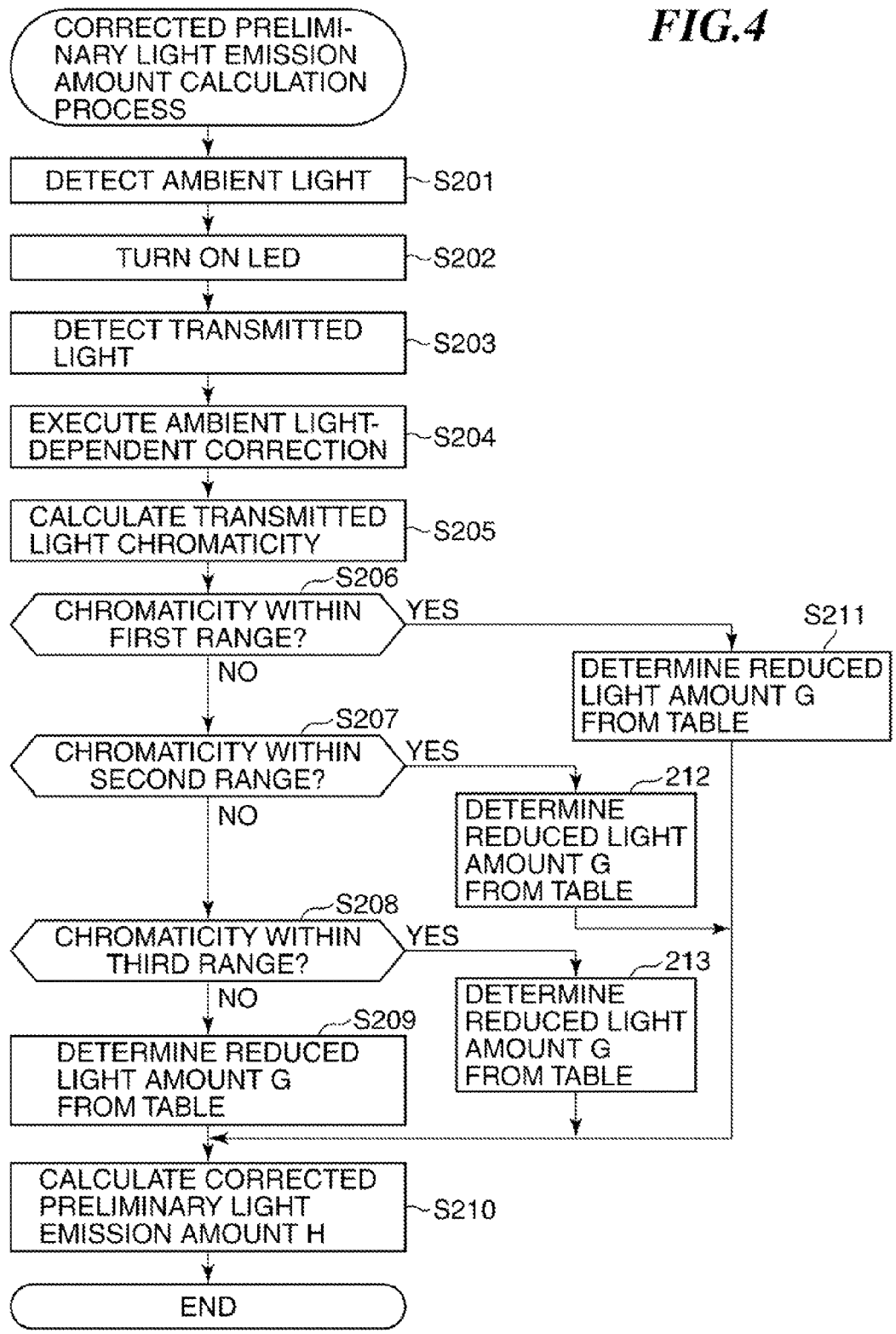
FIG. 4 is a flowchart of a corrected preliminary light emission amount calculation process executed in the process in FIG. 3.

FIG. 4 is a flowchart of a corrected preliminary light emission amount calculation process executed in the step S102 of the process in FIG. 3.

The strobe microcomputer 310 performs detection of ambient light (environmental light) via the color sensor 403 in a state in which the detection light source 402 is not caused to emit light (step S201). The color sensor 403 outputs information corresponding to so-called three primary colors. Now, it is assumed that when the ambient light is received, the color sensor 403 outputs three-primary-color information (rn, gn, bn) as a result of reception of the ambient light.

Then, the strobe microcomputer 310 causes the detection light source 402 to be lit (step S202), and receives light transmitted through the color filter 401 by the color sensor 403. The color sensor 403 detects the transmitted light, and outputs three-primary-color information (rs, gs, bs) as results of reception of the light when detection light source 402 is lit (step S203).

The strobe microcomputer 310 performs ambient light correction in which the three-primary-color information (rn, gn, bn) obtained from the ambient light alone is subtracted from the three-primary-color information (rs, gs, bs) obtained during strobe light emission (lighting of detection light source 402), regarding the three-primary-color information (rn, gn, bn) obtained from the ambient light alone, i.e. ambient light chromaticity information (environmental light chromaticity information) and ambient light lightness information as noise (step S204). The strobe microcomputer 310 performs subtraction expressed by equations (1A) to (1C) to calculate corrected three-primary-color information (rc, gc, bc), i.e. corrected lightness information and corrected chromaticity information.

$$rc = rs - rn \tag{1A}$$

$$gc = gs - gn \tag{1B}$$

$$bc = bs - bn \tag{1C}$$

Then, the strobe microcomputer 310 calculates color information (Br, Cx, Cy) of the transmitted light through the color filter 401, based on the corrected three-primary-color information (rc, gc, bc), by the following equation (2) (step S205).

$$\begin{bmatrix} Br \\ Cx \\ Cy \end{bmatrix} = \begin{bmatrix} M11, M12, M13 \\ M21, M22, M23 \\ M31, M32, M33 \end{bmatrix} * \begin{bmatrix} rc \\ gc \\ bc \end{bmatrix} \tag{2}$$

In this equation, by properly selecting the coefficients of M11 to M33, the corrected three-primary-color information (rc, gc, bc) can be converted to a lightness value (lightness information) Br indicative of lightness of the transmitted light, and chromaticity coordinate values (chromaticity information: transmitted light chromaticity information) Cx and Cy, which express chromaticity of the transmitted light by two axes (x-y chromaticity diagram).

FIG. 5 is a diagram showing an example of chromaticity coordinate values Cx and Cy determined when an orange-colored color filter is used which is most commonly used as the color filter 401 appearing in FIG. 2.

In FIG. 5, as the value of the chromaticity information of the transmitted light increases, the orange color becomes darker. As a result, the reduced light amount G increases. Further, in the example shown in FIG. 5, X11, X12, X21, X22, X31, and X32 are defined as values of the chromaticity coordinate value Cx, and Y11, Y12, Y21, Y22, Y31, and Y32 are defined as values of the chromaticity coordinate value Cy. Further, a first range is defined such that the chromaticity coordinate value Cx is not smaller than X11 and not larger than X12, and the chromaticity coordinate value Cy is not smaller than Y11 and not larger than Y12.

Similarly, a second range is defined such that the chromaticity coordinate value Cx is not smaller than X21 and not larger than X22, and the chromaticity coordinate value Cy is not smaller than Y21 and not larger than Y22. Further, a third range is defined such that the chromaticity coordinate value Cx is not smaller than X31 and not larger than X32, and the chromaticity coordinate value Cy is not smaller than Y31 and not larger than Y32.

FIG. 6 is a diagram showing an example of a reduced light emission amount table stored in the strobe microcomputer 310, appearing in FIG. 1, in advance, which is information associating information on color characteristics of light transmitted through the color filter with information on characteristics of the color filter (information on transmission characteristics).

In FIG. 6, the reduced light emission amount table sets the chromaticity coordinate values Cx and Cy, and the reduced light amount G. For the chromaticity coordinate values Cx and Cy, the above-mentioned first to third ranges are set, and the other range of Cx and Cy than the above is also set. Further, the reduced light amount G is set to "−0.2F", "−0.5F", "−1.0F", and "0" in association with the chromaticity coordinate values Cx and Cy. F represents a degree of change in light amount with reference to a light emission reference amount, and for example, a degree of reduction of light amount from the light emission reference amount by one half (called "one step down") is represented as −1.0F. Note that as will be described hereinafter, the light emission reference amount corresponds to the maximum voltage of integrated voltage buffered in an operational amplifier (buffer amplifier) 43, referred to hereinafter, and is indicated by a voltage value, and the reduced light emission amount is also indicated by a voltage value.

Referring again to FIG. 4, after calculating the chromaticity coordinate values Cx and Cy as mentioned above, the strobe microcomputer 310 determines, by consulting the reduced light emission amount table, whether or not the chromaticity coordinate values Cx and Cy are within the first range (step S206).

If the chromaticity coordinate values Cx and Cy are not within the first range (NO to the step S206), the strobe microcomputer 310 determines, by consulting the reduced light emission amount table, whether or not the chromaticity coordinate values Cx and Cy are within the second range (step S207). If the chromaticity coordinate values Cx and Cy are not within the second range (NO to the step S207), the strobe microcomputer 310 determines, by consulting the reduced light emission amount table, whether or not the chromaticity coordinate values Cx and Cy are within the third range (step S208).

If the chromaticity coordinate values Cx and Cy are not within the third range (NO to the step S208), the strobe microcomputer 310 determines that the chromaticity coordinate values Cx and Cy are out of the first to third ranges, and sets the reduced light amount G to "0" according to the reduced light emission amount table (step S209). The strobe microcomputer 310 calculates the corrected preliminary light emission amount H based on the reduced light amount G and the preliminary light emission amount O by the following equation (3) (step S210):

$$H=O\times 2^G \quad (3)$$

Then, the strobe microcomputer 310 terminates the corrected preliminary light emission amount calculation process, and proceeds to a step S103 shown in FIG. 3. Note that the preliminary light emission amount information indicative of the preliminary light emission amount O indicates a preliminary light emission amount when the color filter is not attached, and has been stored in the ROM or the EEPROM of the strobe microcomputer 310 in advance.

In the step S206, if the chromaticity coordinate values Cx and Cy are within the first range (YES to the step S206), the strobe microcomputer 310 sets the reduced light amount G to "−0.2F" according to the reduced light emission amount table (step S211). Then, the strobe microcomputer 310 proceeds to the step S210.

Further, in the step S207, if the chromaticity coordinate values Cx and Cy are within the second range (YES to the step S207), the strobe microcomputer 310 sets the reduced light amount G to "−0.5F" according to the reduced light emission amount table (step S212). Then, the strobe microcomputer 310 proceeds to the step S210. Similarly, in the step S208, if the chromaticity coordinate values Cx and Cy are within the third range (YES to the step S208), the strobe microcomputer 310 sets the reduced light amount G to "−1.0F" according to the reduced light emission amount table (step S213). Then, the strobe microcomputer 310 proceeds to the step S210.

Although in the flowchart shown in FIG. 4, the orange-color filter has been described as the color filter, by way of example, the reduced light emission amount table may be provided for each type of the color filter. Then, the color filter type is identified to thereby make it possible to determine the reduced light amount G for the various types of the color filter.

Referring again to FIG. 3, after the corrected preliminary light emission amount H has been calculated as described above, in the step S103, the strobe microcomputer 310 starts the operation of the booster circuit 302 so as to get ready for light emission (step S103). Then, the strobe microcomputer 310 receives camera information including focal length information of the lens, light emission mode information, and so forth, from the camera microcomputer 101 via the interface signal line SC (step S104). Then, the strobe microcomputer 310 displays the strobe information stored in the built-in memory on the display section 321 (step S105). Note that the strobe information includes information on the above-described corrected preliminary light emission amount H which is the information on the characteristics of the attached color filter.

Next, the strobe microcomputer 310 outputs the strobe information to the camera microcomputer 101 via the interface signal line SC (step S106). The camera microcomputer 101 calculates the main light emission amount (light emission amount calculated value) according to the corrected preliminary light emission amount H included in the strobe information. Then, the camera microcomputer 101 gives the light emission amount calculated value to the strobe microcomputer 310, and the light emission amount calculated value is converted to a digital-to-analog converted value in the strobe microcomputer 310. Note that the digital-to-analog converted value is output from the digital-to-analog converter output terminal (d terminal) of the strobe microcomputer 310, whereby it is applied to the non-inverting input terminal of the comparator 312.

Then, the strobe microcomputer 310 determines whether or not the voltage boosted by the booster circuit 302 has reached the voltage level necessary for light emission from the discharge tube 307 (whether the charging is completed) (step S107). If the voltage boosted by the booster circuit 302 has not reached the voltage level necessary for light emission from the discharge tube 307 (NO to the step S107), the strobe microcomputer 310 notifies the camera microcomputer 101 that the strobe is not ready for light emission by sending a charge incompletion signal thereto. Then, the strobe microcomputer 310 sends a charge signal to the booster circuit 302 so as to further perform charging (step S108), and returns to the step S103.

When the voltage boosted by the booster circuit 302 has reached the voltage level necessary for light emission from the discharge tube 307 (YES to the step S107), the strobe microcomputer 310 notifies the camera microcomputer 101 that the strobe is ready for light emission by sending a charge completion signal thereto (step S109). Then, the strobe microcomputer 310 determines whether or not an emission start signal (light emission trigger) has been sent from the camera microcomputer 101 (step S110).

If the light emission trigger has not been sent (NO to the step S110), the strobe microcomputer 310 returns to the step S103. On the other hand, if the light emission trigger has been sent (YES to the step S110), the strobe microcomputer 310 outputs an emission start signal (of a high (Hi) level) from the light emission control terminal (c terminal) to the AND gate 311.

As described hereinabove, the comparator 312 has the non-inverting input connected to the digital-to-analog converter output terminal (d terminal) of the strobe microcomputer 310, from which the above-mentioned digital-to-analog converted value is output, while the output from the integration circuit 309 applied to the inverting input terminal of the comparator 312 is approximately equal to zero, so that the output from the comparator 312 becomes the high level. As a result, the output from the AND gate 311 becomes the high level, and a light emission trigger signal is given from the AND gate 311 to the light emission control circuit 308. As a consequence, the light emission control circuit 308 causes the discharge tube 307 to emit light. That is, the light emission control circuit 308 starts light emission from the strobe (step S111).

When the light emission from the strobe is started, the light emitted from the discharge tube 307 is received by the photodiode 323 directly or via a glass fiber (not shown). The integration circuit 309 integrates the received light current as the output from the photodiode 323, and gives the output (integrated value) to the non-inverting input terminal of the comparator 312 and the analog-to-digital converter input terminal (d terminal) of the strobe microcomputer 310.

The strobe microcomputer 310 compares the total amount (integration level) of received light obtained by subjecting the integrated value to analog-to-digital conversion with the digital-to-analog converted value (reference level), and determines whether or not to stop light emission (step S112). If the total amount of received light is less than the digital-to-analog converted value (NO to the step S112), the strobe microcomputer 310 determines to continue light emission, and waits. On the other hand, if the total amount of received light reaches the digital-to-analog converted value (YES to the step S112), the strobe microcomputer 310 determines to stop light emission.

In this case, the digital-to-analog converted value corresponding to a light amount determined according to the light emission amount calculated value is applied from the d terminal to the non-inverting input terminal of the comparator 312, and hence the output from the comparator 312 becomes a low (Lo) level. As a result, the output from the AND gate 311 becomes a low level. That is, a light emission stop signal is provided from the AND gate 311 to the light emission control circuit 308, and then the light emission control circuit 308 stops light emission from the discharge tube 307 (step S113: terminate light emission).

Note that when the strobe microcomputer 310 has determined to stop light emission, the strobe microcomputer 310 stops the output of the emission start signal. Thereafter, the strobe microcomputer 310 returns to the step S103.

Figure 7:
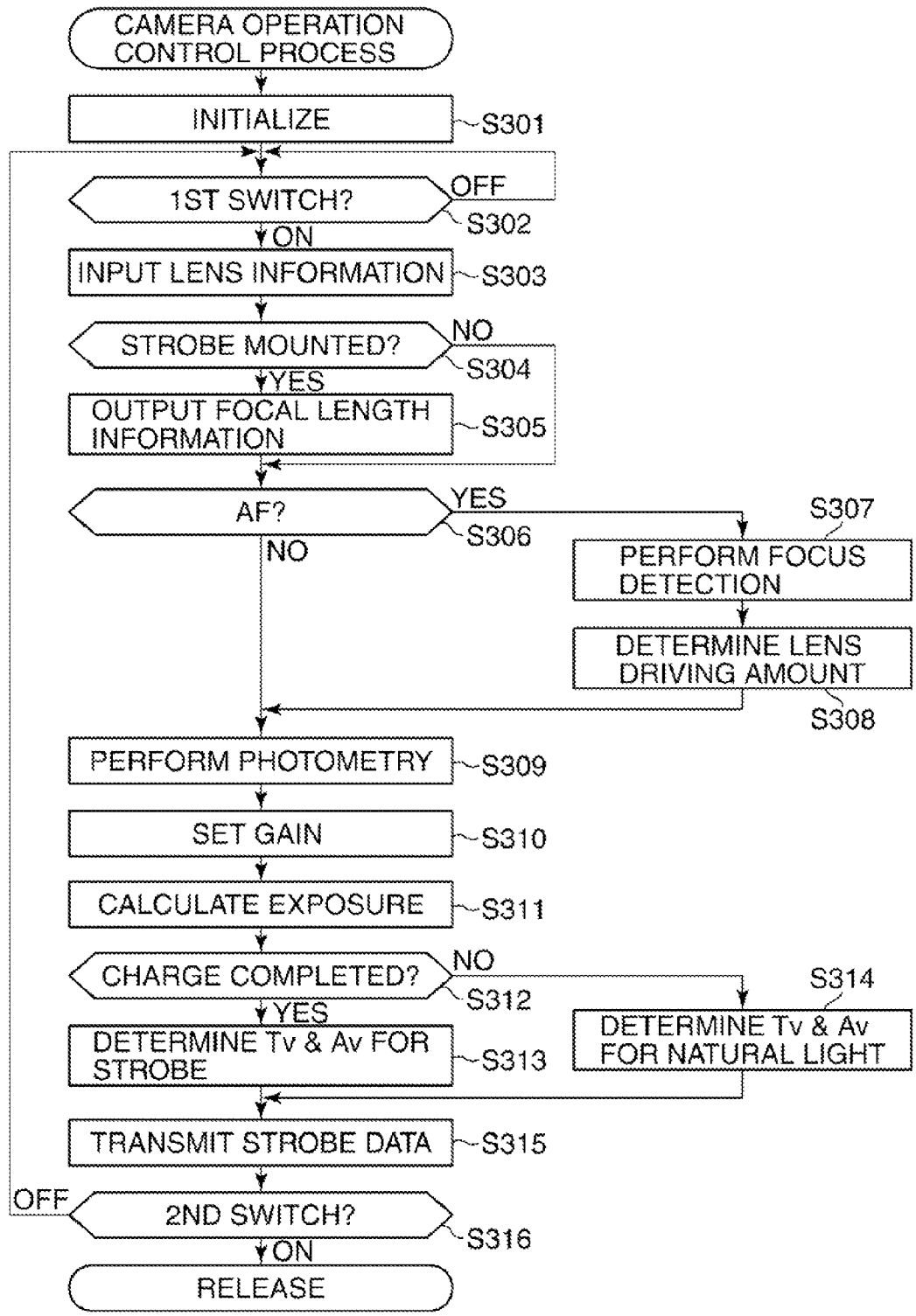
FIG. 7 is a flowchart of a camera operation control process executed by a camera microcomputer appearing in FIG. 1.

FIG. 7 is a flowchart of a camera operation control process executed by the camera microcomputer 101 appearing in FIG. 1.

Now, when the power switch (not shown) is turned on, the camera microcomputer 101 becomes operable. When the camera microcomputer 101 becomes operable, the camera microcomputer 101 initializes a built-in memory port (step S301), and reads the status of each switch input from the input unit 112 and the input information set in advance. Then, the camera microcomputer 101 configures the settings of the shooting mode, such as a shutter speed determination method and an aperture determination method.

Then, the camera microcomputer 101 determines whether or not a shutter button (not shown) is half-pressed (whether or not a first switch, not shown, is on) (step S302). If the first switch is off (OFF in the step S302), the camera microcomputer 101 waits. Note that the first switch is a switch which turns on when the shutter button is half-pressed.

If the first switch is on (ON in the step S302), the camera microcomputer 101 communicates with the lens microcomputer 201 of the lens unit 200 via the interface signal line SC. Then, the camera microcomputer 101 acquires the focal length information on the lens unit 200 and the optical information necessary for ranging and photometry (hereinafter collectively referred to as the lens information) (step S303).

Then, the camera microcomputer 101 checks whether or not the strobe 300 has been mounted on the camera body 100 (step S304). If the strobe 300 has been mounted on the camera body 100 (YES to the step S304), the camera microcomputer 101 sends the focal length information to the strobe microcomputer 310 via the interface signal line SC (step S305).

This causes the strobe microcomputer 310 to drivingly control a motor drive circuit (not shown) based on the focal length information, and control the irradiation angle of the strobe according to detection results from an encoder (not shown). Further, the camera microcomputer 101 sends an instruction to the strobe microcomputer 310 to cause outputting of information on the strobe stored in the built-in memory. Then, the strobe microcomputer 310 outputs the strobe information to the camera microcomputer 101. The data of the strobe information includes information indicative of the current light emission mode and information on the charging of the main capacitor.

Then, the camera microcomputer 101 determines whether or not the shooting mode is a mode for performing an auto-focus detection operation (AF mode) (step S306). Note that if the strobe 300 has not been mounted on the camera body 100 (NO to the step S304), the camera microcomputer 101 directly proceeds to the step S306.

If the shooting mode is the AF mode (YES to the step S306), the camera microcomputer 101 performs focus detection by a so-called phase difference detection method using the focus detection circuit 107 (step S307). At this time, one of the focusing points is set as a selected one for use in focus detection according to an input from the input unit 112 or according to the shooting mode. Alternatively, the focusing point for use may be determined using an automatic selection algorithm based on near-point priority.

Then, the camera microcomputer 101 determines a lens driving amount based on the focus detection results from the focus detection circuit 107 (step S308). Then, the camera microcomputer 101 sends the lens driving amount to the lens microcomputer 201. The lens microcomputer 201 controls the lens drive unit 203 according to the lens driving amount to drive the lens group 202 to an in-focus position. When the lens group 202 is placed in the in-focus state, the lens microcomputer 201 obtains information on an object distance D indicative of a distance to an object existing at the focusing point by the encoder 204, and sends the obtained information on the object distance D to the camera microcomputer 101.

Then, the camera microcomputer 101 divides the image into a plurality of areas (e.g. 12 areas), and determines an object luminance value on an area-by-area basis by the photometry circuit 106 (step S309). If the shooting mode is not the AF mode (NO to the step S306), i.e. if the shooting mode is an MF mode, the camera microcomputer 101 directly proceeds to the step S309.

Next, the camera microcomputer 101 performs gain setting by the gain switching circuit 108 according to a gain set from the input unit 112 (step S310). For example, the gain setting is setting of ISO sensitivity. Further, the camera microcomputer 101 sends information on the gain setting to the strobe microcomputer 310.

Then, the camera microcomputer 101 determines an exposure value EVs according to an object luminance value EVb determined for each of the plurality of areas (step S311). Then, the camera microcomputer 101 determines whether or not the strobe microcomputer 310 has output the charge completion signal (step S312). Then, the camera microcomputer 101 stores the determination result (charge determination result) in the built-in memory.

If the strobe microcomputer 310 has output the charge completion signal (YES to the step S312), the camera microcomputer 101 determines, based on the object luminance value, a shutter speed Tv and an aperture value Av suitable for shooting with the strobe flash light (step S313). On the other hand, if the strobe microcomputer 310 has not output the charge completion signal (NO to the step S312), the camera microcomputer 101 determines, based on the object luminance value, a shutter speed Tv and an aperture value Av suitable for shooting with natural light (step S314).

After execution of the step S313 or S314, the camera microcomputer 101 sends the other information on the strobe to the strobe microcomputer 310 (step S315). Then, the camera microcomputer 101 determines whether or not the shutter button is fully pressed (whether or not a second switch, not shown, is on) (step S316). If the second switch is off (OFF in the step S316), the camera microcomputer 101 returns to the step S302. If the second switch is on (ON in the step S316), the camera microcomputer 101 proceeds to a release process, described hereafter. Note that the second switch is a switch which turns on when the shutter button is fully pressed.

Figure 8:
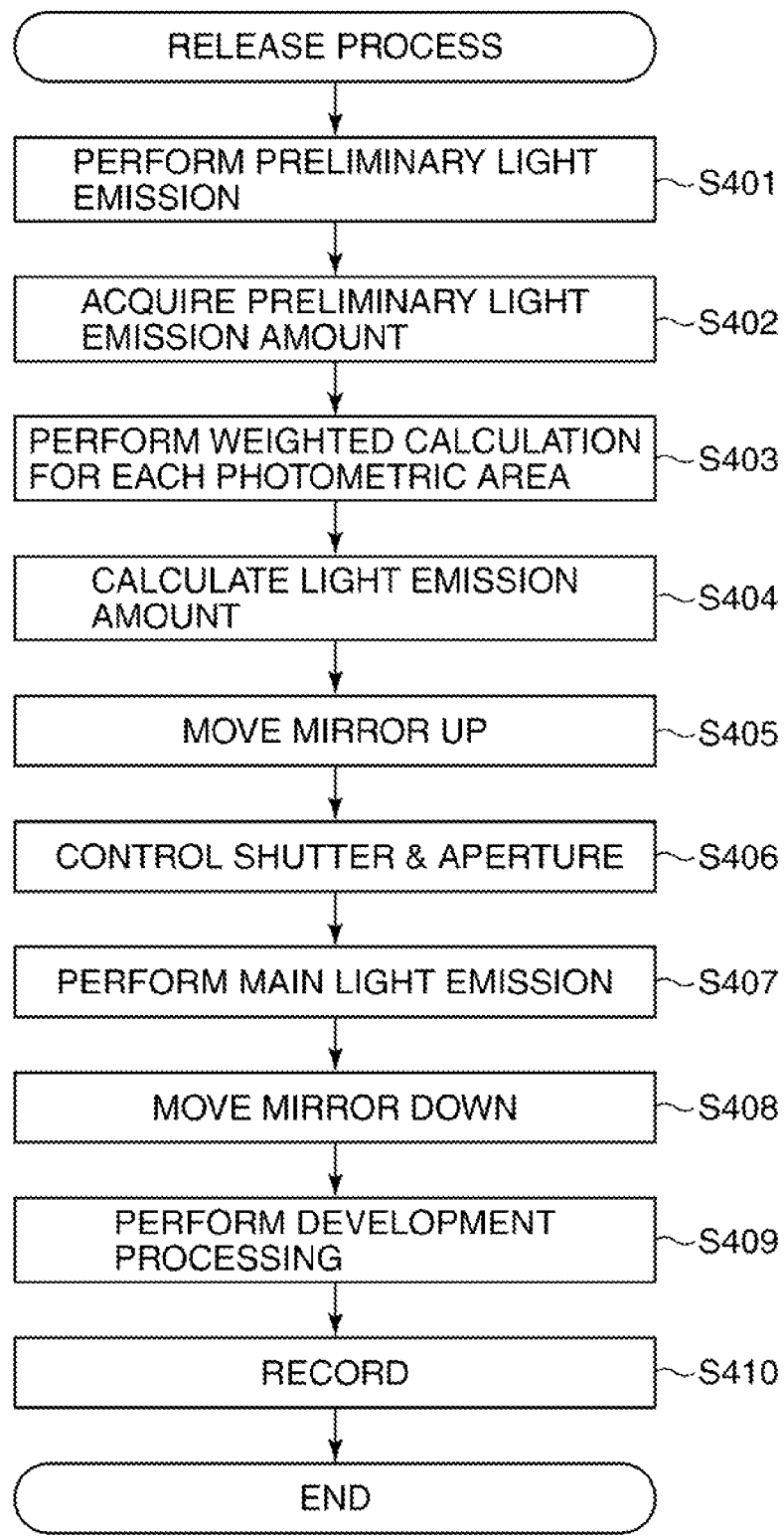
FIG. 8 is a flowchart of a release process executed in a case where the illumination device is mounted.

FIG. 8 is a flowchart of the release process executed by the camera microcomputer 101 according to an release operation in the case where the strobe has been mounted.

When the second switch is on, in the case where the strobe 300 has been mounted, the camera microcomputer 101 performs preliminary light emission by the strobe microcomputer 310 so as to acquire the luminance information on the object. Then, the camera microcomputer 101 determines an object luminance value (photometric value) for each of the plurality of areas (photometric areas) by the photometry sensor (step S401). Then, the camera microcomputer 101 acquires the above-described corrected preliminary light emission amount H from the strobe microcomputer 310 (step S402).

The camera microcomputer 101 performs weighted calculation for each photometric area (step S403). At this time, the camera microcomputer 101 calculates a reference photometric value FR based on the preliminary light emission, according to the corrected preliminary light emission amount H and the object distance D e.g. by the following equation (4):

$$FR = -\log_2(D) \times 2 + H \quad (4)$$

Note that the reference photometric value FR indicates an expected value of a photometric value to be determined using the photometry sensor in a case where the preliminary light emission amount is equal to the corrected preliminary light emission amount H assuming that the object is at the object distance D and has a normal reflectivity. That is, assuming that the object existing in each area has a normal reflectivity, an area having a photometric value closer to the reference photometric value FR has a distance to the object, which is closer to the object distance D to the main object existing at the focusing point. Therefore, based on respective photometric values determined of the plurality of areas, as an area has a photometric value closer to the reference photometric value FR, the camera microcomputer 101 assigns a larger weight thereto. On the other hand, as an area has a photometric value farther from the reference photometric value FR, the camera microcomputer 101 assigns a smaller weight thereto. By thus performing weighting of the photometric values determined by the preliminary light emission, a weighed calculated value of the photometric value of the image in its entirety is calculated using the weighted photometric values of the respective areas. The weighted calculated value of the photometric value of the image in its entirety thus obtained makes it possible to calculate an appropriate main light emission amount for the main object and objects close to the main object.

Then, the camera microcomputer 101 calculates the main light emission amount according to the weighted calculated value at the time of the preliminary light emission, the shutter speed, and the aperture value (step S404). The calculation of the main light emission amount is known, and hence description thereof is omitted.

Next, the camera microcomputer 101 moves up the main mirror 104 before executing exposure-related operations, and causes the main mirror 104 to retract from the photographic optical path (step S405). Then, the camera microcomputer 101 sends a command to the lens microcomputer 201 so as to set the aperture value to an aperture value Av according to the determined exposure value EVs. Further, the camera microcomputer 101 controls the shutter 103 via a shutter control circuit (not shown) so as to set the shutter speed to the determined shutter speed Tv, (step S406).

Then, the camera microcomputer 101 provides a light emission command signal for the main light emission to the strobe microcomputer 310 via the interface communication signal line SC in synchronism with the full opening of the shutter 103 (step S407). By receiving the light emission command signal, the strobe 300 performs light emission.

When a sequence of the exposure-related operations described above is terminated, the camera microcomputer 101 moves down the main mirror 104 which has been retracted from the photographic optical path to dispose the same in the photographic optical path again (step S408).

Next, the camera microcomputer 101 reads an image signal from the image pickup device 102, amplifies the image signal by a gain set by the gain switching circuit 108, and provides the amplified image signal to the analog-to-digital converter 109. Then, the digital signal (pixel data) output from the analog-to-digital converter 109 is subjected to predetermined signal processing, such as white balance adjustment, by the digital signal processing circuit 111 (step S409: development processing). Thereafter, the camera microcomputer 101 stores the image data in a memory, not shown, and terminates the routine of shooting one image.

As described above, in the first embodiment of the present invention, the corrected preliminary light emission amount is calculated according to the transmission characteristics of the color filter attached to the strobe, and hence it is possible to properly control exposure even when the color filter is attached.

The method of acquiring the transmission characteristics of the color filter attached to the strobe is not limited to the above-described one, but for example, the transmission characteristics of the color filter may be acquired based on a table stored in advance, which associates the color filter type with the transmission characteristics (e.g. transmittance), and a result of identification of a color filter type. As the method of identifying a color filter type, there may be employed a method described in Japanese Patent Laid-Open Publication No. 2009-20298, for example.

Further, the table shown in FIG. 6 is stored in the ROM or EEPROM of the camera body 100, and the camera microcomputer 101 may determine the reduced light emission amount based on information sent from the strobe to thereby calculate the corrected preliminary light emission amount.

Next, a description will be given of an example of an image pickup apparatus on which an illumination device according to a second embodiment of the present invention is mounted. Note that the image pickup apparatus according to the second embodiment has the same configuration as that of the image pickup apparatus shown in FIG. 1. Further, the second embodiment is distinguished from the first embodiment in the calculation of the corrected preliminary light emission amount described with reference to FIG. 4.

Figure 9:
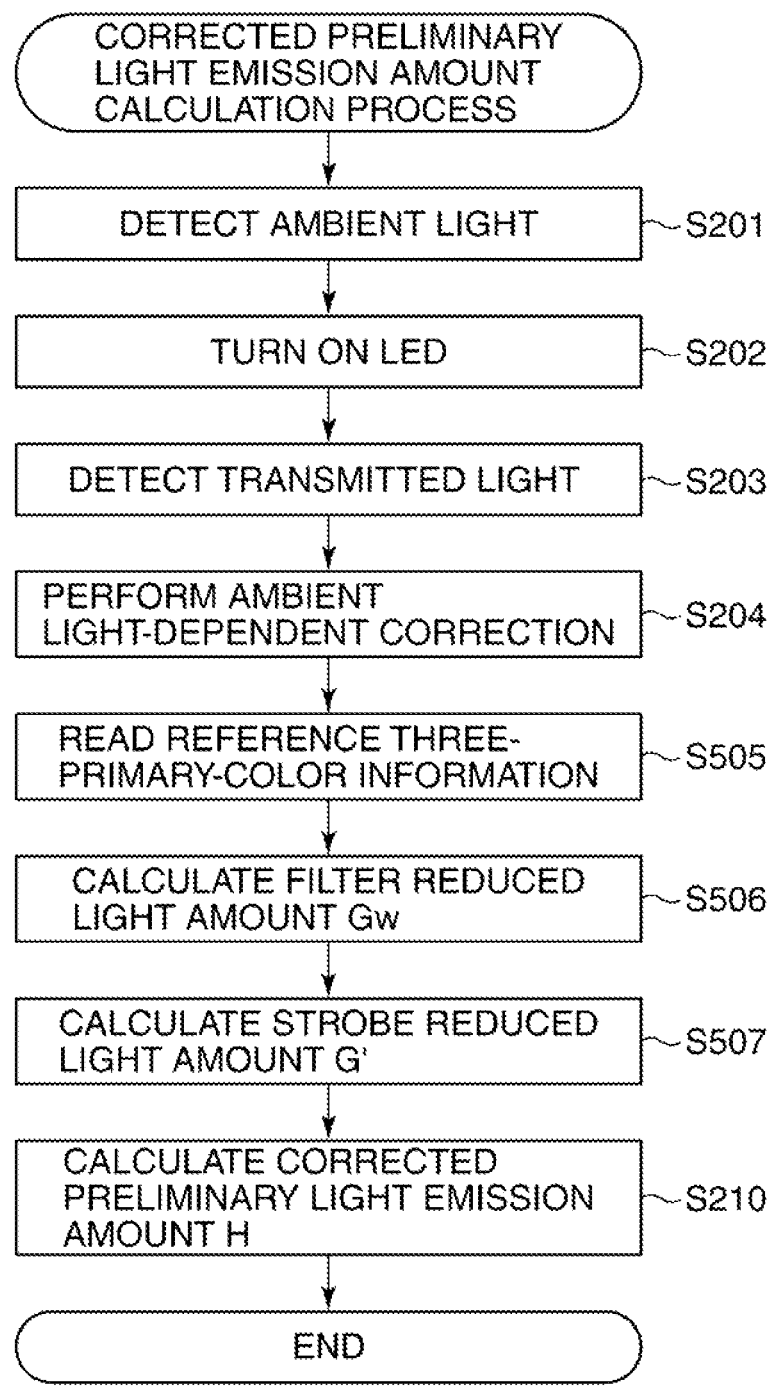
FIG. 9 is a flowchart of a corrected preliminary light emission amount calculation process executed by an image pickup apparatus according to a second embodiment of the present invention.

FIG. 9 is a flowchart of a corrected preliminary light emission amount calculation process executed by the image pickup apparatus according to the second embodiment. In FIG. 9, the same steps as those in FIG. 4 are denoted by the same step numbers, and description thereof is omitted.

The built-in memory of the strobe microcomputer 310 stores predetermined three-primary-color information (three-primary-color information in a case where a color filter is not attached) as reference three-primary-color information (r0, g0, b0). The reference three-primary-color information (r0, g0, b0) is three-primary-color information obtained, in a state of the image pickup apparatus without a color filter, by receiving light from the detection light source 402 at the color sensor 403 and executing the step S204 appearing in FIG. 4.

After executing the step S204, the strobe microcomputer 310 reads the reference three-primary-color information (r0, g0, b0) stored in the built-in memory (step S505). Then, the strobe microcomputer 310 calculates a reduced light amount Gw in the following manner (step S506).

For example, the strobe microcomputer 310 calculates chromaticity information (Brc, Cxc, Cyc) of the transmitted light through the color filter 401 by an equation (5) based on the corrected three-primary-color information (rc, gc, bc). Further, the strobe microcomputer 310 calculates chromaticity information (Br0, Cx0, Cy0) of light from the detection light source 402 based on the reference three-primary-color information (r0, g0, b0) by the following equation (6):

$$\begin{bmatrix} Brc \\ Cxc \\ Cyc \end{bmatrix} = \begin{bmatrix} M11, M12, M13 \\ M21, M22, M23 \\ M31, M32, M33 \end{bmatrix} * \begin{bmatrix} rc \\ gc \\ bc \end{bmatrix} \quad (5)$$

$$\begin{bmatrix} Br0 \\ Cx0 \\ Cy0 \end{bmatrix} = \begin{bmatrix} M11, M12, M13 \\ M21, M22, M23 \\ M31, M32, M33 \end{bmatrix} * \begin{bmatrix} r0 \\ g0 \\ b0 \end{bmatrix} \quad (6)$$

In this equation, by properly selecting M11 to M33, the corrected three-primary-color information (rc, gc, bc) and the reference three-primary-color information (r0, g0, b0) can be converted to the lightness values (lightness information) Brc and Br0 each indicative of lightness of the transmitted light. Further, the corrected three-primary-color information (rc, gc, bc) and the reference three-primary-color information (r0, g0, b0) can be converted to the chromaticity coordinate values (chromaticity information) Cxc, Cx0, Cyc, and Cy0, which express the chromaticity of the transmitted light by two axes (x-y chromaticity diagram).

Next, the strobe microcomputer 310 extracts the lightness components Brc and Br0 from the chromaticity information obtained as above. Then, the strobe microcomputer 310 calculates the filter reduced light amount Gw by the following equation (7):

$$Gw = \log_2(Brc/Br0) \quad (7)$$

In the step S506, the filter reduced light amount Gw is calculated based on the light from the detection light source 402, and hence it is different in value from the reduced light amount calculated based on the light emitted from the discharge tube 307. Therefore, the strobe microcomputer 310 corrects the filter reduced light amount Gw such that it becomes equal to the reduced light amount to be calculated based on the spectral characteristics of the discharge tube 307 to thereby determine a reduced light amount G' of the strobe flash light (reduced light emission amount: also referred to as the strobe reduced strobe light amount) (step S507).

In this step, the strobe microcomputer 310 calculates the strobe reduced light amount G' based on the filter reduced light amount Gw and the spectral characteristics of the discharge tube 307, the detection light source 402, and the color sensor 403.

Figure 10:
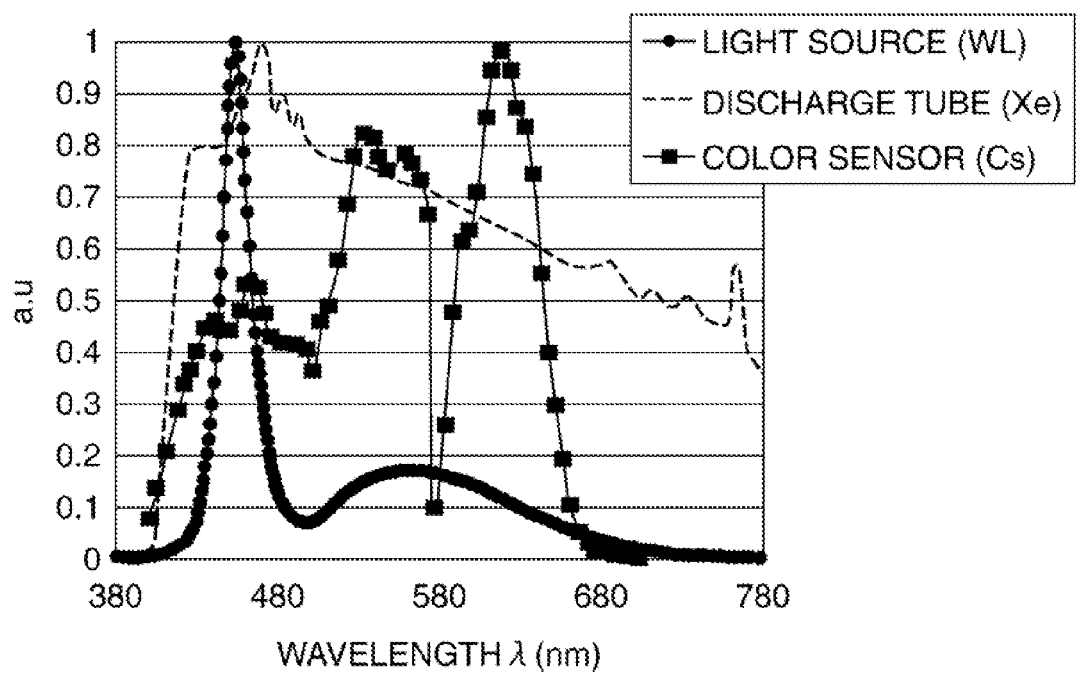
FIG. 10 is a diagram showing spectral characteristics of a discharge tube, a light source, and a color sensor, appearing in FIG. 1.

FIG. 10 is a diagram showing the spectral characteristics of the discharge tube 307 appearing in FIG. 1, and the detection light source 402 and the color sensor 403 appearing in FIG. 2.

As shown in FIG. 10, the light emitted from the discharge tube 307 is different in spectral characteristics from the light emitted from the detection light source 402. Therefore, in calculating the strobe reduced light amount G' due to attachment of the color filter, it is necessary to take into account the difference in spectral characteristics.

Now, it is assumed that a spectral coefficient of the discharge tube 307 is set to Xe, that of the detection light source 402 is set to WL, and that of the color sensor 403 is set to Cs. Further, a wavelength of light is assumed to be set to λ.

At this time, the strobe microcomputer 310 calculates the strobe reduced light amount G' based on the following equation (8):

$$G^5 = Gw + \log_2\{\int_{380}^{780}\{\{Xe(\lambda) \div WL(\lambda)\} \times Cs(\lambda)\} d\lambda\} \quad (8)$$

Then, the strobe microcomputer 310 calculates the corrected preliminary light emission amount H by the above equation (3) in the step S210, followed by terminating the calculation of the corrected preliminary light emission amount.

Although in the above-described embodiment, the strobe microcomputer 310 calculates the corrected preliminary light emission amount, the camera microcomputer 101 may calculate the corrected preliminary light emission amount according to the transmittance of the color filter. For example, information on the characteristics of the color filter necessary for calculation of the corrected preliminary light emission amount is transmitted from the strobe to the image pickup apparatus, whereby the camera microcomputer 101 may calculate the corrected preliminary light emission amount based on the information transmitted from the strobe. In this case, the camera microcomputer 101 may execute at least part of the steps S204, S505, S506, S507, and S210 according to the information transmitted from the strobe. For example, when the information on the amount of the strobe flash light to be reduced by the color filter is transmitted from the strobe as the information on the characteristics of the color filter, the step S210 is only required to be executed by the camera microcomputer 101.

As described above, in the second embodiment of the present invention as well, the transmittance of the color filter attached to the strobe is detected, and the corrected preliminary light emission amount is calculated according to the detected transmittance, and hence it is possible to properly control exposure also in the case where the color filter is attached.

Note that unless the reference photometric value FR is calculated based on the corrected preliminary light emission amount H, the photometric value calculated of an area where there exists an object the distance to which is close to the object distance D and which has a normal reflectivity becomes smaller by an amount reduced by the color filter. Therefore, the photometric value calculated of an area where there is an object the distance to which is much shorter than the object distance D or of an area where there is an object which has a high reflectivity becomes closer to the reference photometric value FR. For this reason, the weight assigned to such an area is set to be larger than it should be, which makes it impossible to calculate an appropriate main light emission amount for a main object.

To cope with this, instead of detecting the transmittance of the color filter attached to the strobe and calculating the corrected preliminary light emission amount according to the detected transmittance, each photometric value at the time of the preliminary light emission may be corrected according to the transmittance of the color filter. Alternatively, when the main light emission amount is calculated by determining a photometric value corresponding to an amount of reflected light produced in each area at the time of the preliminary light emission based on each photometric value determined by executing preliminary light emission and a corresponding photometric value determined without executing light emission, the photometric value corresponding to the amount of reflected light produced by the preliminary light emission may be corrected according to the transmittance of the color filter.

When each photometric value at the time of the preliminary light emission and the photometric value corresponding to each amount of reflected light produced by the preliminary light emission are corrected, the correction makes those photometric values equal to values to be obtained in the case where the color filter is not attached. Therefore, by determining a weight to be assigned to each photometric area based on the corrected photometric value, it is possible to increase the weight for each of areas where there exist the main object and objects close to the main object. However, if the main light emission amount is calculated by calculating an weighted calculated value of the photometric value of an image in its entirety using the corrected photometric values, a light emission amount is calculated which is appropriate for the main object and objects close to the main object in the case where the color filter is not attached. As a result, an amount of light reaching the object after being reduced by the color filter becomes smaller than the appropriate light amount. In view of this, when calculating the main light emission amount, it is necessary to calculate a weighted calculated value of the photometric value of the image in its entirety based on the photometric values at the time of the preliminary light emission and the photometric values corresponding to the amounts of reflected light produced by the preliminary light emission, before correction, using the weighted values determined based on the corrected photometric values. Alternatively, it is necessary to correct the main light emission amount calculated using the weighted calculated value of the photometric value of the image in its entirety determined based on the corrected photometric values, according to the transmittance of the color filter.

In the above case, the correction of each photometric value and the main light emission amount may be performed using the camera microcomputer 101, and the illumination device may transmit e.g. information on the transmission characteristics of the preliminary light emission due to the color filter, as the information on the characteristics of the attached color filter.

Further, an optical member may be used as an optical accessory that changes color characteristics of transmitted light by a single member insofar as it can change color characteristics of transmitted light and can be attached forward of the light emission section of the illumination device.

Figure 11:
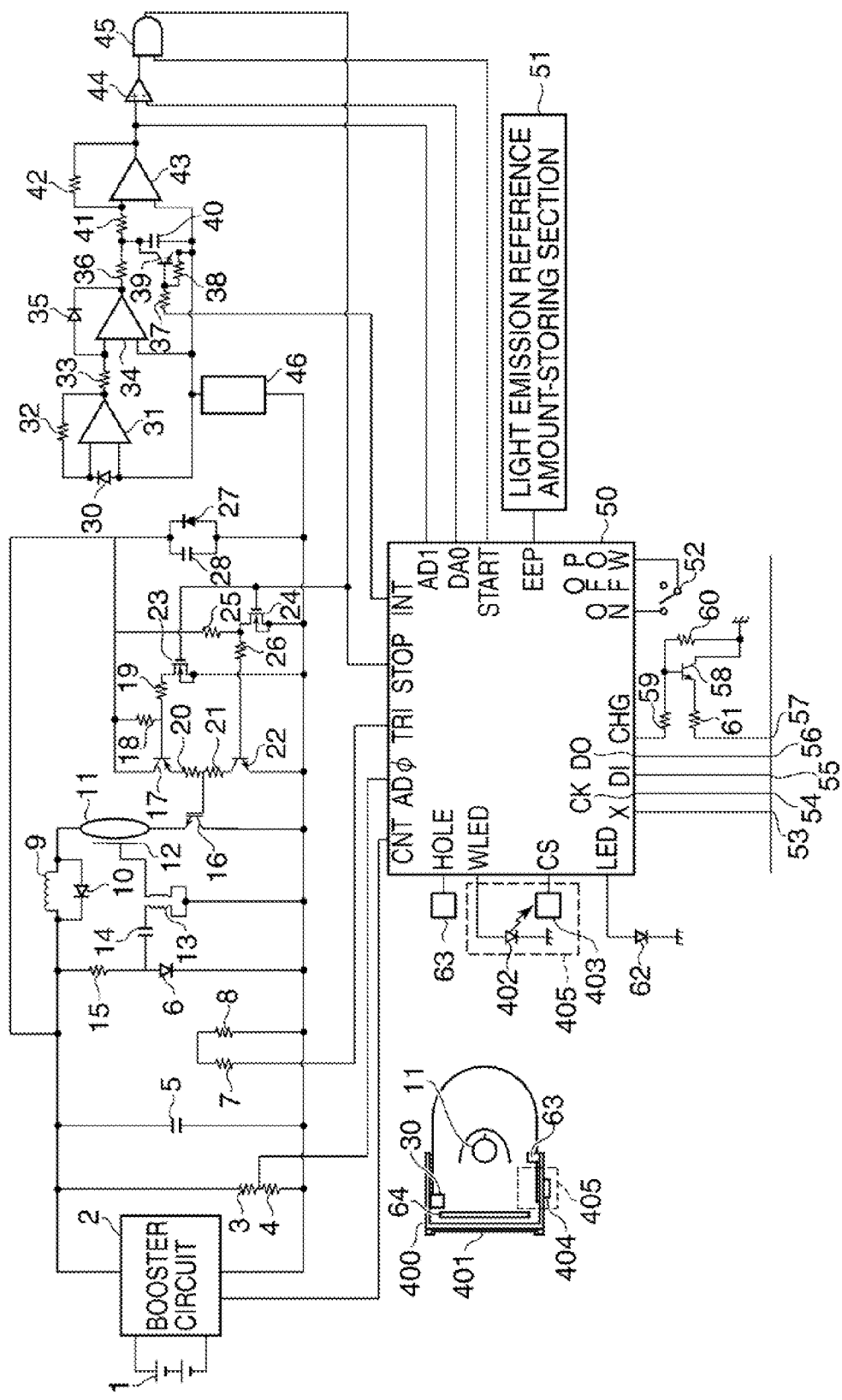
FIG. 11 is a circuit diagram of a light emission control device used in an illumination device according to a third embodiment of the present invention.

FIG. 11 is a circuit diagram of an example of an illumination device as a light emission control device according to a third embodiment of the present invention.

In FIG. 11, the light emission control device includes a power source (e.g. battery) 1, to which a booster circuit (e.g. DC/DC converter) 2 is connected. The booster circuit 2 boosts the battery voltage to a predetermined high voltage. A resistor unit formed by serially connecting resistors 3 and 4 is connected in parallel to the booster circuit 2, and further, a main capacitor 5 is connected in parallel to the resistor unit. The main capacitor 5 is charged with a predetermined amount of energy as an electric charge.

A resistor 8 is connected to the booster circuit 2, and is connected to a microcomputer 50 via a resistor 7. A resistor 15 and a thyristor 6, which are serially connected, are connected in parallel to the booster circuit 2. The thyristor 6 starts an emission trigger signal, referred to hereinafter.

Further, a coil 9 and a diode 10, which are connected in parallel, are connected to the booster circuit 2, and the coil 9 restricts the flow of electric current during light emission. The diode 10 discharges energy charged in the coil 9 when the light emission is stopped. Further, a xenon tube 11 as a light source is connected to the coil 9.

The xenon tube 11 is provided with a trigger electrode 12, which is connected to a trigger transformer 13. The trigger transformer 13 generates a trigger voltage for light emission from the xenon tube 11. Further, a trigger capacitor 14 is connected to a primary side of the trigger transformer 13, and the trigger capacitor 14 is connected to a connection point between the resistor 15 and the thyristor 6. The trigger capacitor 14 is electrically charged by the resistor 15.

As shown in FIG. 11, an IGBT (insulated gate bipolar transistor) 16 is connected to the xenon tube 11, and the xenon tube 11 is controlled by the IGBT 16 to perform light emission and stop the light emission. A PNP transistor 17 has an emitter thereof connected to a resistor 20, and the resistor 20 is connected to a collector of an NPN transistor 22 via a resistor 21. Further, a gate of the IGBT 16 is connected to a connection point between the resistors 20 and 21.

The PNP transistor 17 has a collector thereof connected to a, and the resistor 18 is connected to a base of the PNP transistor 17. Further, the base of the PNP transistor 17 is connected to a drain of an N channel FET 23 via a resistor 19. A source of the N channel FET 23 is connected to the booster circuit 2.

A base of the NPN transistor 22 is connected to a drain of an N channel FET 24 via a resistor 26, and the drain of the N channel FET 24 is connected to the collector of the PNP transistor 17. Further, a source of the N channel FET 24 is connected to the booster circuit 2, and a gate of the N channel FET 24 is connected to a gate of the N channel FET 23.

The drain of the N channel FET 24 is connected to the collector of the PNP transistor 17 via a transistor 25, and the collector of the PNP transistor 17 is also connected to a parallel circuit of a capacitor 28 and a zener diode 27. Further, this parallel circuit is connected to the booster circuit 2. The above-described circuit elements 17 to 15 form an IGBT driver circuit.

The zener diode 27 generates a gate voltage for turning on the IGBT 16. The capacitor 28 is used to stabilize the gate voltage.

The illustrated light emission control device is provided with the photometry sensor, denoted by reference numeral 30, which receives strobe flash light from the xenon tube 11 to monitor a light emission amount. The photometry sensor 30 is connected to an input terminal of an operational amplifier 31, and is further connected to an output terminal of the operational amplifier 31 via a resistor 32.

The output terminal of the operational amplifier 31 is connected to one of input terminals of an operational amplifier 34 via a resistor 33. Further, this input terminal is connected to an output terminal of the operational amplifier 34 via a diode 35. Further, the output terminal of the operational amplifier 34 is connected to one of input terminals of the aforementioned operational amplifier (buffer amplifier) 43 via resistors 36 and 41. A logarithm amplifier circuit is formed by the operational amplifiers 34 and 43.

The operational amplifier 43 has one of input terminals thereof connected to its own output terminal via a resistor 42. A collector of an NPN transistor 39 is connected to a connection point between the resistors 36 and 41, and further, a capacitor 40 is connected between the collector and emitter of the NPN transistor 39.

The emitter of the NPN transistor 39 is connected to its own base via a resistor 38, the others of the input terminals of the operational amplifiers 43 and 34, the capacitor 40, and the emitter of the NPN transistor 39 are connected to a power circuit 46 used for generation of bias voltage. The base of the NPN transistor 39 is connected to an INT terminal of the microcomputer 50. The power circuit 46 is also connected to an input terminal of the operational amplifier 31. Further, the power circuit 46 is connected to the booster circuit 2.

The capacitor 40 is used for integrating an output voltage from the above-mentioned logarithm amplifier circuit, and the NPN transistor 39 controls the start and stop of integration. Further, the operational amplifier 43 buffers the integrated output voltage. As described above, the amount of light emitted from the xenon tube 11 is detected by the photometry sensor 30, the logarithm amplifier circuit, and the capacitor 40.

The output terminal of the operational amplifier 43 is connected to a non-inverting input terminal of a comparator 44, and an inverting input terminal of the comparator 44 is connected to the microcomputer 50. The comparator 44 generates a light emission stop signal at a time point that the emission output (integrated voltage) from the xenon tube 11 reaches a reference value (reference voltage), as described hereinafter. The comparator 44 has an output connected to an AND circuit 45, and the AND circuit 45 has an output connected to the microcomputer 50.

A light emission reference amount-storing section 51 is connected to the microcomputer 50. The light emission reference amount-storing section 51 is implemented e.g. by an EEPROM or a flash ROM.

The microcomputer 50 is provided with a power switch 52, and is connected to the image pickup apparatus body (camera body) via connection terminals 53 to 57. The connection terminal 53 is a so-called X contact point for receiving an emission start signal from the image pickup apparatus body, and the connection terminal 54 is a clock terminal for performing serial communication. The connection terminal 55 is a serial data input terminal, and the connection terminal 56 is a serial data output terminal. Further, the connection terminal 57 is a charge signal output terminal.

An emitter of an NPN transistor 58 is connected to the charge signal output terminal 57. A base of the NPN transistor 58 is connected to the microcomputer 50 via a resistor 59, and further, is grounded via a resistor 60. Note that a collector of the NPN transistor 58 is grounded.

Further, an LED 62 as a notifying section is connected to the microcomputer 50, and the LED 62 lights when the voltage of the main capacitor 5 reaches a voltage at which light emission can be executed. A switch 63 is connected to the microcomputer 50, and the switch 63 is e.g. a hall sensor, which detects attachment of the filter holder 400.

As shown in FIG. 11, a filter detection section 405 is connected to the microcomputer 50. The filter detection section 405 includes the light source (e.g. white LED) 402 for detection and the color sensor 403, and the color sensor 403 includes a plurality of photodiodes having respective color filters attached thereto which are different in spectral characteristics.

Figure 26A:
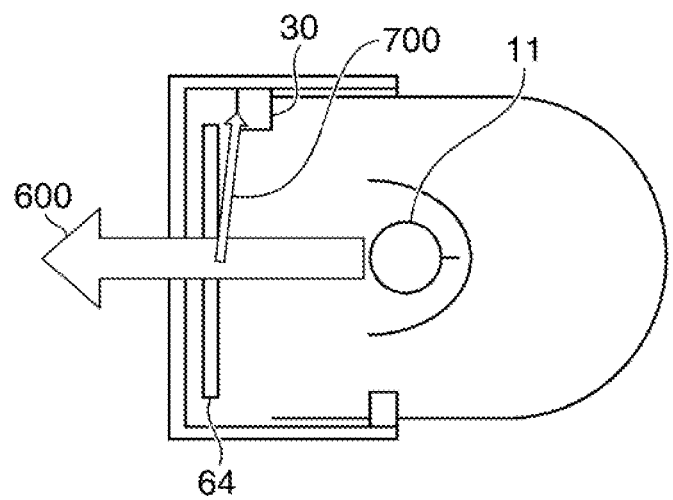
Figure 26B:
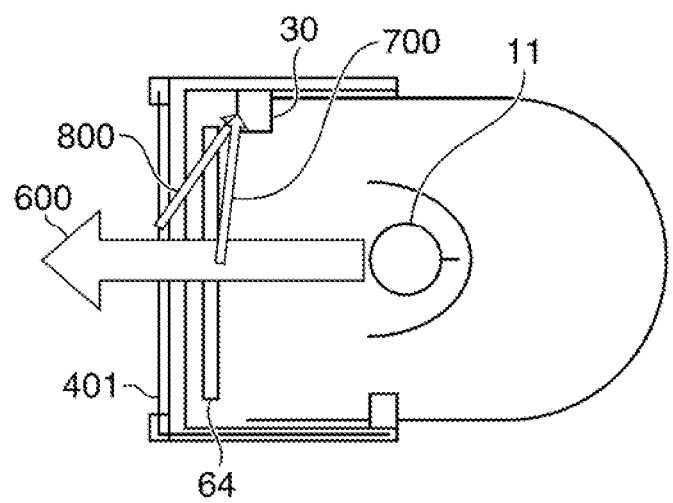
Figure 27:
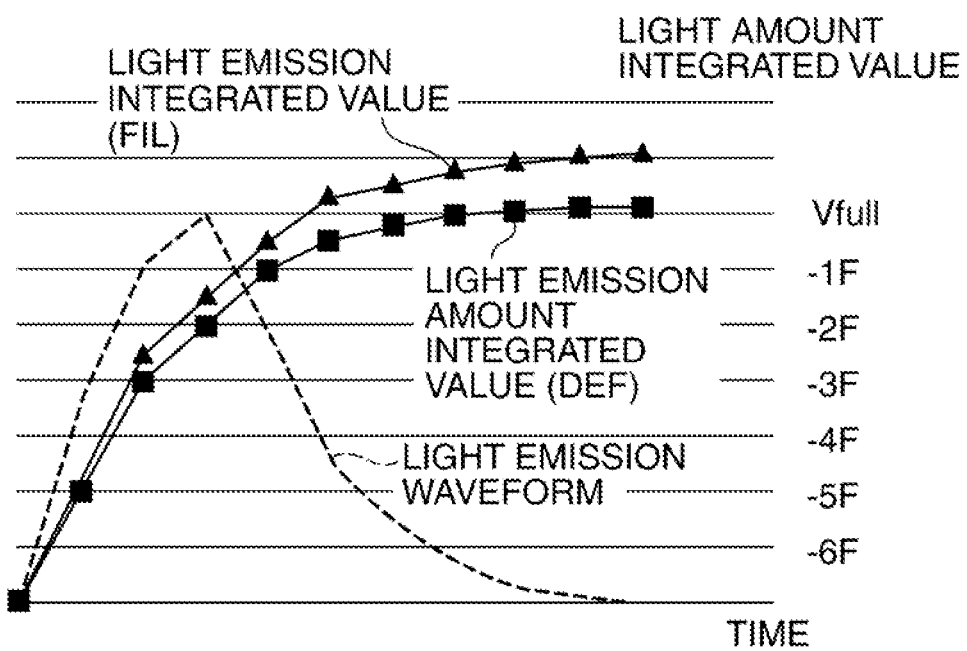
FIG. 27 is a diagram showing changes in an integrated value obtained by integrating outputs from a photometry sensor appearing in FIGS. 26A and 26B.

In FIG. 11, there is illustrated the light emission section provided with the xenon tube 11, and the filter holder 400, which is an optical accessory, is mounted forward of the light emission section. Further, the color filter 401 is attached to the filter holder 400. Further, the reflection section (main mirror) 404 which reflects light from the detection light source 402 toward the color sensor 403 is provided on the light emission section or the filter holder 400. Further, similarly to a construction described hereinbefore with reference to FIGS. 26A and 26B, the light emission section is provided with the Fresnel panel 64 and the photometry sensor 30.

As shown in FIG. 11, the microcomputer 50 is provided with a plurality of terminals, and controls the start and stop of oscillation of the booster circuit 2 via a CNT terminal. Here, the microcomputer 50 sets the CNT terminal to a high (Hi) level at the start of charging, and sets the CNT terminal to a low (Lo) level at the stop of charging.

The microcomputer 50 receives a voltage obtained by dividing a voltage from the main capacitor 5 by the resistors 3 and 4 via an AD0 terminal, and converts the received voltage to a digital signal corresponding to the voltage by a first analog-to-digital converter, not shown, provided in the microcomputer 50. The microcomputer 50 outputs an emission start signal via a START terminal. The microcomputer 50 receives an emission stop signal as an output from the AND circuit 45 via a STOP terminal.

The microcomputer 50 outputs an integration enable signal indicative of the start or inhibition of integration via the INT terminal. The microcomputer 50 receives an integrated voltage, which is an output from the operational amplifier 43, via an AD1 terminal, and converts the received voltage to a digital signal by a second analog-to-digital converter, not shown, provided in the microcomputer 50. The microcomputer 50 outputs a reference voltage corresponding to a light emission amount to the comparator 44 via a DA0 terminal. That is, the microcomputer 50 sets an emission set voltage, which is determined as described hereinafter, as a control value associated with the light emission amount control, and outputs the set control value to the comparator 44 via the DA0 terminal as the reference voltage.

The microcomputer 50 outputs a communication clock signal for performing serial communication with the light emission reference amount-storing section 51 via an ECK terminal. The microcomputer 50 serially inputs data (light emission reference amount) from the light emission reference amount-storing section 51 via an EDI terminal. The microcomputer 50 serially outputs data to the light emission reference amount-storing section 51 via an EDO terminal. In FIG. 11, the ECK, EDI, and EDO terminals are collectively referred to as the EEP terminal. The microcomputer 50 receives the status of the power switch 52 via a POW terminal. When the microcomputer 50 is connected to the power switch 52 via an OFF terminal, the microcomputer 50 sets the strobe to the off-state. Then, when the microcomputer 50 is connected to the power switch 52 via an ON terminal, the microcomputer 50 sets the strobe to the on-state.

Further, the microcomputer 50 receives an emission instruction signal from the camera body via an X terminal. The microcomputer 50 is provided with a CK terminal, a DI terminal, a DO terminal, a CHG terminal, and an LED terminal. The CK terminal is an input terminal to which a synchronization clock signal for performing serial communication with the camera body is input. The DI terminal is an input terminal for serial communication data input. The DO terminal is an output terminal for serial communication data output. The CHG terminal is an output terminal for notifying the camera body that the voltage of the capacitor 5 has reached a light emission possible voltage at which light emission can be executed. The LED terminal is a display output terminal for notifying a user using the LED 62 that voltage of the capacitor 5 has reached the light emission possible voltage.

Although in the example shown in FIG. 11, the light emission reference amount-storing section 51 is provided outside the microcomputer 50, the light emission reference amount-storing section 51 may be incorporated in the microcomputer.

When the light emission control is performed by the light emission control device shown in FIG. 11, the strobe flash light emitted from the xenon tube 11 is received by the photometry sensor 30, and as described above, the integrated value (light emission amount integrated value) is buffered in the buffer amplifier 43.

The light emission amount integrated value (integrated voltage) buffered in the buffer amplifier 43 is monitored by the comparator 44. When the buffered integrated voltage reaches a reference voltage set according to an emission instruction value sent from the camera body, the comparator 44 sends an emission stop signal. This cause the emission stop signal to be sent from the AND circuit 45 to the microcomputer 50, and the microcomputer 50 stops light emission from the xenon tube 11.

By the way, the sensitivity of the photometry sensor 30 varies from one sensor to another, and hence the sensitivity is adjusted on an illumination device-by-illumination device basis. In doing this, the xenon tube 11 is caused to emit light at a maximum output level, and the strobe flash light is received by the photometry sensor 30. Then, the integrated voltage buffered in the buffer amplifier 43 is stored e.g. in the built-in memory of the microcomputer 50 as the light emission reference amount H1.

Now, assuming that the reference voltage to stop light emission is indicated by DA0, the reference voltage (also referred to as the light emission setting) DA0 is determined based on the emission instruction value A sent from the camera body and the light emission reference amount H1.

Figure 12:
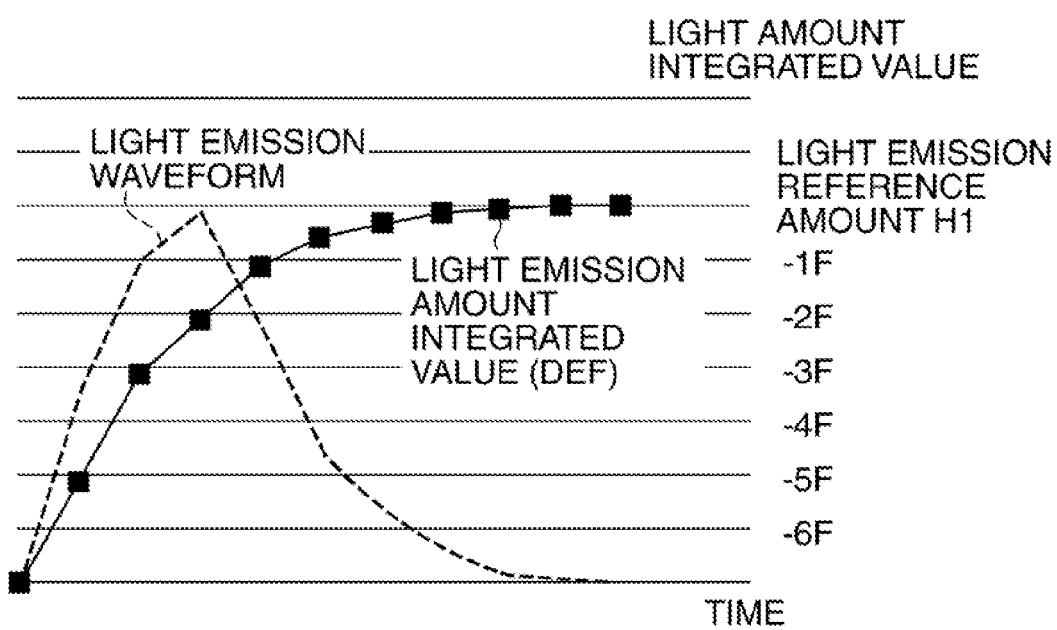
FIG. 12 is a diagram useful in explaining calculation of a light emission setting in the illumination device shown in FIG. 11.

FIG. 12 is a diagram useful in explaining calculation of the light emission setting DA0 by the light emission control device shown in FIG. 11.

In FIG. 12, a light emission waveform indicates changes with time in light amount when the xenon tube 11 is caused to emit light at the maximum output level. The light emission amount integrated value (DEF) indicates an integrated voltage buffered in the buffer amplifier 43 when the xenon tube 11 is caused to emit light at the maximum output level. Here, when the main capacitor 5 discharges all energy, thereby making the light amount of the emission waveform equal to "0", the integrated voltage buffered in the buffer amplifier 43 becomes maximum, and this maximum value is set to the light emission reference amount H1.

The light emission setting DA0 is calculated by subtracting the emission instruction value A from the light emission reference amount H1 at which the integrated voltage buffered in the buffer amplifier 43 becomes the maximum voltage. For example, if the emission instruction value A is at a ½ emission level (one step down) with reference to the maximum output emission level, the microcomputer 50 provides a value obtained by subtracting 1F voltage from the light emission reference amount H1 to the comparator 44 as the reference voltage.

As a consequence, when the integrated voltage buffered in the buffer amplifier 43 reaches a voltage lower than the light emission reference amount H1 by 1F, the microcomputer 50 sends an off signal to the IGBT 16 to stop the light emission from the xenon tube 11.

That is, the light emission setting DA0 is calculated by the following equation (9):

$$DA0 = H1 - A \quad (9)$$

Next, a description will be given of a light emission reference amount-writing process for recording the integrated voltage buffered in the buffer amplifier 43 during the above-described light emission at the maximum output level, as the light emission reference amount.

Figure 13:
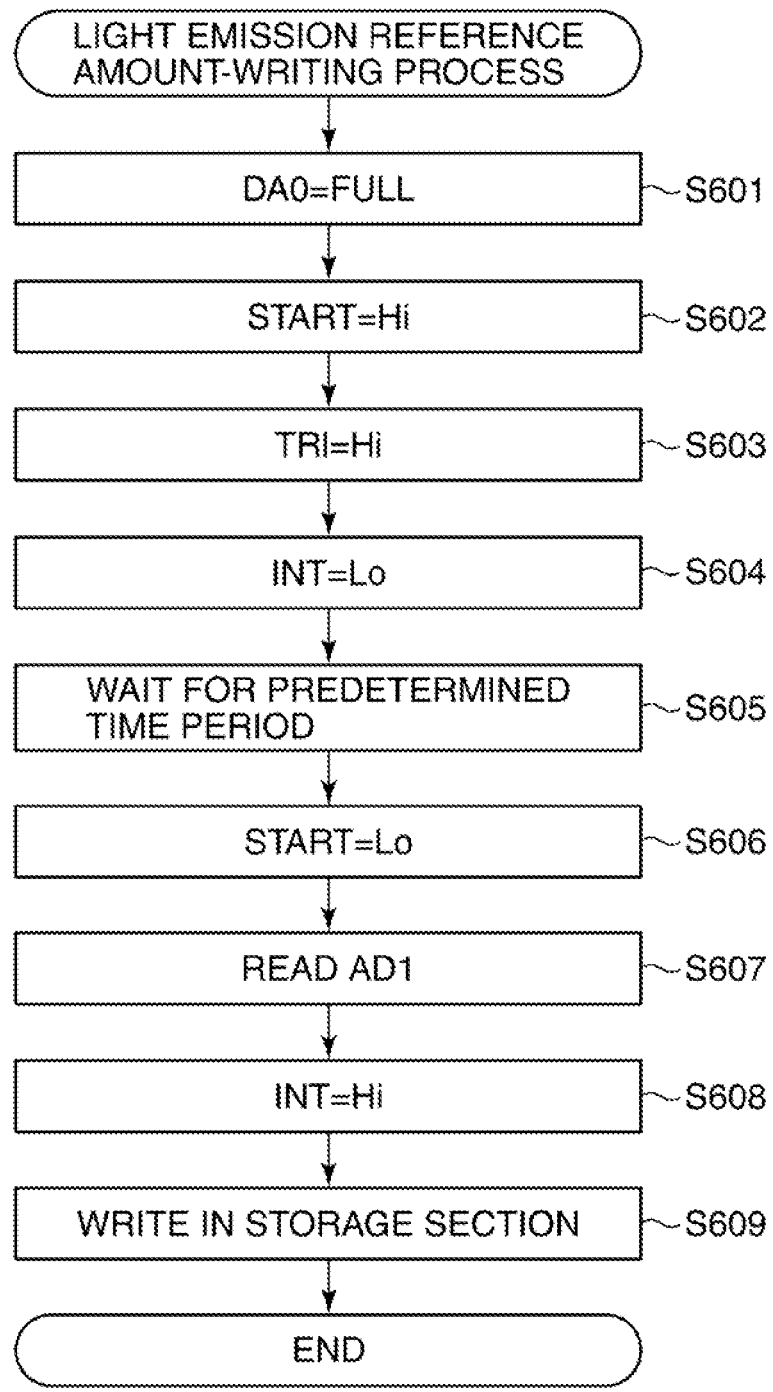
FIG. 13 is a flowchart of a light emission reference amount-writing process for recording an integrated voltage buffered in an buffer amplifier during light emission at the maximum output level as a light emission reference amount in the illumination device shown in FIG. 11.

FIG. 13 is a flowchart of the light emission reference amount-writing process for recording the integrated voltage buffered in the buffer amplifier 43 during light emission at the maximum output level as the light emission reference amount in the light emission control device shown in FIG. 11. The process in the flowchart shown in FIG. 13 is executed by the microcomputer 50. Further, the light emission reference amount-writing process is executed in a state in which a color filter is not attached.

When the light emission reference amount-writing process is started, the microcomputer 50 sets the light emission setting DA0 to the maximum value set in advance (DA0=FULL) to set full light emission (step S601). Next, the microcomputer 50 sets the START terminal to the high level so as to forcibly turn on the IGBT 16 (step S602).

Next, the microcomputer 50 applies a trigger voltage to the xenon tube 11 by setting the TRI terminal to a high level for a predetermined time to cause the xenon tube 11 to emit light (step S603). Then, the microcomputer 50 sets the INT terminal to a low level to start integration (step S604), and waits for a predetermined time period until termination of the light emission (step S605).

Next, the microcomputer 50 sets the START terminal to a low level to forcibly turn off the IGBT 16 to thereby stop light emission from the xenon tube 11 (step S606). Then, the microcomputer 50 reads the integrated voltage (light emission integrated amount) output from the buffer amplifier 43 via the AD1 terminal (step S607). Thereafter, the microcomputer 50 sets the INT terminal to a high level to thereby terminate the integration (step S608).

Then, the microcomputer 50 writes the above-mentioned light emission integrated amount into the light emission reference amount-storing section 51 as the maximum integrated amount according to a predetermined procedure set in advance. Then, the microcomputer 50 sets this maximum integrated amount to the light emission reference amount H1 (step S609), followed by terminating the light emission reference amount-writing process.

Next, a description will be given of a filter detection process for identifying a type of the color filter attached to the light emission section to thereby determine a corrected light emission reference amount which is a corrected amount of the light emission reference amount.

The construction of the filter holder 400 including the color filter 401 and the filter detection section 405, as viewed from the front of the light emission section shown in FIG. 11, is the same as described in the first embodiment with reference to FIG. 2, and hence description thereof is omitted.

Figure 14:
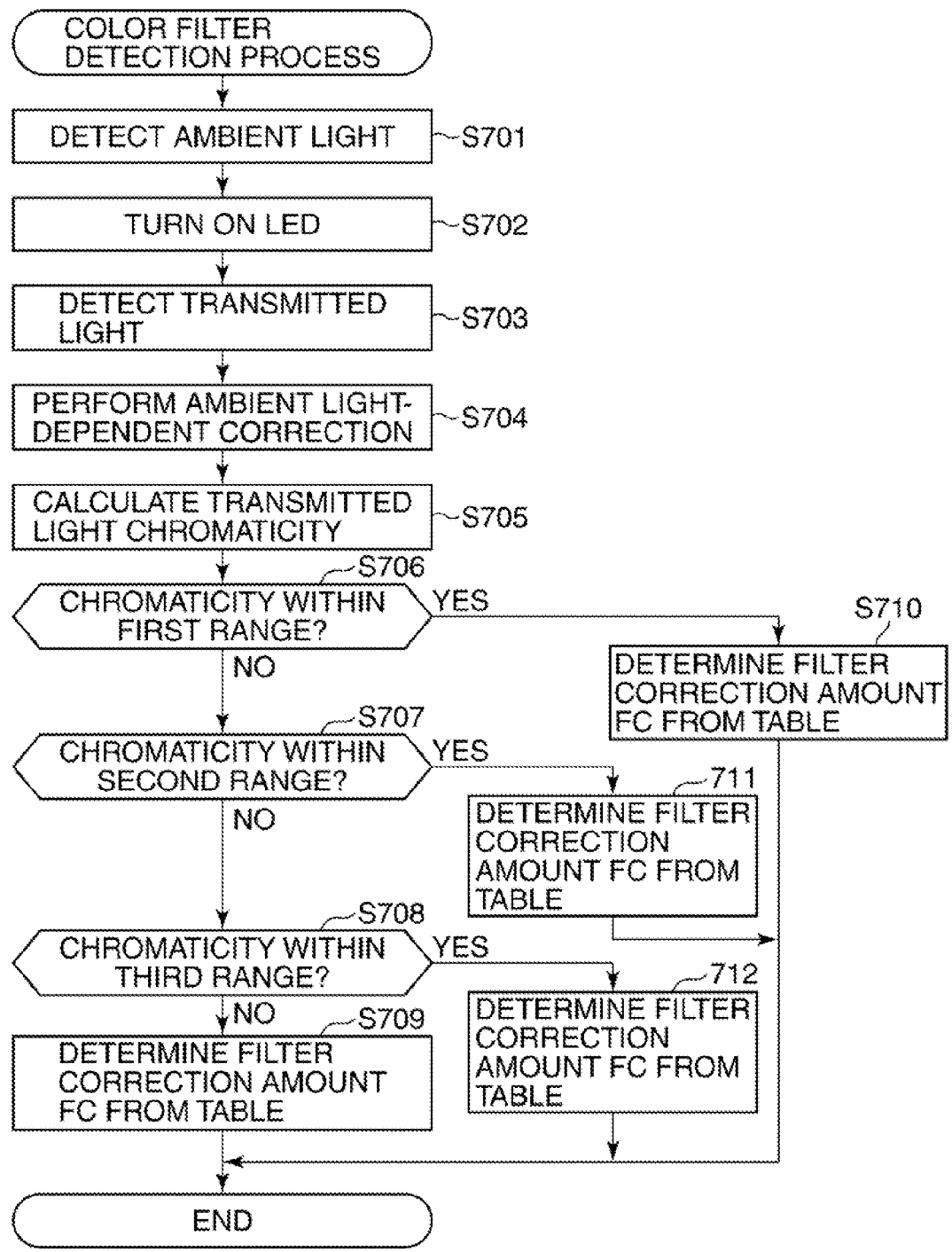
FIG. 14 is a flowchart of a color filter detection process executed by the illumination device shown in FIG. 11.

FIG. 14 is a flowchart of a color filter detection process executed by the light emission control device shown in FIG. 11. The process in the flowchart shown in FIG. 14 is executed by the microcomputer 50. In this color filter detection process, detection of a color filter is performed to determine a filter correction amount FC for correcting the light emission reference amount according to the color filter type.

When the switch 63 is turned on, the microcomputer 50 detects ambient light (environmental light) via the color sensor 403 in a state in which the detection light source 402 is not caused to emit light (step S701). The color sensor 403 outputs information corresponding to so-called three primary colors. Now, it is assumed that when the ambient light is received, the color sensor 403 outputs the three-primary-color information (rn, gn, bn) as results of reception of light.

Then, the microcomputer 50 causes the detection light source 402 to light (step S702), and receives light transmitted through the color filter 401 by the color sensor 403. The color sensor 403 detects the transmitted light, and outputs the three-primary-color information (rs, gs, bs) as results of reception of light (step S703).

The microcomputer 50 performs ambient light correction by subtracting the three-primary-color information (rn, gn, bn) based on only the ambient light from the three-primary-color information (rs, gs, bs) obtained when the strobe light is emitted (when the detection light source 402 lights), regarding the three-primary-color information (rn, gn, bn) based on only the ambient light, i.e. the ambient light chromaticity information (environmental light chromaticity information) and the ambient light lightness information as noise (step S704). The microcomputer 50 determines the corrected threeprimary-color information (rc, gc, bc), i.e. the corrected lightness information and the corrected chromaticity information by subtraction expressed by the above-mentioned equation (1).

Then, the microcomputer 50 determines the color information (Br, Cx, Cy) of the transmitted light through the color filter 401 by the above-mentioned equation (2) based on the corrected three-primary-color information (rc, gc, bc) (step S705).

In this equation, by properly selecting M11 to M33, the corrected three-primary-color information (rc, gc, bc) can be converted to the lightness value (lightness information) Br indicative of lightness of the transmitted light and the chromaticity coordinate values (chromaticity information: transmitted light chromaticity information) Cx and Cy which express the chromaticity of transmitted light by two axes (x-y chromaticity diagram).

The example of the chromaticity coordinate values Cx and Cy obtained using an orange-color color filter, which is most commonly used as the color filter 401 shown in FIG. 14, is the same as those in FIG. 5 described in the first embodiment.

As described in the first embodiment with reference to FIG. 5, as the chromaticity information in the transmitted light increases, the orange color becomes darker, and the transmittance of the color filter 401 is reduced. As a result, the amount of light reflected by the reflection section 404 is reduced. This reduces the filter correction amount FC as shown in FIG. 15.

FIG. 15 is a diagram showing an example of a filter correction amount table as information which associates information on color characteristics of light transmitted through the color filter with information on the characteristics of the color filter, stored in the microcomputer 50, appearing in FIG. 11, in advance.

In FIG. 15, in the filter correction amount table, the chromaticity coordinate values Cx and Cy, and the filter correction amount FC are set. For the chromaticity coordinate values Cx and Cy, there are set the first to third ranges described hereinabove in the first embodiment, and chromaticity coordinate values Cx and Cy other than these. Further, in association with the chromaticity coordinate values Cx and Cy, "−0.9t", "−0.7t", "−0.5t", and "0" are set as the filter correction amount FC.

A symbol "t" shown in FIG. 15 represents a coefficient. The coefficient t defines influence of the color filter 401 on the light emission reference amount, and is used when the filter correction amount FC is determined based on the transmittance of the color filter. Further, the coefficient t varies depending on relative distances between the xenon tube 11, and the photometry sensor 30, the filter holder 400, and the color filter 401. As the distance between the xenon tube 11 and the color filter 401 through which light is transmitted is larger, the coefficient t becomes smaller, so that the influence of the color filter 401 on the light emission reference amount is reduced.

Referring again to FIG. 14, when the microcomputer 50 has calculated the chromaticity coordinate values Cx and Cy as mentioned above, the microcomputer 50 determines, by consulting the filter correction amount table, whether or not the chromaticity coordinate values Cx and Cy are within the first range (step S706).

If the chromaticity coordinate values Cx and Cy are not within the first range (NO to the step S706), the microcomputer 50 determines, by consulting the filter correction amount table, whether or not the chromaticity coordinate values Cx and Cy are within the second range (step S707). If the chromaticity coordinate values Cx and Cy are not within the second range (NO to the step S707), the microcomputer 50 determines, by consulting the filter correction amount table, whether or not the chromaticity coordinate values Cx and Cy are within the third range (step S708).

If the chromaticity coordinate values Cx and Cy are not within the third range (NO to the step S708), the microcomputer 50 determines that the chromaticity coordinate values Cx and Cy are out of the first to third ranges, and sets the filter correction amount FC to "0" according to the filter correction amount table (step S709), followed by terminating the color filter detection process.

If it is determined in the step S706 that the chromaticity coordinate values Cx and Cy are within the first range (YES to the step S706), the microcomputer 50 sets the filter correction amount FC to "−0.9t" according to the filter correction amount table (step S710), followed by terminating the color filter detection process.

Further, if it is determined in the step S707 that the chromaticity coordinate values Cx and Cy are within the second range (YES to the step S707), the microcomputer 50 sets the filter correction amount FC to "−0.7t" according to the filter correction amount table (step S711), followed by terminating the color filter detection process.

Similarly, if it is determined in the step S708 that the chromaticity coordinate values Cx and Cy are within the third range (YES to the step S708), the microcomputer 50 sets the filter correction amount FC to "−0.5t" according to the filter correction amount table (step S712). Then, the microcomputer 50 terminates the color filter detection process.

Although in the color filter detection process shown in FIG. 14, the orange-color filter has been described as an example of the color filter, the filter correction amount table may be provided on a color filter-by-color filter basis. Then, by identifying a color filter type, it is possible to determine a filter correction amount FC appropriate for each of the various types of the color filter.

Figure 16:
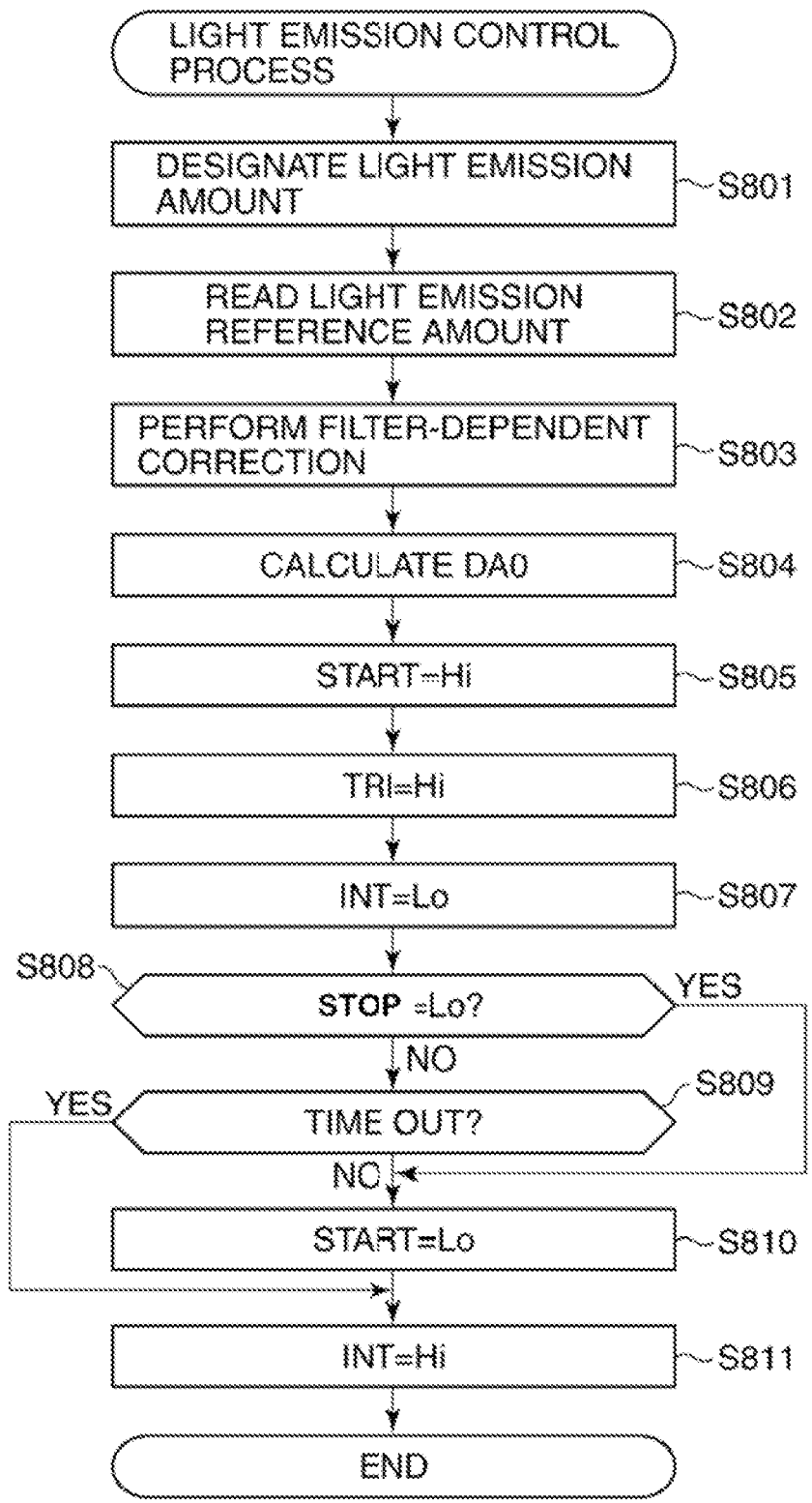
FIG. 16 is a flowchart of a light emission control process executed by the illumination device shown in FIG. 11.

FIG. 16 is a flowchart of a light emission control process executed by the light emission control device shown in FIG. 11. The process in the flowchart shown in FIG. 16 is executed by the microcomputer 50.

First, the microcomputer 50 receives an emission instruction value U (guide number) from the camera body side via the connection terminals 54 to 56 (step S801: designation of the light emission amount). Note that designation of the light emission amount may be set from the input section 320 of the strobe 300. As a consequence, the above-mentioned emission instruction value U is designated to the light emission control device.

Next, when the X terminal 53 and the CK terminal 54 become a low level, the microcomputer 50 starts light emission processing, and reads the light emission reference amount H1 stored in the light emission reference amount-storing section 51 (step S802). Then, the microcomputer 50 adds the filter correction amount FC acquired as shown in FIG. 14 to the light emission reference amount H1 to thereby calculate a corrected light emission reference amount I in which a change in the light emission reference amount due to the attachment of the color filter 401 is corrected (step S803). That is, the microcomputer 50 calculates the corrected light emission reference amount I by the following equation (10):

$$I = H1 + FC \tag{10}$$

The calculation of the corrected light emission reference amount I results in subtraction of an increased amount of the integrated voltage buffered in the buffer amplifier 43, which is increased by attachment of the color filter 401.

Next, the microcomputer 50 calculates the light emission setting (emission set amount) DA0 based on the corrected light emission reference amount I and the emission instruction value (emission instruction amount) U (step S804) by the following equation (11):

$$DA0 = I - U \quad (11)$$

Next, the microcomputer 50 sets the START terminal to a high level so as to forcibly turn on the IGBT 16 (step S805). Then, the microcomputer 50 applies a trigger voltage to the xenon tube 11 by setting the TRI terminal to a high level for a predetermined time to thereby cause the xenon tube 11 to emit light (step S806). Thereafter, the microcomputer 50 sets the INT terminal to a low level to start integration (step S807).

The light emission from the xenon tube 11 increases the integrated voltage which is an output from the buffer amplifier 43. Then, at a time when the integrated voltage reaches the light emission setting (emission set voltage) DA0, the comparator 44 is inverted. In other words, the comparator 44 outputs an emission stop signal. The emission stop signal (low level) is sent to the gate of the IGBT 16 via the AND circuit 45 and the IGBT driver circuit formed by the above-mentioned circuit elements 17 to 25, whereby the IGBT 16 is turned off.

The emission stop signal is provided to the STOP terminal of the microcomputer 50. The microcomputer 50 determines whether or not the STOP terminal is at a low level (step S808), and if the STOP terminal is not at a low level (NO to the step S808), the microcomputer 50 determines whether or not a timeout has occurred (step S809).

The microcomputer 50 has started time counting from the start of light emission using a built-in timer, and determines that a timeout has occurred when the time counted by the built-in timer exceeds a predetermined time period. If a timeout has not occurred (NO to the step S809), the microcomputer 50 returns to the step S808.

On the other hand, if a timeout has occurred (YES to the step S809), the microcomputer 50 determines that the emission stop signal has not been obtained in the predetermined time period due to e.g. an error, and sets the START terminal to a low level to forcibly turn off the IGBT 16 (step S810). This inhibits the light emission from the xenon tube 11. If the STOP terminal becomes a low level in the step S808 (YES to the step S808), the microcomputer 50 proceeds to the step S810.

Thereafter, the microcomputer 50 sets the INT terminal to a high level to stop the integration processing (step S811), followed by terminating the light emission control process.

Although in the above-described third embodiment, the light emission reference amount H1 is corrected using the filter correction amount FC as the information on the characteristics of the color filter, the object to be corrected is not limited to the light emission reference amount. It is possible to obtain the same advantageous effects insofar as the object to be corrected is a control value (light emission control value) concerning the light emission control. For example, the emission instruction value U sent from the camera body may be used in place of the light emission reference amount. In this case, the correction process may be executed by either of the illumination device and the camera body. That is, the image pickup apparatus may be configured to also function as the light emission control device according to the present invention.

When the light emission amount is corrected by the camera body, the filter correction amount FC is sent from the microcomputer 50 to the camera body, and in the camera body, the camera microcomputer determines a corrected emission instruction value V (V=U−FC) from the acquired filter correction amount FC and the emission instruction value U.

Then, the camera microcomputer sends the corrected emission instruction value V to the microcomputer 50.

As described above, in the third embodiment, the filter correction amount is calculated according to the transmittance of the color filter attached to the illumination device. More specifically, with a view to making the amount of light irradiated on to an object by the illumination device equal between a case where the color filter is attached forward of the light emission section and a case where the same is not attached thereto, the light emission control value is set such that the amount of light emitted from the xenon tube 11 when the color filter is attached is larger than that when the color filter is not attached. Therefore, it is possible to perform appropriate light emission control even when the color filter is attached.

Next, a description will be given of an example of a light emission control device used in an illumination device according to a fourth embodiment of the present invention. Note that the light emission control device according to the fourth embodiment has the same configuration as that of the light emission control device shown in FIG. 11. Further, the fourth embodiment is distinguished from the third embodiment in the color filter detection process described with reference to FIG. 14.

Figure 17:
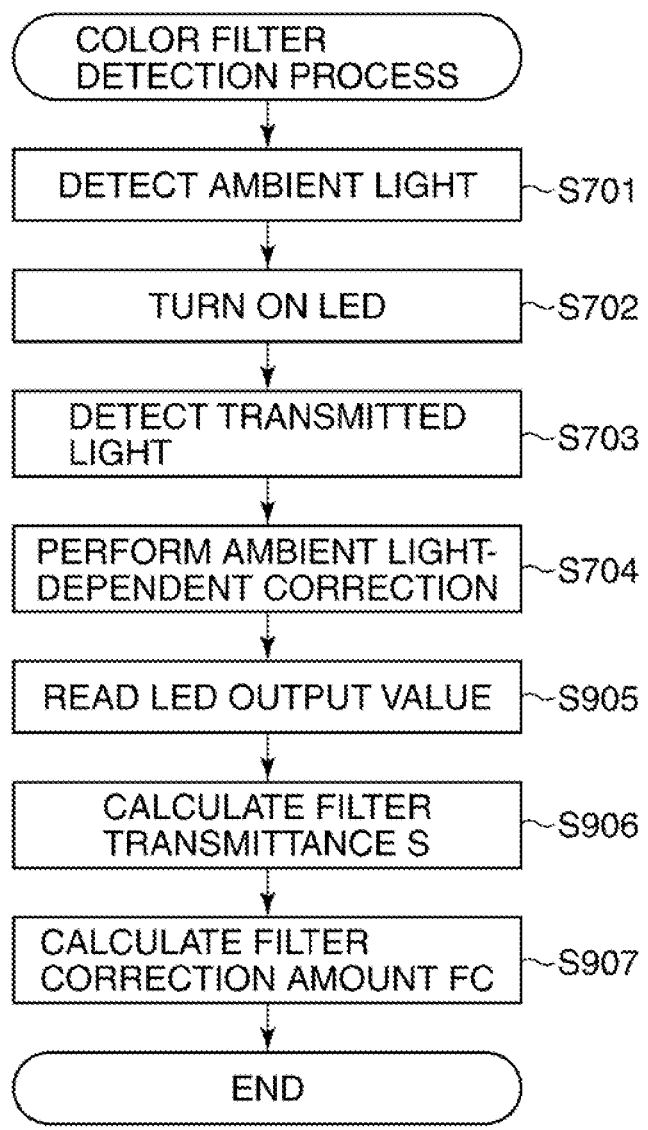
FIG. 17 is a flowchart of a color filter detection process executed by a light emission control device used in an illumination device according to a fourth embodiment of the present invention.

FIG. 17 is a flowchart of a color filter detection process executed by the light emission control device used in the illumination device according to the fourth embodiment of the present invention. The same steps in FIG. 17 as those in FIG. 14 are denoted by the same step numbers, and description thereof is omitted.

The built-in memory of the microcomputer 50 stores predetermined three-primary-color information (three-primary-color information in a case where a color filter is not attached) as the reference three-primary-color information (r0, g0, b0). The reference three-primary-color information (r0, g0, b0) is three-primary-color information obtained, in a state of the image pickup apparatus without a color filter, by receiving light from the detection light source 402 at the color sensor 403 and executing the step S704 appearing in FIG. 14.

After executing the step S704, the microcomputer 50 reads the reference three-primary-color information (r0, g0, b0) stored in the built-in memory (step S905: reading of the LED output value). Then, the microcomputer 50 calculates a transmittance S of the color filter (filter transmittance) in the following manner (step S906):

For example, the microcomputer 50 calculates the color information (Brc, Cxc, Cyc) of the transmitted light through the color filter 401 based on the corrected three-primary-color information (rc, gc, bc) by the above equation (5). Further, the microcomputer 50 calculates the color information (Br0, Cx0, Cy0) of light from the detection light source 402 based on the reference three-primary-color information (r0, g0, b0) by the above equation (6).

In this equation, by properly selecting M11 to M33, the corrected three-primary-color information (rc, gc, bc) can be converted to the lightness values (lightness information) Brc and Br0 indicative of lightness of the transmitted light. Further, the corrected three-primary-color information (rc, gc, bc) can be converted to the chromaticity coordinate values (chromaticity information) Cxc, Cx0, Cyc, and Cy0, which express the chromaticity of the transmitted light by two axes (x-y chromaticity diagram).

Next, the microcomputer 50 extracts the lightness components Brc and Br0 from the chromaticity information obtained as above. Then, the microcomputer 50 calculates the filter transmittance S by the following equation (12):

$$S = Brc/Br0 \qquad (12)$$

The filter transmittance S is calculated in the step S906 based on the light from the detection light source 402, and hence is different in value from the transmittance to be calculated when the light is emitted from the xenon tube 11. Therefore, the microcomputer 50 calculates the filter correction amount FC by correcting the filter transmittance S such that it becomes equal to a transmittance based on the spectral characteristics of the xenon tube 11 (step S907).

In this step, the microcomputer 50 calculates the filter correction amount FC based on the filter transmittance S, and the spectral characteristics of the xenon tube 11, the detection light source 402, and the color sensor 403.

As described hereinabove in the first embodiment with reference to FIG. 10, the light emitted from the xenon tube 11 is different in spectral characteristics from the light emitted from the detection light source 402, and hence in calculating the filter correction amount FC due to attachment of the color filter 401, it is necessary to take into consideration the difference in spectral characteristics.

Now, a spectral coefficient of the xenon tube 11 is set to Xe, that of the detection light source 402 is set to WL, and that of the color sensor 403 is set to Cs. Further, a wavelength of light is set to $\lambda$.

At this time, the microcomputer 50 calculates the filter correction amount FC based on the following equation (13):

$$G = S \times \int_{380}^{780} \{\{Xe(\lambda) \div WL(\lambda)\} \times Cs(\lambda)\} d\lambda\} \times t \qquad (13)$$

In this equation, t represents a coefficient which converts the transmittance of the color filter 401 to the filter correction amount FC.

The microcomputer 50 thus calculates the filter correction amount according to the equation (13), followed by terminating the color filter detection process.

Although in the above-described embodiment, the microcomputer 50 calculates the filter correction amount, the camera microcomputer provided in the camera body may calculate the filter correction amount according to the transmittance of the color filter.

As described above, also in the fourth embodiment of the present invention, the transmittance of the color filter attached to the strobe is detected, and the filer correction amount is calculated according to the detected transmittance, and hence it is possible to perform appropriate light emission control also in the case where the color filter is attached.

In the above-described embodiment, the description has been given of the light emission control device of the illumination device. The illumination device is removably mounted on the camera body (image pickup apparatus body). The camera body sends a light emission instruction value for determining the light emission reference amount during shooting time to the illumination device. Further, on the camera body, the mage pickup lens unit which provides an optical image of an object to the camera body is mounted.

For example, an optical member may be used as an optical accessory that changes color characteristics of transmitted light by a single member insofar as it can change color characteristics of transmitted light and can be attached forward of the light emission section of the illumination device.

Hereafter, a detailed description will be given of a fifth embodiment of the present invention with reference to attached drawings.

An image pickup system according to the present embodiment has the same arrangement as that of the image pickup system according to the first embodiment shown in FIG. 1. The present embodiment gives a more detailed description of the mechanical arrangement of the invention described in the first to fourth embodiments and another form of the filter determination. That is, the image pickup system according to the present embodiment includes the camera body 100 as an image pickup apparatus, the lens unit 200 which is removably mounted on the camera body 100, and the strobe 300 as an illumination device which is removably mounted on the image pickup apparatus. The strobe 300 has the filter holder 400 removably mounted forward of the light emission section 350 as a function of an optical accessory, referred to hereinafter. In the present embodiment, the detailed mechanical arrangement which has not been described in the first embodiment will be mainly described, and duplicated description is omitted.

The strobe microcomputer (FPU) 310 controls the operation of each of the components of the strobe 300. The strobe microcomputer 310 determines whether or not the filter holder 400 is mounted, and determines the color characteristics of the color filter 401, in a manner as described hereinafter.

Figure 18A:
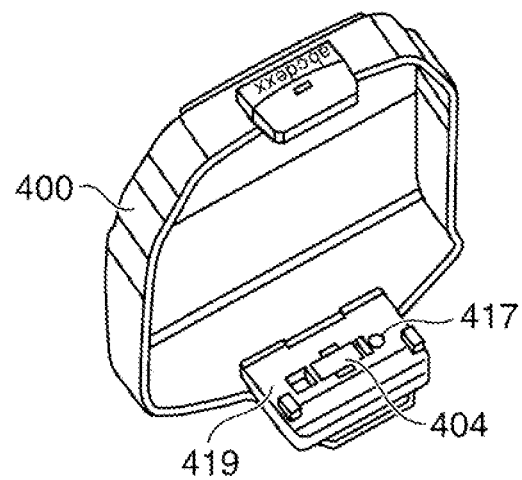
FIGS. 18A to 18C are views each showing a construction of a filter holder according to a fifth embodiment of the present invention.
Figure 18B:
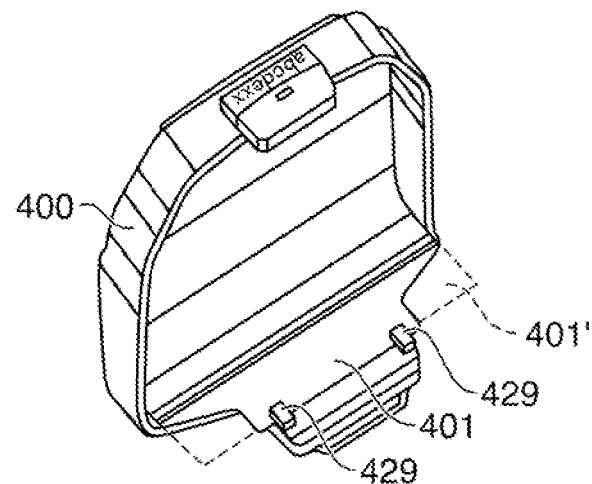
Figure 18C:
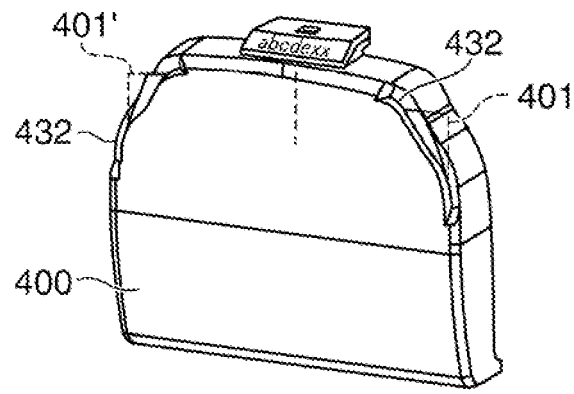

The filter determination section 324 is used for determining the color characteristics of the color filter 401 held by the filter holder 400 as shown in FIGS. 18A to 18C, and the strobe microcomputer 310 determines information on the color characteristics of the color filter 401 based on results of detection by the filter determination section 324. The detailed construction of the filter determination section 324 and the determination method will be described hereinafter.

The light emission section 350 is a block including the discharge tube 307, the reflector 315, the optical system 316, and a detection system of the filter holder detection section 322, and a detection system of the filter determination section 324, as main components, and is connected to a strobe body by a hinge mechanism, not shown, in a manner pivotally movable in a vertical direction, for bounce shooting. Note that in the present embodiment, part of the strobe 300 where connections terminals to be connected to the image pickup apparatus body are provided is referred to a lower side of the strobe 300, and part of the light emission section 350 which is on the same side as the lower side of the strobe 300 in a state where the pivotal angle of the hinge mechanism is set to 0 degrees is referred to a lower side of the light emission section.

FIGS. 18A to 18C show details of the filter holder 400. FIG. 18A is a perspective view of the filter holder 400, as viewed from the light emission section 350 (the rear side), FIG. 18B is a perspective view of the filter holder 400 in a state in which the color filter 401 or 401' is attached to the filter holder 400, and FIG. 18C is a view of the filter holder 400 in the state shown in FIG. 18B, as viewed from the front side (the object side). In the present embodiment, a direction in which two protrusions 429, referred to hereinafter, are arranged side by side in a state of the filter holder 400 mounted on the light emission section 350 (holder mounted state) is referred to as a longitudinal direction of the filter holder 400. Further, the same side of the filter holder 400 as the lower side of the light emission section 350 in the holder mounted state is referred to as a lower side of the filter holder 400.

The filter holder 400 has a light interception block 419 arranged on a lower surface thereof. In the light interception block 419, the prism 404 for reflecting light for filter determination from the light emission section 350, and a magnet 417 used for determining whether or not the filter holder 400 has been mounted on the light emission section 350 by the strobe microcomputer 310 using a magnetic sensor, referred to hereinafter, are assembled.

Further, the light interception block 419 includes two protrusions 429 used for engaging the filter holder 400 in recesses 350a (shown in FIG. 20) which are fixing portions of the light emission section 350, when the filter holder 400 is mounted on the light emission section 350. The protrusions 429 each have a hook shape, and are also used as holding portions for holding the color filter 401 by the filter holder 400, as shown in FIG. 18B. To attach the color filter 401 to the filter holder 400, one end of the color filter 401 is inserted in a slit 432 formed in an upper portion of the filter holder 400 as shown in FIG. 18C, and the other end is pinched by a hook-shaped portion of each protrusion 29. Thus, the color filter 401 is held by the filter holder 400. The color filter may be one 401 having a shape indicated by a solid line in FIGS. 18B and 18C, or may be one 401' having a shape indicated by a broken line, which protrudes from the filter holder 400, insofar as it can be inserted in the slit 432 and be pinched by the protrusions 429.

The filter holder detection section 322 according to the present embodiment detects magnetism produced by the magnet 417 (magnetism generating member) arranged on the filer holder 400, using the magnetic sensor, denoted by reference numeral 325, referred to hereinafter. The strobe microcomputer 310 determines, based on the detection results by the magnetic sensor 325, whether or not the filter holder 400 is mounted on the light emission section 350. Therefore, it is not necessary to form the filter holder detection section 322 such that it is protruded out of the filter holder 400 or the light emission section 350, and although the magnet 417 is disposed at a location covered by the color filter 401, it is possible to determine whether or not the filter holder 400 is mounted. Further, by disposing the magnet 417 between the two protrusions 429 at a location closer to the irradiation surface of the light emission section 350 than the two protrusions 429, in the holder mounted state of the light emission section 350, it is possible to reduce the size of the filter holder 400. In other words, the protrusions 29 are disposed at locations closer to a surface of the filter holder 400 opposed to the irradiation surface of the light emission section 350 than the magnet 417 and the prism 404, in the holder mounted state of the light emission section 350.

FIG. 2 is a view of the light emission section 350 on which the filter holder 400 is mounted, as viewed from the front, which shows a cross-sectional construction of the filter holder 400 including a color filter 401, and a detection system of the filter determination section 324. The color filter 401 is used for changing color characteristics of transmitted light, and by mounting the filter holder 400 holding the color filter 401 on the light emission section 350, it is possible to change color characteristics of light emitted from the light emission section 350. Note that the filter holder 400 can have one of filters of respective various kinds of colors attached thereto, as the color filter 401, and by changing a filter to be attached to the filter holder 400, it is possible to variously change color characteristics of light emitted from the light emission section 350.

In FIG. 2, the detection light source 402 is a light source, such as a white LED, which emits light for color filter determination. The color sensor 403 is a light receiving section including a plurality of photodiodes having respective color filters attached thereto which are different in spectral characteristics. The prism 404 is for causing light emitted from the detection light source 402 to enter the color sensor 403, and functions as a light guide section which guides light emitted from the detection light source 402 to the color sensor 403.

As shown in FIG. 2, the light from the detection light source 402 transmits through the color filter 401, and is reflected twice by the first and second reflection surfaces 404a and 404b of the prism 404 of the filter holder 400. The reflected light transmits through the color filter 401 again, and then enters the color sensor 403. Information on color characteristics of the color filter 401 held by the filter holder 400 is determined using the detection light source 402 and the color sensor 403, described above, and hence it is possible to determine the information on the color characteristics of the color filter 401 irrespective of a direction of attachment of the color filter 401 (e.g. which surface thereof is directed toward the light emission section 350).

Figure 19A:
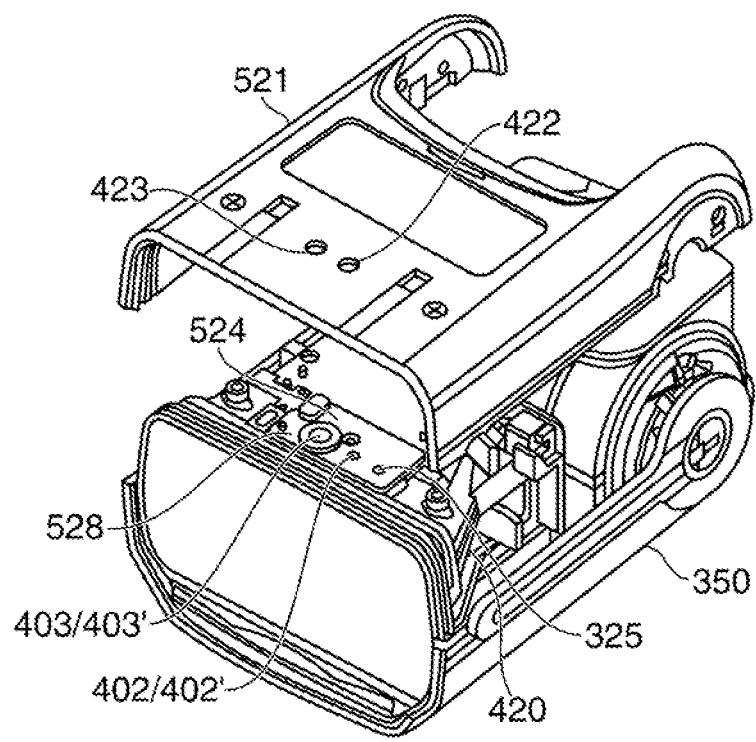
FIG. 19A is a view of the internal arrangement of part related to a filter holder detection section and a filter determination section in a state in which a lower surface of a light emission section according to the fifth embodiment is directed upward.
Figure 19B:
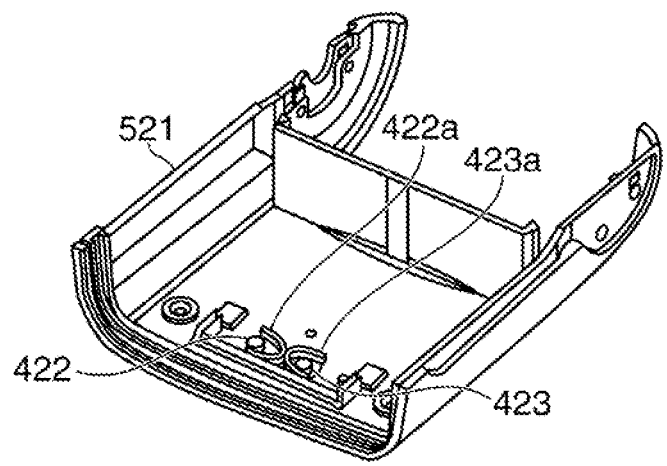
FIG. 19B is a perspective view showing a state in which the inside of a cover of the light emission section according to the fifth embodiment is directed upward.

FIGS. 19A and 19B are views of the internal construction of lower part of the light emission section 350 of the strobe 300, mainly showing part related to a detection system of the filter holder detection section 322 and a detection system of the filter determination section 324, in which FIG. 19A shows a state in which a lower surface of the light emission section 350 is directed upward, and FIG. 19B shows a state in which the inside of a lower cover 521 of the light emission section 350 is directed upward.

On a substrate 524 provided within the light emission section 350, there are arranged the magnetic sensor 325 for detecting the magnet 417 on the holder, the detection light source 402, the color sensor 403, and a microcell polymer sheet 528 as a light interception member which prevents unnecessary light from entering the color sensor 403. The magnetic sensor 325 is used for determining whether or not the filter folder 400 is attached forward of the light emission section 350. In the state of the light emission section 350 having the filter holder 400 attached forward thereof, the color sensor 403 receives light emitted from the light source 402, guided by the prism 404, and transmitted through the color filter 401, and results of reception of the light by the color sensor 403 are used for determining information on the color characteristics of the color filter 401.

By arranging the magnet sensor 25, which is a proximity sensor that detects the filter holder 400, the detection light source 402, and the color sensor 403, which is a photosensor, in a direction substantially orthogonal to the optical axis of light emitted from the light emission section 350 and a vertical direction of the light emission section 350, it is possible to arrange the magnet 417 of the filter holder 400, and the prism 404 as well in the direction substantially orthogonal to the optical axis of light emitted from the light emission section 350. Note that the direction orthogonal to the optical axis of light emitted from the light emission section 350 and the vertical direction of the light emission section 350 corresponds to the longitudinal direction of the light emission section 350, and hence it can be said that the magnetic sensor 325, the light source 402, and the color sensor 403 are arranged side by side in the longitudinal direction of the light emission section 350. This makes it possible to suppress the length of the light interception block 419 of the filter holder 400 in the direction parallel to the optical axis of light emitted from the light emission section 350, and hence makes it possible to reduce the size of the filter holder 400. Although in the present embodiment, the arrangement using the magnetic sensor 325 is described, there may be employed a proximity sensor which is a sensor based on a method other than a method using magnetism, for converting information on the movement and existence of an object to be detected to an electric signal without contacting the object. For example, the magnetism sensor 325 may be replaced by a proximity sensor based on a method making use of an eddy current generated in a metal body to be detected by electromagnetic induction or a method of detecting a change in an electrical capacity caused by an approach of an object to be detected.

The lower cover 521 as an outer jacket of the lower side of the light emission section 350 (upper side as viewed in FIGS. 19A and 19B) is formed with an irradiation window 422 for irradiating light from the detection light source 402 to the outside of the light emission section 350, and an incident window 423 for causing light reflected from the prism 404 to enter the color sensor 403. The shape of the prism 404 of the filter holder 400 is such that light irradiated through the irradiation window 422 efficiently enters the incident window 423. For example, in the present embodiment, the prism 404 has a shape which reflects light irradiated through the irradiation window 422 by the first reflection surface 404a appearing in FIG. 2, and reflects the light reflected by the first reflection surface 404a by the second reflection surface 404b toward the incident window 423.

Here, since the irradiation window 422 and the incident window 423 are separately provided, this prevents light from the detection light source 402 from leaking into the color sensor 403 without being transmitted through the color filter 401. Further, as shown in FIG. 19B, an inner surface of the lower cover 521 is provided with ribs 422a and 423a which surround the irradiation window 422 and the incident window 423, respectively, in a manner blocking between the irradiation window 422 and the incident window 423, which prevents light from the detection light source 402 from leaking into the color sensor 403 without being transmitted through the color filter 401.

Further, the irradiation window 422 and the incident window 423 each have a transparent member at an opening thereof, which has been subjected to surface-finishing for diffusing light, such as pearskin finish. This is because when a light source having a high directivity, such as an LED, is applied to the detection light source 402, a difference in color is generated between the center and the periphery of a light flux emitted from the detection light source 402. If a difference in color characteristics is generated between the center and the periphery of a light flux emitted from the detection light source 402, the color of light received by the color sensor 403 varies in accordance with a slight displacement caused when the filter holder 400 is mounted, whereby the result of the determination may be different even when the light is transmitted through the same color filter. To prevent this problem, by diffusing light at the irradiation window 422 and the incident window 423, it is possible to average the color characteristics of the light flux emitted from the detection light source 402, which makes it possible to accurately determine the filter. Note that surface-finishing for diffusing light may be performed on the inner surfaces or outer surfaces of the irradiation window 422 and the incident window 423, or only one of the irradiation window 422 and the incident window 423 may be provided with a diffusion function. Further, a light flux emitted from the detection light source 402 may be diffused before entering the color sensor 403, and instead of providing the diffusion function in the irradiation window 422 and/or the incident window 423, the diffusion function may be provided for e.g. the prism 404 on the side of the filter holder 400. Alternatively, instead of providing the diffusion function for the irradiation window 422 and the incident window 423, a diffusion filter may be configured to be provided between the detection light source 402 and the irradiation window 422, or between the color sensor 403 and the incident window 423.

A hood 420 appearing in FIGS. 19A and 19B reflects light in the direction of irradiating light from the light emission section 350, which has not been reflected by the reflector 315 in this direction. For this reason, the hood 420 is shaped such that an opening in a plane orthogonal to the optical axis of light irradiated from the light emission section 350 becomes larger as it is closer to the optical system 316 so as to make it possible to efficiently reflect the light in the direction of radiating light from the light emission section 350.

Figure 20:
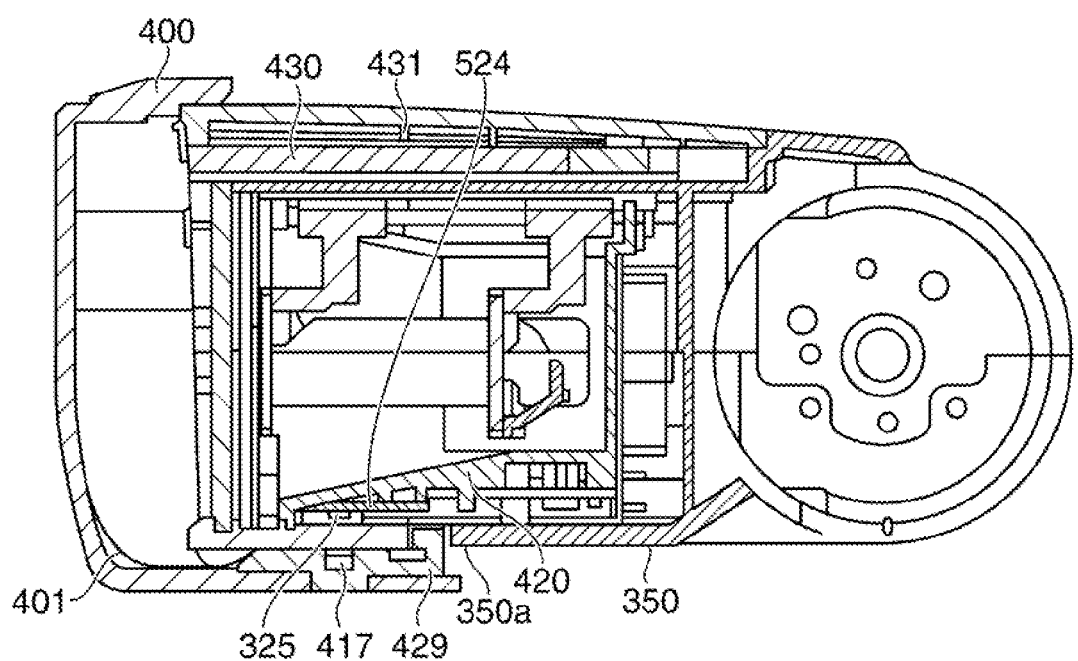
FIG. 20 is a cross-sectional view of the light emission section according to the fifth embodiment, as viewed from the side thereof.

FIG. 20 is a view of the light emission section 350 on which the filter holder 400 has been mounted, as viewed from the side thereof, which shows the cross-sectional structure of the filter holder 400 including the color filter 401 and the light emission section 350. The light emission section 350 accommodates a wide panel 430 which can extend the irradiation range by allowing the emitted light to be transmitted therethrough, and a catch light sheet 431 which reflects the emitted light toward the object to thereby make it possible to obtain a catch light effect during bounce shooting, in a manner movable into and out of the upper side of the light emission section 350. Therefore, to arrange the magnetic sensor 325 for holder determination, and the detection light source 402 and color sensor 403 for filter determination, on the upper side of the light emission section 350, it is necessary to arrange these components outside the wide panel 430 and the catch light sheet 431, which increases the size of the light emission section 350. To cope with this, by arranging the magnetic sensor 325, the detection light source 402, and the color sensor 403 on the lower side of the light emission section 350 as in the present embodiment, it is possible to reduce the size of the light emission section 350.

Further, a mechanical switch is not used for holder determination and filter determination, and hence it is possible to arrange the detection system of the filter holder detection section 322, and the detection system of the filter determination section 324 in a small space. This makes it possible to dispose the magnetic sensor 325 and the color sensor 403 closer to the irradiation surface than a case where a mechanical switch is arranged in a space between the lower cover 521 and the hood 420, and suppress the length of the filter holder 400 parallel to the optical axis of the emitted light to thereby make the filter holder 400 compact in size.

The description has been given of the example of the arrangement for determining information on the color characteristics of the color filter 401 based on results of reception of light by the color sensor 403, which has been emitted from the detection light source 402 and transmitted through the color filter 401, but various modifications and alterations thereof are possible, without departing from the gist thereof.

For example, although in the above-described embodiment, the prism 404 is used as a light guide section which guides light emitted from the detection light source 402 to the color sensor 403, a mirror or an optical fiber may be used in place of the prism 404.

Further, the light guide section described above may be provided in the light emission section 350. For example, when the filter holder 400 is mounted on the light emission section 350, the color filter 401 held by the filter holder 400 may be inserted between the light guide section in the light emission section 350, and the irradiation window 422 and the incident window 423.

Further, although the prism 404 as the light guide section guides light such that light from the detection light source 402 is transmitted through the color filter 401 twice, the light guide section may be so shaped as to guide light from the detection light source 402 such that the light is transmitted through the color filter 401 three times or more. As the number of times of being transmitted through the color filter 401 increases, there occurs a larger change in the color characteristics of light from the detection light source 402, and hence the accuracy of determining the color characteristics of a color filter is improved. This makes it possible, even when color filters having similar color characteristics are used, to accurately determine information on the color characteristics of each color filter.

A relationship between the number of times of being transmitted through the color filter and the determination accuracy will be described with reference to FIGS. 21A and 21B. FIG. 21A is a diagram showing results of reception of light by the color sensor 403, which has been emitted from the detection light source 402 and transmitted through the color filter 401 once. FIG. 21B is a diagram showing results of reception of light by the color sensor 403, which has been emitted from the detection light source 402 and transmitted through the color filter 401 twice.

In the case where the light is transmitted through the color filter 401 once, the light emitted from the detection light source 402 and the light received by the color sensor 403 have a small difference in chromaticity. Therefore, the detection results from the color sensor 403 in the case where the light is transmitted through the color filters A, B, and C which are similar in color characteristics once, respectively, are as indicated in FIG. 21A, and the difference between the detection results is small. The spectral sensitivity characteristics of the color sensor 403 changes according to the ambient temperature, and hence when associating the detection results by the color sensor 403 with the color characteristics of the color filter 401, it is necessary to associate the detection results with the same color characteristics when the detection results fall within a predetermined range after taking into account a change in the spectral sensitivity characteristics. When an LED is used as the detection light source 402, the spectral sensitivity characteristics of the LED also vary with the ambient temperature, and hence it is necessary to further increase the range of the detection results to be associated with the same color characteristics. Therefore, color filters which are similar in color characteristics, such as the color filters A, B, and C, have a small difference in the results of detection by the color sensor 403 if the light is transmitted through the color filter only once, so that the color filters are sometimes determined to have the same color characteristics.

On the other hand, as shown in FIG. 21B, in the case where the light is transmitted through the color filter 401 twice, the light emitted from the detection light source 402 changes in chromaticity twice, and hence even in the case of the color filters A, B, and C which are similar in color characteristics are used, the detection results from the color sensor 403 have a large difference between the color filters A, B, and C. Therefore, even when detection results obtained by the color sensor 403 are associated with the color characteristics of the color filter 401 with a certain degree of tolerance in the detection results by taking into account a change in the spectral sensitivity characteristics, it is possible to determine the color filters A, B, and C as those which are different in color characteristics. Note that even in the case where the light is transmitted through the color filter 401 three times or more, it is possible to obtain the same advantageous effects.

Figure 22:
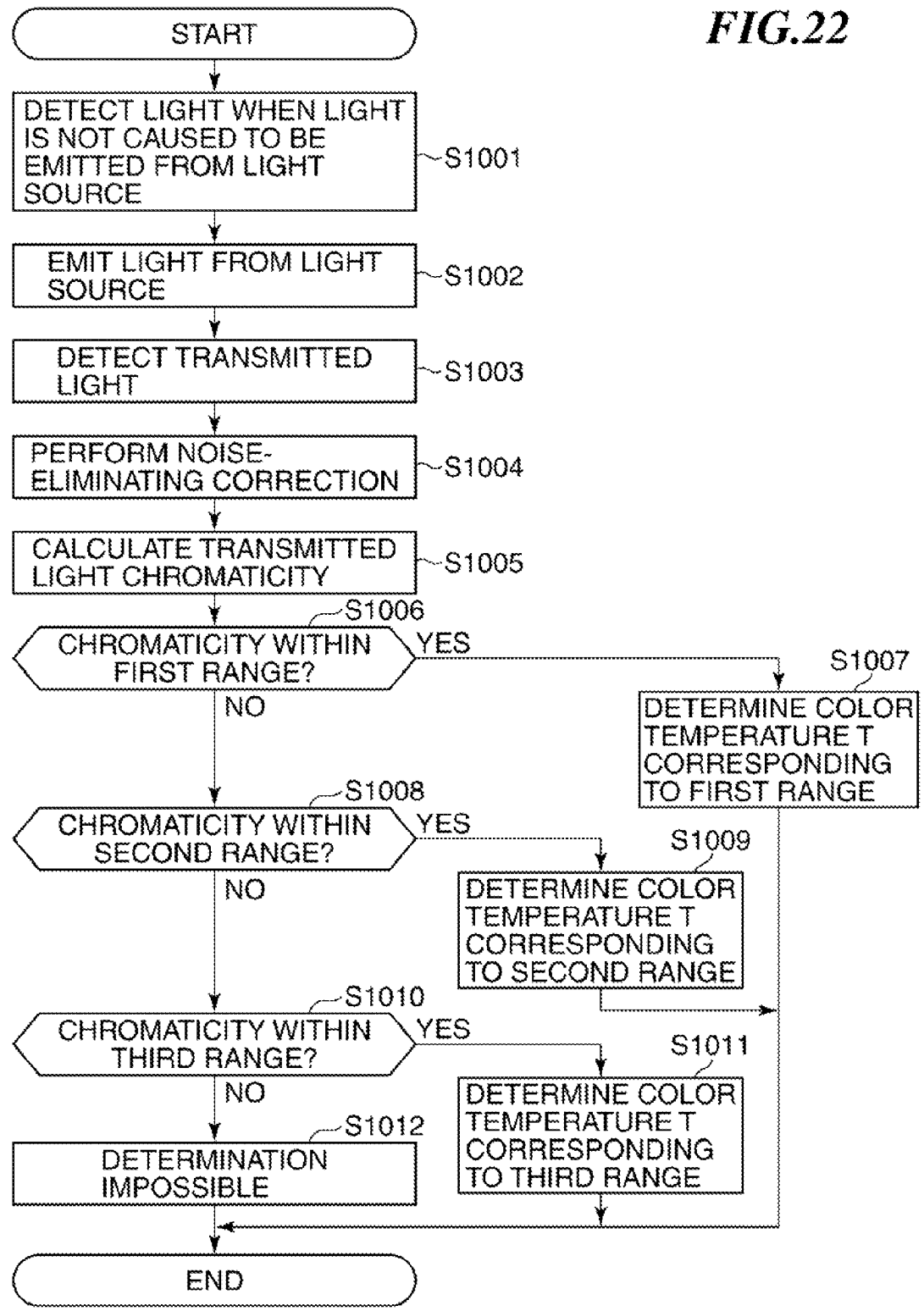
FIG. 22 is a flowchart of a filter characteristics determination process executed in the fifth embodiment.

Next, a process for determining information on the color characteristics of the color filter 401 will be described with reference to FIGS. 22, 5, and 23. FIG. 22 is a flowchart of a filter characteristics determination process executed for determining the information on the color characteristics of the color filter 401. FIG. 5 with reference to which description of the first embodiment is given hereinbefore shows the ranges of detection results by the color sensor 403 from which it is determined that light is transmitted through respective identical color filters. Further, FIG. 23 is a diagram showing a table which associates the detection results by the color sensor 403 with the color characteristics of the color filter 401. In the present embodiment, a description is given of the method of determining information on the color characteristics of the color filter 401 using the table, stored e.g. in the ROM of the strobe microcomputer 310, which associates the detection results by the color sensor 403 with information on the color characteristics of the color filter 401.

The filter characteristics determination process shown in FIG. 22 is started e.g. when the power of the strobe 300 is turned on, or when the strobe microcomputer 310 determines that the filter holder 400 has been mounted on the light emission section 350 of the strobe 300.

In a step S1001, the strobe microcomputer 310 performs detection of light using the color sensor 403 in a state in which the detection light source 402 is not caused to emit light. It is assumed that the color sensor 403 outputs signals corresponding to the three primary colors of R, G, and B as detection results (light reception results), and the results detected in the state in which the detection light source 402 is not caused to emit light are indicated by (rn, gn, bn).

In a step S1002, the strobe microcomputer 310 causes the detection light source 402 to emit light, and guides the light transmitted through the color filter 401 to the color sensor 403. Then, in a step S1003, the strobe microcomputer 310 performs detection of light using the color sensor 403 in a state in which the detection light source 402 is caused to emit light. The results detected in the state in which the detection light source 402 is caused to emit light are indicated by (rs, gs, bs).

In a step S1004, the strobe microcomputer 310 performs calculation for eliminating the detection results (rn, gn, bn) in the state in which the detection light source 402 is not caused to emit light as noise components from the detection results (rs, gs, bs) in the state in which the detection light source 402 is caused to emit light, using the equations (1A) to (1C) mentioned hereinbefore.

In a step S1005, the strobe microcomputer 310 calculates information on the color characteristics of light transmitted through the color filter 401 based on results (rc, gc, bc) of calculation in the step S1004, using the aforementioned equation (2).

By properly selecting the matrix coefficients of M11 to M33 in the equation (2), the results (rc, gc, bc) of calculation from the detection results by the color sensor 403 can be converted to a lightness value Br indicative of lightness of the transmitted light, and chromaticity coordinate values Cx and Cy, which express chromaticity of the transmitted light received at the color sensor 403 by two axes (x-y chromaticity diagram). Hereafter, the values Cx and Cy, which express the chromaticity of the light by two axes, are also referred to as the chromaticity information.

In steps S1006 to S1012, the strobe microcomputer 310 determines information on the color characteristics of the color filter 401 based on the chromaticity information (chromaticity coordinate values Cx and Cy) determined in the step S1005 and the table shown in FIG. 23.

In the step S1006, the strobe microcomputer 310 determines whether or not the chromaticity coordinate values Cx and Cy determined in the step S1005 are within the first range shown in FIG. 5. If the chromaticity coordinate values Cx and Cy determined in the step S1005 are within the first range, the strobe microcomputer 310 proceeds to a step S1007, wherein the strobe microcomputer 310 determines from the table shown in FIG. 23 that the color temperature T of the color filter 401 is 5000K. Note that the color temperature T indicated in the table shown in FIG. 23 represents a color temperature of light which has been emitted from the discharge tube 307 and transmitted through the color filter 401 once, and hereinafter, the color temperature T of the light which has been emitted from the discharge tube 307 and transmitted through the color filter 401 once is referred to as the color temperature T of the color filter 401. In other words, the color filter having the color temperature T is a color filter having color characteristics which convert light emitted from the discharge tube 307 to light having the color temperature T by causing the light to be transmitted through the color filter 401 once.

If the chromaticity coordinate values Cx and Cy determined in the step S1005 are not within the first range, the process proceeds to a step S1008, wherein the strobe microcomputer 310 determines whether or not the chromaticity coordinate values Cx and Cy determined in the step S1005 are within the second range shown in FIG. 5. If the chromaticity coordinate values Cx and Cy determined in the step S1005 are within the second range, the process proceeds to a step S1009, wherein the strobe microcomputer 310 determines from the table shown in FIG. 23 that the color temperature T of the color filter 401 is 3500K.

If the chromaticity coordinate values Cx and Cy determined in the step S1005 are not within the second range, the process proceeds to a step S1010, wherein the strobe microcomputer 310 determines whether or not the chromaticity coordinate values Cx and Cy determined in the step S1005 are within the third range shown in FIG. 5. If the chromaticity coordinate values Cx and Cy determined in the step S1005 are within the third range, the process proceeds to a step S1011, wherein the strobe microcomputer 310 determines from the table shown in FIG. 23 that the color temperature T of the color filter 401 is 2000K.

If the chromaticity coordinate values Cx and Cy determined in the step S1005 are not within the third range, the strobe microcomputer 310 judges that the detection results by the color sensor 403 have not been accurately obtained, or that the light from the detection light source 402 has not been transmitted through the color filter 401, and determines that it is impossible to perform the determination (step S1012).

The information on the color characteristics of the color filter 401 determined in the steps S1006 to S1012 is displayed on the display section 321. Alternatively, the determined information is sent from the strobe microcomputer 310 to the camera microcomputer 101 via the signal line SC. The camera microcomputer 101 performs white balance correction based on the information on the color characteristics of the color filter 401 received from the strobe microcomputer 310 to thereby perform white balance correction appropriate for the light emitted from the strobe 300. Note that the information on the color characteristics of the color filter 401 sent from the strobe microcomputer 310 to the camera microcomputer 101 may be the color temperature T of the light which has been emitted from the discharge tube 307 and transmitted through the color filter 401 once, or the color characteristics of the color filter 401.

As described above, the light which has been emitted from the light source 402 and transmitted through the color filter 401 is received by the color sensor 403, and information on the color characteristics of the color filter 401 is determined based on the result of reception of the light, whereby it is possible to accurately determine the information on the color characteristics irrespective of the direction of attachment of the color filter 401.

The accuracy of determining the information on the color characteristics of the color filter 401 is improved by eliminating noise components from the detection results by the color sensor 403 obtained in the state in which the detection light source 402 is caused to emit light, but it is also possible to determine the information on the color characteristics of the color filter 401 without eliminating the noise components.

Figure 24:
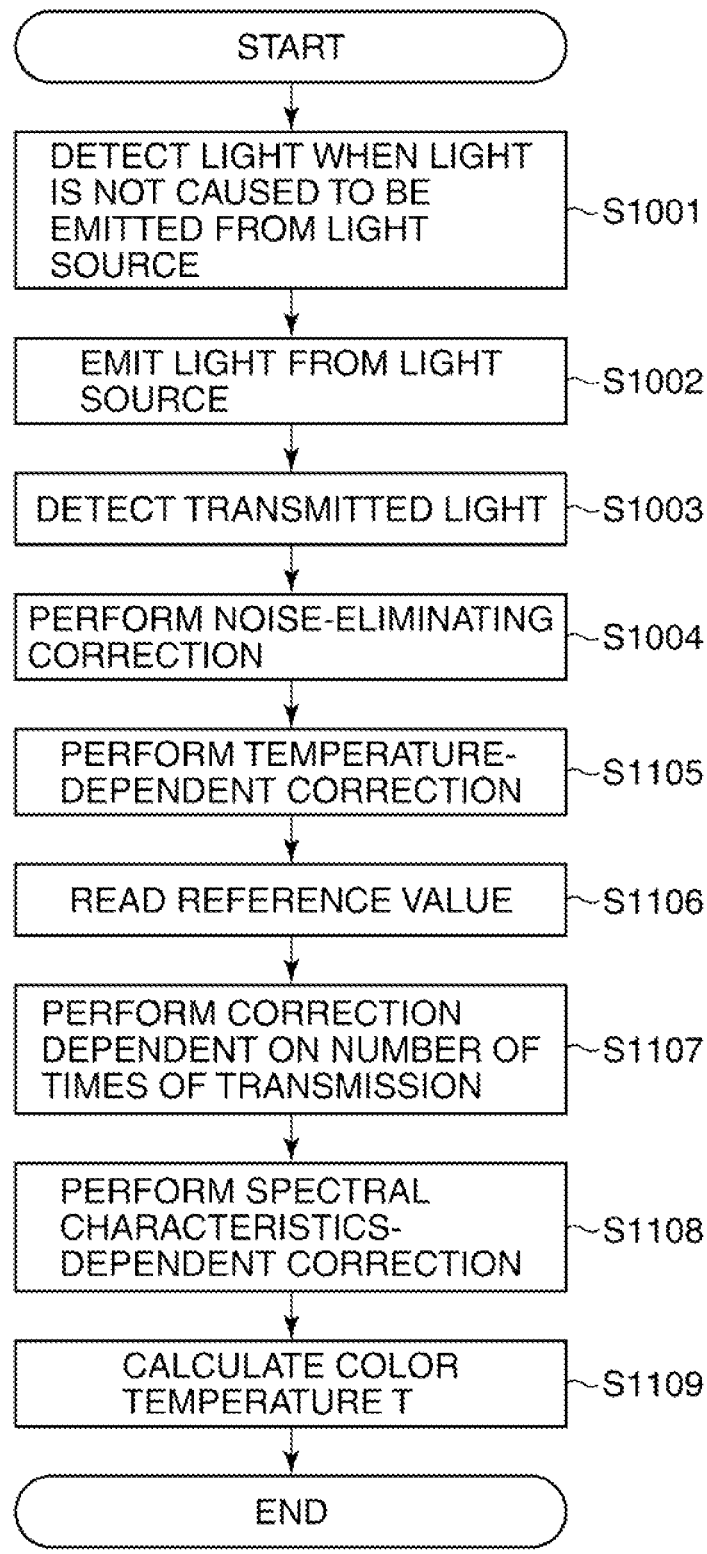
FIG. 24 is a flowchart of a process for determining color characteristics of a color filter, executed in a sixth embodiment.

Next, a description will be given of a sixth embodiment of the present invention. The image pickup system according to the present embodiment has the same arrangement as that of the image pickup system according to the fifth embodiment, but is distinguished from the fifth embodiment in the process for determining information on the color characteristics of the color filter 401. The process for determining information on the color characteristics of the color filter 401 in the present embodiment will be described with reference to FIGS. 10 and 24. FIG. 24 is a flowchart of the process for determining information on the color characteristics of the color filter 401.

The flowchart shown in FIG. 24 is started e.g. when the power of the strobe 300 is turned on, or when the strobe microcomputer 310 determines that the filter holder 400 has been mounted on the light emission section 350.

The steps S1001 to S1004 are the same as the steps S1001 to S1004 in the filter characteristics determination process in FIG. 22, respectively, and hence detailed description thereof is omitted.

In a step S1105, the strobe microcomputer 310 executes temperature correction processing on the calculation results (rc, gc, bc) obtained in the step S1004. This is because the spectral sensitivity characteristics of the color sensor 403 and the spectral characteristics of the detection light source 402 change according to the ambient temperature as mentioned hereinabove. The correction results (rp, gp, bp) obtained by executing the temperature correction processing on the calculation result (rc, gc, bc) are expressed by the following equations (14) to (16), respectively:

$$rp = rc \times LR(t) \times CR(t) \quad (14)$$

$$gp = gc \times LG(t) \times CG(t) \quad (15)$$

$$bp = bc \times LB(t) \times CB(t) \quad (16)$$

In the above equations, t represents the ambient temperature, and (LR, LG, LB) are temperature correction coefficients for compensating for a change in spectral characteristics of the detection light source 402 and vary with the ambient temperature. Further, (CR, CG, CB) are temperature correction coefficients for compensating for a change in the optical sensitivity characteristics of the color sensor 403 and vary with the ambient temperature. These coefficients are stored e.g. in the ROM of the strobe microcomputer 310 as a table which associates the ambient temperature with the coefficients. By executing the above-mentioned correction processing with respect to the change in temperature, the correction results (rp, gp, bp) become values corresponding to the calculation results (rc, gc, bc) at the reference temperature set in advance.

Note that the ambient temperature may be measured by providing a temperature sensor 500 in the strobe 300, or may be measured by providing a temperature sensor in the camera body 100 connected to the strobe 300, and then the strobe 300 may receive the measurement result from the camera body 100.

Further, the detection light source 402 can change in spectral characteristics due to heat generated by its own light emission, and hence a temperature sensor for determining the temperature correction coefficients for the detection light source 402 and a temperature sensor for determining the temperature correction coefficients for the color sensor 403 may be separately provided. In this case, if a plurality of temperature sensors are provided in the vicinity of the detection light source 402 and the color sensor 403, respectively, it is possible to determine more appropriate temperature correction coefficients. Alternatively, the ambient temperature for determining the temperature correction coefficients for the detection light source 402 and the ambient temperature for determining the temperature correction coefficients for the color sensor 403 may be measured at different timings.

In a step S1106, the strobe microcomputer 310 reads reference values (r0, g0, b0) stored e.g. in the ROM thereof in advance. The reference values (r0, g0, b0) are values obtained by executing the steps S1001 to S51004 in a state in which the color filter 401 is not attached at a reference temperature set in advance.

In a step S1107, the strobe microcomputer 310 calculates values in the case where the light is transmitted through the color filter 401 once, based on the correction results (rp, gp, bp) obtained in the step S1105 (transmission number correction). In a system configuration that transmits light through the color filter 401 "n" times, assuming that the light is transmitted through the color filter 401 once, the corrected values (rw, gw, bw) can be calculated by substituting 1 for n in the following equations (17) to (19):

$$rw = r0 - (r0 - rp)/n \qquad (17)$$

$$gw = g0 - (g0 - gp)/n \qquad (18)$$

$$bw = b0 - (b0 - bp)/n \qquad (19)$$

Note that the present step may be omitted if the system is configured such that light is transmitted through the color filter 401 once.

In a step S1108, based on the corrected values (rw, gw, bw), the strobe microcomputer 310 calculates values (rx, gx, bx) in the case where the light emitted from the discharge tube 307 and transmitted through the color filter 401 once is received by the color sensor 403 (spectral characteristics correction). As shown in FIG. 10, the detection light source 402 and the discharge tube 307 are different in spectral characteristics, and to determine the information on the color characteristics of light emitted from the strobe 300 after being transmitted through the color filter 401, it is necessary to take into account the difference in spectral characteristics between the detection light source 402 and the discharge tube 307.

Assuming that a spectral coefficient for the discharge tube 307 is represented by Xe, a spectral coefficient for the detection light source 402 by WL, spectral coefficients for the color sensor 403 by (CsR, CsG, CsB) with respect to the respective three-primary colors, and the wavelength by λ, the values (rx, gx, bx) are calculated by the following equations (20) to (22):

$$rx = rw \times \int_{380}^{780} [Xe(\lambda) \div WL(\lambda) \times CsR(\lambda)] d\lambda \qquad (20)$$

$$gx = gw \times \int_{380}^{780} [Xe(\lambda) \div WL(\lambda) \times CsG(\lambda)] d\lambda \qquad (21)$$

$$bx = bw \times \int_{380}^{780} [Xe(\lambda) \div WL(\lambda) \times CsB(\lambda)] d\lambda \qquad (22)$$

In a step S1109, the strobe microcomputer 310 calculates information on the color characteristics of the color filter 401 based on the calculation results (rx, gx, bx) obtained in the step S1108, using the following equation (23) (color temperature calculation):

$$\begin{bmatrix} X \\ Y \\ Z \end{bmatrix} = \begin{bmatrix} m11 & m12 & m13 \\ m21 & m22 & m23 \\ m31 & m32 & m33 \end{bmatrix} \times \begin{bmatrix} rx \\ gx \\ bx \end{bmatrix} \qquad (23)$$

By properly selecting the matrix coefficients of m11 to m33, it is possible to calculate tristimulus values (X, Y, Z) of color based on the information (rx, gx, bx) on the color characteristics of the light emitted from the discharge tube 307 and transmitted through the color filter 401 once. Then, by calculating the color temperature T of the color filter 401 based on the calculated tristimulus values (X, Y, Z), it is possible to determine the information on the color characteristics of the color filter 401. A method of calculating the color temperature T based on the tristimulus values (X, Y, Z) may employ a known method, and hence detailed description thereof is omitted.

As described above, the information on the color characteristics of the color filter 401 is determined based on the result of light reception by the color sensor 403, which is emitted from the detection light source 402 and transmitted through the color filter 401, whereby it is possible to accurately determine the information on the color characteristics irrespective of the direction of attachment of the color filter 401.

Further, the information on the color characteristics of the color filter is determined by calculation without using the table which associates the detection results by the color sensor 403 with the color characteristics of the color filter, and hence it is possible to determine the information on the color characteristics of the color filter more finely than a case where the table is used.

In the above-described determination process, the noise correction, the temperature-dependent correction, the correction dependent on the number of times transmission through a color filter, and the spectral characteristics-dependent correction are performed on the values obtained in the preceding processing in the mentioned order. However, it can be said that each correction processing is performed on the information based on the detection results by the color sensor 403.

Further, part of the correction processing in the above-described determination process may be omitted depending on the various conditions, such as the ambient temperature, the number of times of transmission through a color filter, and the spectral characteristics of the light source, and it is not necessary to execute all of the correction processing.

Next, a description will be given of a seventh embodiment of the present invention. Although in the fifth and sixth embodiments, the description has been given of the configuration in which the information on the color characteristics of the color filter 401 is determined using the detection light source 402 as the white LED and the color sensor 403, the present embodiment is distinguished from the fifth and sixth embodiments in the arrangement of the detection light source 402 and the color sensor 403. More specifically, an RGB LED, including the three primary colors of a red LED, a green LED, and a blue LED, is used as the detection light source 402 in place of the white LED, and a photodiode is used as a light receiving section in place of the color sensor 403.

The image pickup system according to the present embodiment is only different from the image pickup system according to the fifth and sixth embodiments in the detection light source 402 and the color sensor 403 as mentioned above, and hence detailed description of the arrangement of the image pickup system is omitted. Hereinafter, the RGB LED and the photodiode are denoted by reference numerals 402' and 403', respectively, in association with the detection light source 402 and the color sensor 403 according to the fifth and sixth embodiments (see FIG. 19A).

Figure 25:
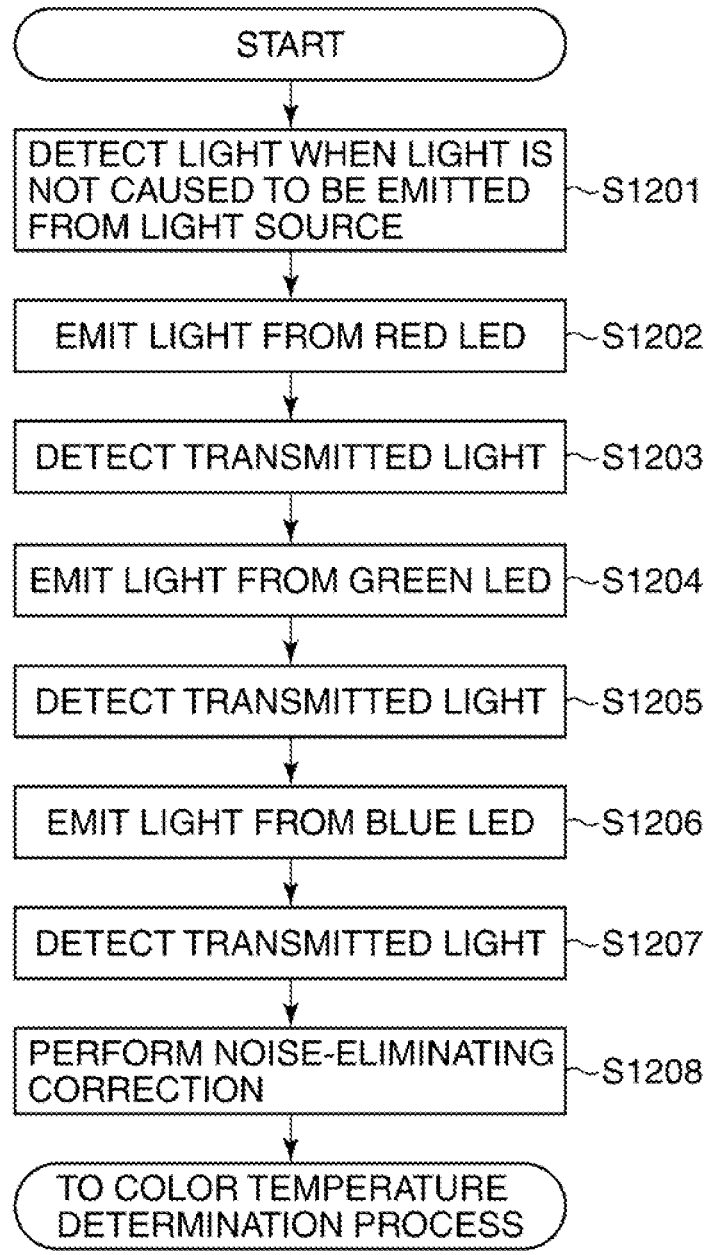
FIG. 25 is a flowchart of a process for determining color characteristics of a color filter, executed in a seventh embodiment.

The process for determining information on the color characteristics of the color filter 401 in the present embodiment will be described with reference to FIG. 25. FIG. 25 is a flowchart of the process for determining color characteristics of the color filter 401, in which after execution of a step S1208, the process proceeds to the step S1005 in FIG. 22 or the step S1105 in FIG. 24.

In a step S1201, the strobe microcomputer 310 performs detection of light using the photodiode 403' in a state in which the RGB LED 402' is not caused to emit light. The detection results by the photodiode 403' at this time are represented by (An).

In a step S1202, the strobe microcomputer 310 caused the RGB LED 402' to emit light from the red LED, and causes the light transmitted through the color filter 401 to enter the photodiode 403'. Then, in a step S1203, the strobe microcomputer 310 performs detection of light using the photodiode 403' in a state in which the red LED is caused to emit light. The results of detection in the state in which the red LED is caused to emit light are represented by (rs').

In a step S1204, the strobe microcomputer 310 causes the RGB LED 402' to emit light from the green LED, and causes the light transmitted through the color filter 401 to enter the photodiode 403'. Then, in a step S1205, the strobe microcomputer 310 performs detection of light using the photodiode 403' in a state in which the green LED is caused to emit light. The results of detection in the state in which the green LED is caused to emit light are represented by (gs').

In a step S1206, the strobe microcomputer 310 causes the RGB LED 402' to emit light from the blue LED, and causes the light transmitted through the color filter 401 to enter the photodiode 403'. Then, in a step S1207, the strobe microcomputer 310 performs detection of light using the photodiode 403' in a state in which the blue LED is caused to emit light. The results of detection in the state in which the blue LED is caused to emit light are represented by (bs').

In the step S1208, the strobe microcomputer 310 performs calculation for eliminating (An) detected in the state in which the RGB LED 402' is not caused to emit light as noise components from the results of detection in the state in which the RGB LED 402' is caused to emit light. The following equations (24) to (26) give results (rc', gc', bc') of elimination of (An) from (rs', gs', bs'):

$$rc'=rs'-An \quad (24)$$

$$gc'=gs'-An \quad (25)$$

$$bc'=bs'-An \quad (26)$$

Then, the process proceeds to the step S1005 in FIG. 22 or the step S1105 in FIG. 24, wherein the information on the color characteristics of the color filter 401 is determined using the values (rc', gc', bc') in place of (rc, gc, bc) used in the first and second embodiments.

As described above, also in the present embodiment, similarly to the first to sixth embodiments, it is possible to accurately determine information on the color characteristics irrespective of the direction of attachment of the color filter 401.

For example, although in the above-described embodiments, the description has been given of the arrangement using the discharge tube 307 as the main light source of the strobe 300, a light source of the same type as the light source for color filter determination may be used as the main light source.

Further, although in the above-described embodiments, the description has been given of the arrangement in which the color filter 401 is attached to the filter holder 400, and the filter holder 400 is mounted on the light emission section 350, the system may be configured without the filter holder insofar as the system is configured such that the light emission section 350 includes a holder that holds the color filter. In other words, the optical accessory may include both the color filter and the filter holder, and may be formed without the filter holder. In this case, it is desirable to configure the image pickup system such that a light guide section, such as the prism 404 in the present embodiments, is disposed in the light emission section 350, and the color filter can be held in a state inserted between the light guide section, and the irradiation window 422 and incident window 423.

Further, the color filter color characteristic determination process according to the present invention can be applied to the arrangement in which a color filter can be attached not forward of the strobe 300 which is removably mounted on the image pickup apparatus, but forward of a light emission section of a strobe incorporated in the image pickup apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

This application claims the benefit of Japanese Patent Applications No. 2012-043460, filed Feb. 29, 2012, No. 2012-043461, filed Feb. 29, 2012, No. 2012-001331, filed Jan. 6, 2012, and No. 2012-028828, filed Feb. 13, 2012, which are hereby incorporated by reference herein in their entirety.

What is claimed is:

1. An illumination device that is capable of having an optical accessory attached forward of a light emission section thereof, for changing color characteristics of light transmitted through the optical accessory, and is removably mounted on an image pickup apparatus, comprising:
   an acquisition unit configured to acquire information on characteristics of the optical accessory attached forward of the light emission section; and
   a transmission unit configured to transmit the information on characteristics acquired by said acquisition unit to the image pickup apparatus on which the illumination device is mounted,
   wherein said acquisition unit acquires information on an amount of light reduced by the optical accessory when the light emission section is caused to emit light, as the information on the characteristics.

2. The illumination device according to claim 1, wherein the image pickup apparatus is configured to calculate an amount of main light emission from the illumination device based on a photometric value acquired by causing the illumination device to perform preliminary light emission, and wherein said acquisition unit acquires information indicative of a corrected preliminary light emission amount which is obtained by correcting a preliminary light emission amount indicative of an amount of preliminary light emission by the amount of light reduced by the optical accessory, as the information on the characteristics.

3. The illumination device according to claim 1, further comprising:

a light source; and a light receiving unit, and wherein said acquisition unit acquires the information on the characteristics based on a result of reception of light emitted from said light source and transmitted through the optical accessory, by said light receiving unit.

4. The illumination device according to claim 3, further comprising a storage unit configured to store, in advance, information associating information on the color characteristics of light emitted from said light source and transmitted through the optical accessory with the information on the characteristics, and wherein said acquisition unit acquires the information on the characteristics, based on the information on the characteristics of light transmitted through the optical accessory based on the result of reception of light by said light receiving unit, and the information stored in said storage unit.

5. An image pickup system including an illumination device that is capable of having an optical accessory attached forward of a light emission section thereof, for changing color characteristics of light transmitted through the optical accessory, and an image pickup apparatus, comprising:

an acquisition unit configured to acquire information on characteristics of the optical accessory attached forward of the light emission section; and a calculation unit configured to calculate an amount of main light emission from the illumination device, based on the information on characteristics acquired by said acquisition unit and a photometric value acquired by causing the illumination device to perform preliminary light emission, wherein said acquisition unit acquires information on an amount of light reduced by the optical accessory when the light emission section is caused to emit light, as the information on the characteristics.

6. A light emission control device comprising:

an acquisition unit configured to acquire information on characteristics of an optical accessory attached forward of a light emission section of an illumination device that is capable of having the optical accessory attached forward of the light emission section thereof, for changing color characteristics of light transmitted through the optical accessory; and a setting unit configured to set a control value concerning light emission amount control of the illumination device in a state in which the optical accessory is attached forward of the light emission section, based on the information on the characteristics acquired by said acquisition unit, wherein said acquisition unit acquires information on an amount of light reduced by the optical accessory when the light emission section is caused to emit light, as the information on the characteristics.

7. The light emission control device according to claim 6, wherein said setting unit sets the control value such that the amount of light emission from a light source of the illumination device is larger when the optical accessory is attached forward of the light emission section than when the optical accessory is not attached forward of the light emission section, so as to make an amount of light illuminating an object using the illumination device equal between when the optical accessory is attached forward of the light emission section and when the optical accessory is not attached forward of the light emission section.

8. The light emission control device according to claim 6, further comprising a detection unit configured to detect an amount of light emission from the light source of the illumination device; and a control unit configured to stop light emission from the light source when the amount of light emission detected by said detection unit reaches a reference value, wherein said setting unit sets the reference value based on the information on the characteristics acquired by said acquisition unit.

9. The light emission control device according to claim 8, wherein said control unit stops the light emission from the light source when a voltage indicative of the amount of light emission detected by said detection unit reaches a reference voltage, and wherein said setting unit sets the reference voltage based on the information on the characteristics acquired by said acquisition unit.

10. The light emission control device according to claim 9, wherein said setting unit corrects the reference voltage determined according to a light emission instruction value indicative of an amount of light which is to illuminate the object using the illumination device, based on the information on the characteristics acquired by said acquisition unit.

11. The light emission control device according to claim 6, wherein said setting unit corrects a light emission instruction value indicative of an amount of light which is to illuminate the object using the illumination device, based on the information on the characteristics acquired by said acquisition unit.

12. A light emission control method comprising:

acquiring information on characteristics of an optical accessory attached forward of a light emission section of an illumination device that is capable of having the optical accessory attached forward of the light emission section thereof, for changing color characteristics of light transmitted through the optical accessory; and setting a control value concerning light emission amount control of the illumination device in a state in which the optical accessory is attached forward of the light emission section, based on the information on the characteristics acquired by said acquiring, wherein the acquired information includes on an amount of light reduced by the optical accessory when the light emission section is caused to emit light, as the information on the characteristics.

13. An illumination device that is capable of having an optical accessory attached forward of a light emission section thereof, for changing color characteristics of light transmitted through the optical accessory, comprising:

a light source;

a light receiving unit; and a determination unit configured to determine information on color characteristics of the optical accessory, based on a result of reception of light emitted from said light source and transmitted through the optical accessory by said light receiving unit.

14. The illumination device according to claim 13, wherein said determination unit determines the information on the color characteristics of the optical accessory, by calculating information on color characteristics of the light emitted from said light source and transmitted through the optical accessory, based on the result of reception of the light by said light receiving unit.

15. The illumination device according to claim 14, wherein the illumination device is configured such that said light receiving unit receives the light which has been emitted from said light source and has been transmitted more than once through the optical accessory, and
   wherein said determination unit calculates the information on the color characteristics of the light transmitted through the optical accessory, by correcting the information determined based on the result of reception of the light by said light receiving unit, based on the number of times of transmission of the light emitted from said light source through the optical accessory.

16. The illumination device according to claim 15, wherein said determination unit calculates the information on the color characteristics of the light transmitted through the optical accessory, by correcting the information determined based on the result of reception of the light by said light receiving unit, based on the number of times of transmission of the light emitted from said light source through the optical accessory, such that the information corresponds to information obtained in a case where the light emitted from said light source is transmitted through the optical accessory once.

17. The illumination device according to claim 14, further comprising a temperature sensor configured to measure temperature, and
   wherein said determination unit calculates the information on the color characteristics of the light transmitted through the optical accessory by correcting the information determined based on the result of reception of the light by said light receiving unit, based on a temperature measured by said temperature sensor.

18. The illumination device according to claim 17, wherein said determination unit calculates the information on the color characteristics of the light transmitted through the optical accessory, by correcting the information determined based on the result of reception of the light by said light receiving unit, based on the temperature measured by said temperature sensor, in a manner compensating for a temperature-dependent change in spectral sensitivity characteristics of said light receiving unit.

19. The illumination device according to claim 17, wherein said determination unit calculates the information on the color characteristics of the light transmitted through the optical accessory, by correcting the information determined based on the result of reception of the light by said light receiving unit, based on the temperature measured by said temperature sensor, in a manner compensating for a temperature-dependent change in spectral characteristics of said light source.

20. The illumination device according to claim 14, wherein said determination unit calculates the information on the color characteristics of the light transmitted through the optical accessory, by correcting the information determined based on the result of reception of the light by said light receiving unit, based on spectral characteristics of a main light source that emits light to be irradiated on an object from the light emission section and spectral characteristics of said light source.

21. The illumination device according to claim 17 further comprising a storage unit configured to store, in advance, information associating information on the color characteristics of the light emitted from said light source and transmitted through the optical accessory with the information on the color characteristics of the optical accessory, and
   wherein said determination unit determines the information on the color characteristics of the optical accessory, based on the information on the color characteristics of the light emitted from said light source and transmitted through the optical accessory, calculated based on the result of reception of light by said light receiving unit, and the information stored in said storage unit.

22. The illumination device according to claim 14, wherein said determination unit calculates the information on the color characteristics of the light transmitted through the optical accessory, based on the result of reception of the light emitted from said light source and transmitted through the optical accessory, by said light receiving unit, and the result of reception of light by said light receiving unit when said light source is not caused to emit light.

23. The illumination device according to claim 14, wherein the optical accessory includes a color filter for changing color characteristics of light transmitted therethrough, and a filter holder for holding the color filter, and
   wherein said determination unit determines the information on the color characteristics of the optical accessory, based on a result of reception of light emitted from said light source and transmitted through the color filter of the optical accessory, by said light receiving unit.

24. An image pickup system comprising:
   an illumination device that is capable of having an optical accessory attached forward of a light emission section thereof, for changing color characteristics of light transmitted through the optical accessory;
   a light source;
   a light receiving unit;
   a light guide section configured to guide light emitted from said light source to said light receiving unit such that the light emitted from said light source is transmitted through the optical accessory attached to said illumination device and is then received by said light receiving unit;
   a determination unit configured to determine information on color characteristics of the optical accessory, based on a result of reception of the light emitted from said light source, by said light receiving unit;
   an image pickup unit configured to pick up an image of an object irradiated by light emitted from said illumination device; and
   a white balance unit configured to correct white balance of an output from said image pickup unit based on an output from said determination unit.

25. An illumination device that is capable of having an optical accessory attached forward of a light emission section thereof, for changing color characteristics of light transmitted through the optical accessory, comprising:
   a proximity sensor disposed at a lower area of the light emission section, and configured to detect an approach of the optical accessory, said proximity sensor being used for determining whether or not the optical accessory is attached forward of the light emission section;
   a light source disposed at a lower area of the light emission section; and
   a light receiving sensor disposed at a lower area of the light emission section, and configured to receive the light emitted from said light source and transmitted through the optical accessory, in a state where the optical accessory is attached forward of the light emission section, a result of reception of the light being used for determination on information of color characteristics of the optical accessory,
wherein said proximity sensor is disposed in a side-by-side relation with said light source and said light receiving sensor in a longitudinal direction of the light emission section.

26. The illumination device according to claim 25, wherein said proximity sensor is an magnetic sensor that detects magnetism generated from a magnetism generating member provided in the optical accessory.

27. The illumination device according to claim 25, further comprising a fixing portion disposed on a lower surface of the light emission section, for attaching the optical accessory forward of the light emission section, and
wherein said proximity sensor is disposed closer to an illumination surface side of the light emission section than said fixing portion is.

28. The illumination device according to claim 27, wherein said proximity sensor is disposed closer to a center of the light emission section than said fixing portion is.

29. The illumination device according to claim 25, wherein the optical accessory includes a color filter for changing color characteristics of light transmitted therethrough, and a filter holder for holding the color filter, and
wherein said light receiving sensor receives the light emitted from said light source and transmitted through the optical accessory, in a state where the optical accessory is attached forward of the light emission section.

30. The illumination device according to claim 27, wherein the optical accessory includes a color filter for changing color characteristics of light transmitted therethrough, and a filter holder for holding the color filter, and
wherein the fixing portion is engaged with a holding portion of the filter holder, the holding portion holds the color filter in a sandwiching manner.

31. A filter holder for holding a color filter for changing color characteristics of light transmitted therethrough, the color filter being capable of being attached forward of a light emission section of an illumination device including a magnetic sensor disposed at a lower area of the light emission section, a light source disposed at a lower area of the light emission section, and a light receiving sensor disposed at a lower area of the light emission section, in which the magnetic sensor is disposed in a side-by-side relation with the light source and the light receiving sensor in a longitudinal direction of the light emission section,
the filter holder comprising:
a magnetism generating member disposed in a lower area for generating magnetism; and
a light guide section disposed in a lower area and configured to guide light emitted from the light source to the light receiving sensor, in a state where the filer holder is mounted forward of the light emission section,
wherein the magnetism generating member is disposed in a side-by-side relation with the light guide section, in a longitudinal direction of the filter holder.

32. The filter holder according to claim 31, further comprising a holding portion disposed in the lower area and configured to hold the color filter in a sandwiching manner, and
wherein said holding portion is disposed at a location closer to a surface opposed to an illumination surface of the light emission section than said magnetism generating member and said light guide section are, in a state where the filter holder is attached forward of the light emission section.

33. An illumination device that is capable of having an optical accessory attached forward of a light emission section thereof, for changing color characteristics of light transmitted through the optical accessory, and is removably mounted on an image pickup apparatus, comprising:
an acquisition unit configured to acquire information on characteristics of the optical accessory attached forward of the light emission section;
a transmission unit configured to transmit the information on characteristics acquired by said acquisition unit to the image pickup apparatus on which the illumination device is mounted;
a light source; and
a light receiving unit,
wherein said acquisition unit acquires the information on the characteristics based on a result of reception of light emitted from said light source and transmitted through the optical accessory, by said light receiving unit.

* * * * *